US009929786B2

(12) United States Patent
George et al.

(10) Patent No.: US 9,929,786 B2
(45) Date of Patent: *Mar. 27, 2018

(54) REDUCING LOCATION-DEPENDENT DESTRUCTIVE INTERFERENCE IN DISTRIBUTED ANTENNA SYSTEMS (DASS) OPERATING IN MULTIPLE-INPUT, MULTIPLE-OUTPUT (MIMO) CONFIGURATION, AND RELATED COMPONENTS, SYSTEMS, AND METHODS

(71) Applicant: Corning Incorporated, Corning, NY (US)

(72) Inventors: Jacob George, Horseheads, NY (US); Anthony Ng'Oma, Horseheads, NY (US); Hejie Yang, Apex, NC (US)

(73) Assignee: Corning Incorporated, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/372,490

(22) Filed: Dec. 8, 2016

(65) Prior Publication Data

US 2017/0093472 A1 Mar. 30, 2017

Related U.S. Application Data

(63) Continuation of application No. 14/447,014, filed on Jul. 30, 2014, now Pat. No. 9,525,472.

(51) Int. Cl.
*H04B 10/2575* (2013.01)
*H04B 7/04* (2017.01)
(Continued)

(52) U.S. Cl.
CPC ......... *H04B 7/0469* (2013.01); *H04B 7/0413* (2013.01); *H04B 7/10* (2013.01);
(Continued)

(58) Field of Classification Search
CPC ............ H04B 10/2504; H04B 10/2575; H01Q 21/061; H04W 88/02; H04W 88/04
See application file for complete search history.

(56) References Cited

U.S. PATENT DOCUMENTS

| 4,365,865 A | 12/1982 | Stiles |
| 4,449,246 A | 5/1984 | Seiler et al. |

(Continued)

FOREIGN PATENT DOCUMENTS

| AU | 645192 B | 10/1992 |
| AU | 731180 B2 | 3/1998 |

(Continued)

OTHER PUBLICATIONS

Attygalle et al., "Extending Optical Transmission Distance in Fiber Wireless Links Using Passive Filtering in Conjunction with Optimized Modulation," Journal of Lightwave Technology, vol. 24, No. 4, Apr. 2006, 7 pages.

(Continued)

*Primary Examiner* — Nathan Curs
(74) *Attorney, Agent, or Firm* — C. Keith Montgomery

(57) ABSTRACT

Components, systems, and methods for reducing location-dependent destructive interference in distributed antenna systems operating in multiple-input, multiple-output (MIMO) configuration are disclosed. Interference is defined as issues with received MIMO communications signals that can cause a MIMO algorithm to not be able to solve a channel matrix for MIMO communications signals received by MIMO receivers in client devices. These issues may be caused by lack of separation (i.e., phase, amplitude) in the received MIMO communications signals. Thus, to provide amplitude separation of received MIMO communications signals, multiple MIMO transmitters are each configured to employ multiple transmitter antennas, which are each configured to transmit in different polarization states. In certain (Continued)

embodiments, one of the MIMO communications signals is amplitude adjusted in one of the polarization states to provide amplitude separation between received MIMO communications signals. In other embodiments, multiple transmitter antennas in a MIMO transmitter can be offset to provide amplitude separation.

17 Claims, 15 Drawing Sheets

(51) Int. Cl.
*H04B 7/0413* (2017.01)
*H04B 10/25* (2013.01)
*H04W 72/04* (2009.01)
*H04W 72/08* (2009.01)
*H04B 7/10* (2017.01)
*H04W 88/10* (2009.01)

(52) U.S. Cl.
CPC ... *H04B 10/2504* (2013.01); *H04B 10/25753* (2013.01); *H04W 72/048* (2013.01); *H04W 72/082* (2013.01); *H04W 88/10* (2013.01)

(56) References Cited

U.S. PATENT DOCUMENTS

| | | | |
|---|---|---|---|
| 4,573,212 A | 2/1986 | Lipsky |
| 4,665,560 A | 5/1987 | Lange |
| 4,867,527 A | 9/1989 | Dotti et al. |
| 4,889,977 A | 12/1989 | Haydon |
| 4,896,939 A | 1/1990 | O'Brien |
| 4,916,460 A | 4/1990 | Powell |
| 4,939,852 A | 7/1990 | Brenner |
| 4,943,136 A | 7/1990 | Popoff |
| 4,972,346 A | 11/1990 | Kawano et al. |
| 5,039,195 A | 8/1991 | Jenkins et al. |
| 5,042,086 A | 8/1991 | Cole et al. |
| 5,056,109 A | 10/1991 | Gilhousen et al. |
| 5,059,927 A | 10/1991 | Cohen |
| 5,125,060 A | 6/1992 | Edmundson |
| 5,159,479 A | 10/1992 | Takagi |
| 5,187,803 A | 2/1993 | Sohner et al. |
| 5,189,718 A | 2/1993 | Barrett et al. |
| 5,189,719 A | 2/1993 | Coleman et al. |
| 5,206,655 A | 4/1993 | Caille et al. |
| 5,208,812 A | 5/1993 | Dudek et al. |
| 5,210,812 A | 5/1993 | Nilsson et al. |
| 5,260,957 A | 11/1993 | Hakimi |
| 5,263,108 A | 11/1993 | Kurokawa et al. |
| 5,267,122 A | 11/1993 | Glover et al. |
| 5,268,971 A | 12/1993 | Nilsson et al. |
| 5,278,690 A | 1/1994 | Vella-Coleiro |
| 5,278,989 A | 1/1994 | Burke et al. |
| 5,280,472 A | 1/1994 | Gilhousen et al. |
| 5,299,947 A | 4/1994 | Barnard |
| 5,301,056 A | 4/1994 | O'Neill |
| 5,325,223 A | 6/1994 | Bears |
| 5,339,058 A | 8/1994 | Lique |
| 5,339,184 A | 8/1994 | Tang |
| 5,343,320 A | 8/1994 | Anderson |
| 5,377,035 A | 12/1994 | Wang et al. |
| 5,379,455 A | 1/1995 | Koschek |
| 5,381,459 A | 1/1995 | Lappington |
| 5,396,224 A | 3/1995 | Dukes et al. |
| 5,400,391 A | 3/1995 | Emura et al. |
| 5,420,863 A | 5/1995 | Taketsugu et al. |
| 5,424,864 A | 6/1995 | Emura |
| 5,444,564 A | 8/1995 | Newberg |
| 5,455,592 A | 10/1995 | Huddle |
| 5,457,557 A | 10/1995 | Zarem et al. |
| 5,459,727 A | 10/1995 | Vannucci |
| 5,469,523 A | 11/1995 | Blew et al. |
| 5,500,763 A | 3/1996 | Ota |
| 5,502,446 A | 3/1996 | Denninger |
| 5,513,176 A | 4/1996 | Dean et al. |
| 5,519,830 A | 5/1996 | Opoczynski |
| 5,543,000 A | 8/1996 | Lique |
| 5,546,443 A | 8/1996 | Raith |
| 5,557,698 A | 9/1996 | Gareis et al. |
| 5,574,815 A | 11/1996 | Kneeland |
| 5,583,517 A | 12/1996 | Yokev et al. |
| 5,598,288 A | 1/1997 | Collar |
| 5,606,725 A | 2/1997 | Hart |
| 5,615,034 A | 3/1997 | Hori |
| 5,627,879 A | 5/1997 | Russell et al. |
| 5,640,678 A | 6/1997 | Ishikawa et al. |
| 5,644,622 A | 7/1997 | Russell et al. |
| 5,648,961 A | 7/1997 | Ebihara |
| 5,651,081 A | 7/1997 | Blew et al. |
| 5,661,582 A | 8/1997 | Kintis et al. |
| 5,668,562 A | 9/1997 | Cutrer et al. |
| 5,677,974 A | 10/1997 | Elms et al. |
| 5,682,256 A | 10/1997 | Motley et al. |
| 5,694,232 A | 12/1997 | Parsay et al. |
| 5,703,602 A | 12/1997 | Casebolt |
| 5,708,681 A | 1/1998 | Malkemes et al. |
| 5,726,984 A | 3/1998 | Kubler et al. |
| 5,765,099 A | 6/1998 | Georges et al. |
| 5,774,789 A | 6/1998 | van der Kaay et al. |
| 5,790,536 A | 8/1998 | Mahany et al. |
| 5,790,606 A | 8/1998 | Dent |
| 5,793,772 A | 8/1998 | Burke et al. |
| 5,802,173 A | 9/1998 | Hamilton-Piercy et al. |
| 5,802,473 A | 9/1998 | Rutledge et al. |
| 5,805,975 A | 9/1998 | Green, Sr. et al. |
| 5,805,983 A | 9/1998 | Naidu et al. |
| 5,809,395 A | 9/1998 | Hamilton-Piercy et al. |
| 5,809,422 A | 9/1998 | Raleigh et al. |
| 5,809,431 A | 9/1998 | Bustamante et al. |
| 5,812,296 A | 9/1998 | Tarusawa et al. |
| 5,818,619 A | 10/1998 | Medved et al. |
| 5,818,883 A | 10/1998 | Smith et al. |
| 5,821,510 A | 10/1998 | Cohen et al. |
| 5,825,651 A | 10/1998 | Gupta et al. |
| 5,828,658 A | 10/1998 | Ottersten et al. |
| 5,832,379 A | 11/1998 | Mallinckrodt |
| 5,835,857 A | 11/1998 | Otten |
| 5,838,474 A | 11/1998 | Stilling |
| 5,839,052 A | 11/1998 | Dean et al. |
| 5,852,651 A | 12/1998 | Fischer et al. |
| 5,854,986 A | 12/1998 | Dorren et al. |
| 5,859,719 A | 1/1999 | Dentai et al. |
| 5,862,460 A | 1/1999 | Rich |
| 5,867,485 A | 2/1999 | Chambers et al. |
| 5,867,763 A | 2/1999 | Dean et al. |
| 5,881,200 A | 3/1999 | Burt |
| 5,883,882 A | 3/1999 | Schwartz |
| 5,896,568 A | 4/1999 | Tseng et al. |
| 5,903,834 A | 5/1999 | Wallstedt et al. |
| 5,910,776 A | 6/1999 | Black |
| 5,913,003 A | 6/1999 | Arroyo et al. |
| 5,917,636 A | 6/1999 | Wake et al. |
| 5,930,682 A | 7/1999 | Schwartz et al. |
| 5,936,754 A | 8/1999 | Ariyavisitakul et al. |
| 5,943,372 A | 8/1999 | Gans et al. |
| 5,946,622 A | 8/1999 | Bojeryd |
| 5,949,564 A | 9/1999 | Wake |
| 5,953,670 A | 9/1999 | Newson |
| 5,959,531 A | 9/1999 | Gallagher, III et al. |
| 5,960,344 A | 9/1999 | Mahany |
| 5,969,837 A | 10/1999 | Farber et al. |
| 5,983,070 A | 11/1999 | Georges et al. |
| 5,987,303 A | 11/1999 | Dutta et al. |
| 5,995,832 A | 11/1999 | Mallinckrodt |
| 6,005,884 A | 12/1999 | Cook et al. |
| 6,006,069 A | 12/1999 | Langston et al. |
| 6,006,105 A | 12/1999 | Rostoker et al. |
| 6,011,980 A | 1/2000 | Nagano et al. |
| 6,014,546 A | 1/2000 | Georges et al. |
| 6,016,426 A | 1/2000 | Bodell |
| 6,023,625 A | 2/2000 | Myers, Jr. |
| 6,031,645 A | 2/2000 | Ichikawa |

(56) References Cited

U.S. PATENT DOCUMENTS

| | | |
|---|---|---|
| 6,037,898 A | 3/2000 | Parish et al. |
| 6,049,705 A | 4/2000 | Xue |
| 6,061,161 A | 5/2000 | Yang et al. |
| 6,069,721 A | 5/2000 | Oh et al. |
| 6,088,381 A | 7/2000 | Myers, Jr. |
| 6,112,086 A | 8/2000 | Wala |
| 6,118,767 A | 9/2000 | Shen et al. |
| 6,122,529 A | 9/2000 | Sabat, Jr. et al. |
| 6,127,917 A | 10/2000 | Tuttle |
| 6,128,470 A | 10/2000 | Naidu et al. |
| 6,128,477 A | 10/2000 | Freed |
| 6,148,041 A | 11/2000 | Dent |
| 6,150,921 A | 11/2000 | Werb et al. |
| 6,157,810 A | 12/2000 | Georges et al. |
| 6,192,216 B1 | 2/2001 | Sabat, Jr. et al. |
| 6,194,968 B1 | 2/2001 | Winslow |
| 6,198,432 B1 | 3/2001 | Janky |
| 6,211,978 B1 | 4/2001 | Wojtunik |
| 6,212,397 B1 | 4/2001 | Langston et al. |
| 6,222,503 B1 | 4/2001 | Gietema |
| 6,223,201 B1 | 4/2001 | Reznak |
| 6,232,870 B1 | 5/2001 | Garber et al. |
| 6,236,784 B1 | 5/2001 | Ido |
| 6,236,789 B1 | 5/2001 | Fitz |
| 6,236,863 B1 | 5/2001 | Waldroup et al. |
| 6,240,274 B1 | 5/2001 | Izadpanah |
| 6,268,946 B1 | 7/2001 | Larkin et al. |
| 6,275,990 B1 | 8/2001 | Dapper et al. |
| 6,279,158 B1 | 8/2001 | Geile et al. |
| 6,286,163 B1 | 9/2001 | Trimble |
| 6,292,673 B1 | 9/2001 | Maeda et al. |
| 6,295,451 B1 | 9/2001 | Mimura |
| 6,301,240 B1 | 10/2001 | Slabinski et al. |
| 6,307,869 B1 | 10/2001 | Pawelski |
| 6,308,085 B1 | 10/2001 | Shoki |
| 6,314,163 B1 | 11/2001 | Acampora |
| 6,317,599 B1 | 11/2001 | Rappaport et al. |
| 6,323,980 B1 | 11/2001 | Bloom |
| 6,324,391 B1 | 11/2001 | Bodell |
| 6,330,241 B1 | 12/2001 | Fort |
| 6,330,244 B1 | 12/2001 | Swartz et al. |
| 6,334,219 B1 | 12/2001 | Hill et al. |
| 6,336,021 B1 | 1/2002 | Nukada |
| 6,336,042 B1 | 1/2002 | Dawson et al. |
| 6,337,754 B1 | 1/2002 | Imajo |
| 6,340,932 B1 | 1/2002 | Rodgers et al. |
| 6,353,406 B1 | 3/2002 | Lanzl et al. |
| 6,353,600 B1 | 3/2002 | Schwartz et al. |
| 6,359,714 B1 | 3/2002 | Imajo |
| 6,370,203 B1 | 4/2002 | Boesch et al. |
| 6,374,078 B1 | 4/2002 | Williams et al. |
| 6,374,124 B1 | 4/2002 | Slabinski |
| 6,389,010 B1 | 5/2002 | Kubler et al. |
| 6,400,318 B1 | 6/2002 | Kasami et al. |
| 6,400,418 B1 | 6/2002 | Wakabayashi |
| 6,404,775 B1 | 6/2002 | Leslie et al. |
| 6,405,018 B1 | 6/2002 | Reudink et al. |
| 6,405,058 B2 | 6/2002 | Bobier |
| 6,405,308 B1 | 6/2002 | Gupta et al. |
| 6,414,624 B2 | 7/2002 | Endo et al. |
| 6,415,132 B1 | 7/2002 | Sabat, Jr. |
| 6,421,327 B1 | 7/2002 | Lundby et al. |
| 6,438,301 B1 | 8/2002 | Johnson et al. |
| 6,438,371 B1 | 8/2002 | Fujise et al. |
| 6,448,558 B1 | 9/2002 | Greene |
| 6,452,915 B1 | 9/2002 | Jorgensen |
| 6,459,519 B1 | 10/2002 | Sasai et al. |
| 6,459,989 B1 | 10/2002 | Kirkpatrick et al. |
| 6,477,154 B1 | 11/2002 | Cheong et al. |
| 6,480,702 B1 | 11/2002 | Sabat, Jr. |
| 6,486,907 B1 | 11/2002 | Farber et al. |
| 6,496,290 B1 | 12/2002 | Lee |
| 6,501,965 B1 | 12/2002 | Lucidarme |
| 6,504,636 B1 | 1/2003 | Seto et al. |
| 6,504,831 B1 | 1/2003 | Greenwood et al. |
| 6,512,478 B1 | 1/2003 | Chien |
| 6,519,395 B1 | 2/2003 | Bevan et al. |
| 6,519,449 B1 | 2/2003 | Zhang et al. |
| 6,525,855 B1 | 2/2003 | Westbrook et al. |
| 6,535,330 B1 | 3/2003 | Lelic et al. |
| 6,535,720 B1 | 3/2003 | Kintis et al. |
| 6,553,239 B1 | 4/2003 | Langston |
| 6,556,551 B1 | 4/2003 | Schwartz |
| 6,577,794 B1 | 6/2003 | Currie et al. |
| 6,577,801 B2 | 6/2003 | Broderick et al. |
| 6,580,393 B2 | 6/2003 | Holt |
| 6,580,402 B2 | 6/2003 | Navarro et al. |
| 6,580,905 B1 | 6/2003 | Naidu et al. |
| 6,580,918 B1 | 6/2003 | Leickel et al. |
| 6,583,763 B2 | 6/2003 | Judd |
| 6,587,514 B1 | 7/2003 | Wright et al. |
| 6,594,496 B2 | 7/2003 | Schwartz |
| 6,597,325 B2 | 7/2003 | Judd et al. |
| 6,598,009 B2 | 7/2003 | Yang |
| 6,606,430 B2 | 8/2003 | Bartur et al. |
| 6,615,074 B2 | 9/2003 | Mickle et al. |
| 6,628,732 B1 | 9/2003 | Takaki |
| 6,634,811 B1 | 10/2003 | Gertel et al. |
| 6,636,747 B2 | 10/2003 | Harada et al. |
| 6,640,103 B1 | 10/2003 | Inman et al. |
| 6,643,437 B1 | 11/2003 | Park |
| 6,652,158 B2 | 11/2003 | Bartur et al. |
| 6,654,590 B2 | 11/2003 | Boros et al. |
| 6,654,616 B1 | 11/2003 | Pope, Jr. et al. |
| 6,657,535 B1 | 12/2003 | Magbie et al. |
| 6,658,269 B1 | 12/2003 | Golemon et al. |
| 6,665,308 B1 | 12/2003 | Rakib et al. |
| 6,670,930 B2 | 12/2003 | Navarro |
| 6,675,294 B1 | 1/2004 | Gupta et al. |
| 6,678,509 B2 | 1/2004 | Skarman et al. |
| 6,687,437 B1 | 2/2004 | Starnes et al. |
| 6,690,328 B2 | 2/2004 | Judd |
| 6,696,917 B1 | 2/2004 | Heitner et al. |
| 6,697,603 B1 | 2/2004 | Lovinggood et al. |
| 6,704,298 B1 | 3/2004 | Matsumiya et al. |
| 6,704,545 B1 | 3/2004 | Wala |
| 6,710,366 B1 | 3/2004 | Lee et al. |
| 6,714,800 B2 | 3/2004 | Johnson et al. |
| 6,731,880 B2 | 5/2004 | Westbrook et al. |
| 6,745,013 B1 | 6/2004 | Porter et al. |
| 6,758,913 B1 | 7/2004 | Tunney et al. |
| 6,763,226 B1 | 7/2004 | McZeal, Jr. |
| 6,771,862 B2 | 8/2004 | Karnik et al. |
| 6,771,933 B1 | 8/2004 | Eng et al. |
| 6,784,802 B1 | 8/2004 | Stanescu |
| 6,785,558 B1 | 8/2004 | Stratford et al. |
| 6,788,666 B1 | 9/2004 | Linebarger et al. |
| 6,801,767 B1 | 10/2004 | Schwartz et al. |
| 6,807,374 B1 | 10/2004 | Imajo et al. |
| 6,812,824 B1 | 11/2004 | Goldinger et al. |
| 6,812,905 B2 | 11/2004 | Thomas et al. |
| 6,823,174 B1 | 11/2004 | Masenten et al. |
| 6,826,163 B2 | 11/2004 | Mani et al. |
| 6,826,337 B2 | 11/2004 | Linnell |
| 6,836,660 B1 | 12/2004 | Wala |
| 6,836,673 B1 | 12/2004 | Trott |
| 6,842,433 B2 | 1/2005 | West et al. |
| 6,842,459 B1 | 1/2005 | Binder |
| 6,847,856 B1 | 1/2005 | Bohannon |
| 6,850,510 B2 | 2/2005 | Kubler |
| 6,865,390 B2 | 3/2005 | Goss et al. |
| 6,873,823 B2 | 3/2005 | Hasarchi |
| 6,876,056 B2 | 4/2005 | Tilmans et al. |
| 6,879,290 B1 | 4/2005 | Toutain et al. |
| 6,882,311 B2 | 4/2005 | Walker et al. |
| 6,883,710 B2 | 4/2005 | Chung |
| 6,885,344 B2 | 4/2005 | Mohamadi |
| 6,885,846 B1 | 4/2005 | Panasik et al. |
| 6,889,060 B2 | 5/2005 | Fernando et al. |
| 6,895,249 B2 | 5/2005 | Gaal |
| 6,909,399 B1 | 6/2005 | Zegelin et al. |
| 6,914,539 B2 | 7/2005 | Hoctor et al. |
| 6,915,058 B2 | 7/2005 | Pons |
| 6,915,529 B1 | 7/2005 | Suematsu et al. |

(56) References Cited

U.S. PATENT DOCUMENTS

| | | |
|---|---|---|
| 6,919,858 B2 | 7/2005 | Rofougaran |
| 6,920,330 B2 | 7/2005 | Caronni et al. |
| 6,924,997 B2 | 8/2005 | Chen et al. |
| 6,930,987 B1 | 8/2005 | Fukuda et al. |
| 6,931,183 B2 | 8/2005 | Panak et al. |
| 6,931,659 B1 | 8/2005 | Kinemura |
| 6,933,849 B2 | 8/2005 | Sawyer |
| 6,934,511 B1 | 8/2005 | Lovinggood et al. |
| 6,934,541 B2 | 8/2005 | Miyatani |
| 6,941,112 B2 | 9/2005 | Hasegawa |
| 6,946,989 B2 | 9/2005 | Vavik |
| 6,961,312 B2 | 11/2005 | Kubler et al. |
| 6,963,289 B2 | 11/2005 | Aljadeff et al. |
| 6,963,552 B2 | 11/2005 | Sabat, Jr. et al. |
| 6,965,718 B2 | 11/2005 | Koertel |
| 6,967,347 B2 | 11/2005 | Estes et al. |
| 6,968,107 B2 | 11/2005 | Belardi et al. |
| 6,970,652 B2 | 11/2005 | Zhang et al. |
| 6,973,243 B2 | 12/2005 | Koyasu et al. |
| 6,974,262 B1 | 12/2005 | Rickenbach |
| 6,977,502 B1 | 12/2005 | Hertz |
| 7,002,511 B1 | 2/2006 | Ammar et al. |
| 7,006,039 B2 | 2/2006 | Miyamoto et al. |
| 7,006,465 B2 | 2/2006 | Toshimitsu et al. |
| 7,013,087 B2 | 3/2006 | Suzuki et al. |
| 7,015,826 B1 | 3/2006 | Chan et al. |
| 7,020,473 B2 | 3/2006 | Splett |
| 7,020,488 B1 | 3/2006 | Bleile et al. |
| 7,023,382 B1 | 4/2006 | Akano |
| 7,024,166 B2 | 4/2006 | Wallace |
| 7,035,512 B2 | 4/2006 | Van Bijsterveld |
| 7,035,671 B2 | 4/2006 | Solum |
| 7,039,399 B2 | 5/2006 | Fischer |
| 7,043,271 B1 | 5/2006 | Seto et al. |
| 7,047,028 B2 | 5/2006 | Cagenius et al. |
| 7,050,017 B2 | 5/2006 | King et al. |
| 7,053,838 B2 | 5/2006 | Judd |
| 7,054,513 B2 | 5/2006 | Herz et al. |
| 7,069,577 B2 | 6/2006 | Geile et al. |
| 7,072,586 B2 | 7/2006 | Aburakawa et al. |
| 7,082,320 B2 | 7/2006 | Kattukaran et al. |
| 7,084,769 B2 | 8/2006 | Bauer et al. |
| 7,092,726 B2 | 8/2006 | Shi et al. |
| 7,093,985 B2 | 8/2006 | Lord et al. |
| 7,103,119 B2 | 9/2006 | Matsuoka et al. |
| 7,103,377 B2 | 9/2006 | Bauman et al. |
| 7,106,931 B2 | 9/2006 | Sutehall et al. |
| 7,110,795 B2 | 9/2006 | Doi |
| 7,114,859 B1 | 10/2006 | Tuohimaa et al. |
| 7,123,939 B1 | 10/2006 | Bird et al. |
| 7,127,176 B2 | 10/2006 | Sasaki |
| 7,142,503 B1 | 11/2006 | Grant et al. |
| 7,142,535 B2 | 11/2006 | Kubler et al. |
| 7,142,619 B2 | 11/2006 | Sommer et al. |
| 7,160,032 B2 | 1/2007 | Nagashima et al. |
| 7,171,244 B2 | 1/2007 | Bauman |
| 7,184,728 B2 | 2/2007 | Solum |
| 7,190,748 B2 | 3/2007 | Kim et al. |
| 7,194,023 B2 | 3/2007 | Norrell et al. |
| 7,199,443 B2 | 4/2007 | Elsharawy |
| 7,200,305 B2 | 4/2007 | Dion et al. |
| 7,200,391 B2 | 4/2007 | Chung et al. |
| 7,228,072 B2 | 6/2007 | Mickelsson et al. |
| 7,250,907 B2 | 7/2007 | Krumm et al. |
| 7,263,293 B2 | 8/2007 | Ommodt et al. |
| 7,269,311 B2 | 9/2007 | Kim et al. |
| 7,280,011 B2 | 10/2007 | Bayar et al. |
| 7,286,843 B2 | 10/2007 | Scheck |
| 7,286,854 B2 | 10/2007 | Ferrato et al. |
| 7,295,119 B2 | 11/2007 | Rappaport et al. |
| 7,310,430 B1 | 12/2007 | Mallya et al. |
| 7,313,415 B2 | 12/2007 | Wake et al. |
| 7,315,735 B2 | 1/2008 | Graham |
| 7,324,730 B2 | 1/2008 | Varkey et al. |
| 7,343,164 B2 | 3/2008 | Kallstenius |
| 7,348,843 B1 | 3/2008 | Qiu et al. |
| 7,349,633 B2 | 3/2008 | Lee et al. |
| 7,359,408 B2 | 4/2008 | Kim |
| 7,359,674 B2 | 4/2008 | Markki et al. |
| 7,366,150 B2 | 4/2008 | Lee et al. |
| 7,366,151 B2 | 4/2008 | Kubler et al. |
| 7,369,526 B2 | 5/2008 | Lechleider et al. |
| 7,379,669 B2 | 5/2008 | Kim |
| 7,388,892 B2 | 6/2008 | Nishiyama et al. |
| 7,392,025 B2 | 6/2008 | Rooyen et al. |
| 7,392,029 B2 | 6/2008 | Pronkine |
| 7,394,883 B2 | 7/2008 | Funakubo et al. |
| 7,403,156 B2 | 7/2008 | Coppi et al. |
| 7,409,159 B2 | 8/2008 | Izadpanah |
| 7,412,224 B2 | 8/2008 | Kotola et al. |
| 7,424,228 B1 | 9/2008 | Williams et al. |
| 7,429,951 B2 | 9/2008 | Kennedy, Jr. et al. |
| 7,442,679 B2 | 10/2008 | Stolle et al. |
| 7,444,051 B2 | 10/2008 | Tatat et al. |
| 7,450,853 B2 | 11/2008 | Kim et al. |
| 7,450,854 B2 | 11/2008 | Lee et al. |
| 7,451,365 B2 | 11/2008 | Wang et al. |
| 7,453,363 B2 | 11/2008 | Reynolds |
| 7,454,222 B2 | 11/2008 | Huang et al. |
| 7,460,507 B2 | 12/2008 | Kubler et al. |
| 7,460,829 B2 | 12/2008 | Utsumi et al. |
| 7,460,831 B2 | 12/2008 | Hasarchi |
| 7,466,925 B2 | 12/2008 | Iannelli |
| 7,469,105 B2 | 12/2008 | Wake et al. |
| 7,477,597 B2 | 1/2009 | Segel |
| 7,483,504 B2 | 1/2009 | Shapira et al. |
| 7,483,711 B2 | 1/2009 | Burchfiel |
| 7,496,070 B2 | 2/2009 | Vesuna |
| 7,496,384 B2 | 2/2009 | Seto et al. |
| 7,505,747 B2 | 3/2009 | Solum |
| 7,512,419 B2 | 3/2009 | Solum |
| 7,522,552 B2 | 4/2009 | Fein et al. |
| 7,539,509 B2 | 5/2009 | Bauman et al. |
| 7,542,452 B2 | 6/2009 | Penumetsa |
| 7,546,138 B2 | 6/2009 | Bauman |
| 7,548,138 B2 | 6/2009 | Kamgaing |
| 7,548,695 B2 | 6/2009 | Wake |
| 7,551,641 B2 | 6/2009 | Pirzada et al. |
| 7,557,758 B2 | 7/2009 | Rofougaran |
| 7,580,384 B2 | 8/2009 | Kubler et al. |
| 7,586,861 B2 | 9/2009 | Kubler et al. |
| 7,590,354 B2 | 9/2009 | Sauer et al. |
| 7,593,704 B2 | 9/2009 | Pinel et al. |
| 7,599,420 B2 | 10/2009 | Forenza et al. |
| 7,599,672 B2 | 10/2009 | Shoji et al. |
| 7,610,046 B2 | 10/2009 | Wala |
| 7,627,250 B2 | 12/2009 | George et al. |
| 7,630,690 B2 | 12/2009 | Kaewell, Jr. et al. |
| 7,633,934 B2 | 12/2009 | Kubler et al. |
| 7,639,982 B2 | 12/2009 | Wala |
| 7,646,743 B2 | 1/2010 | Kubler et al. |
| 7,646,777 B2 | 1/2010 | Hicks, III et al. |
| 7,653,397 B2 | 1/2010 | Pemu et al. |
| 7,668,565 B2 | 2/2010 | Ylänen et al. |
| 7,675,936 B2 | 3/2010 | Mizutani et al. |
| 7,688,811 B2 | 3/2010 | Kubler et al. |
| 7,693,486 B2 | 4/2010 | Kasslin et al. |
| 7,697,467 B2 | 4/2010 | Kubler et al. |
| 7,697,574 B2 | 4/2010 | Suematsu et al. |
| 7,715,375 B2 | 5/2010 | Kubler et al. |
| 7,715,722 B1 | 5/2010 | Hoke et al. |
| 7,751,374 B2 | 7/2010 | Donovan |
| 7,751,838 B2 | 7/2010 | Ramesh et al. |
| 7,760,703 B2 | 7/2010 | Kubler et al. |
| 7,768,951 B2 | 8/2010 | Kubler et al. |
| 7,773,573 B2 | 8/2010 | Chung et al. |
| 7,778,603 B2 | 8/2010 | Palin et al. |
| 7,787,823 B2 | 8/2010 | George et al. |
| 7,787,854 B2 | 8/2010 | Conyers et al. |
| 7,809,012 B2 | 10/2010 | Ruuska et al. |
| 7,812,766 B2 | 10/2010 | Leblanc et al. |
| 7,812,775 B2 | 10/2010 | Babakhani et al. |
| 7,817,958 B2 | 10/2010 | Scheinert et al. |
| 7,817,969 B2 | 10/2010 | Castaneda et al. |

(56) References Cited

U.S. PATENT DOCUMENTS

| | | |
|---|---|---|
| 7,835,328 B2 | 11/2010 | Stephens et al. |
| 7,844,273 B2 | 11/2010 | Scheinert |
| 7,848,316 B2 | 12/2010 | Kubler et al. |
| 7,848,731 B1 | 12/2010 | Dianda et al. |
| 7,848,770 B2 | 12/2010 | Scheinert |
| 7,853,234 B2 | 12/2010 | Afsahi |
| 7,870,321 B2 | 1/2011 | Rofougaran |
| 7,880,677 B2 | 2/2011 | Rofougaran et al. |
| 7,881,755 B1 | 2/2011 | Mishra et al. |
| 7,894,423 B2 | 2/2011 | Kubler et al. |
| 7,899,007 B2 | 3/2011 | Kubler et al. |
| 7,907,972 B2 | 3/2011 | Walton et al. |
| 7,912,043 B2 | 3/2011 | Kubler et al. |
| 7,912,506 B2 | 3/2011 | Lovberg et al. |
| 7,916,706 B2 | 3/2011 | Kubler et al. |
| 7,917,177 B2 | 3/2011 | Bauman |
| 7,920,553 B2 | 4/2011 | Kubler et al. |
| 7,920,858 B2 | 4/2011 | Sabat, Jr. et al. |
| 7,924,783 B1 | 4/2011 | Mahany et al. |
| 7,929,940 B1 | 4/2011 | Dianda et al. |
| 7,936,713 B2 | 5/2011 | Kubler et al. |
| 7,948,897 B2 | 5/2011 | Stuart et al. |
| 7,949,364 B2 | 5/2011 | Kasslin et al. |
| 7,957,777 B1 | 6/2011 | Vu et al. |
| 7,962,111 B2 | 6/2011 | Solum |
| 7,969,009 B2 | 6/2011 | Chandrasekaran |
| 7,969,911 B2 | 6/2011 | Mahany et al. |
| 7,990,925 B2 | 8/2011 | Tinnakornsrisuphap et al. |
| 7,996,020 B1 | 8/2011 | Chhabra |
| 8,018,907 B2 | 9/2011 | Kubler et al. |
| 8,023,886 B2 | 9/2011 | Rofougaran |
| 8,027,656 B2 | 9/2011 | Rofougaran et al. |
| 8,031,121 B2 | 10/2011 | Rofougaran et al. |
| 8,036,308 B2 | 10/2011 | Rofougaran |
| 8,082,353 B2 | 12/2011 | Huber et al. |
| 8,086,192 B2 | 12/2011 | Rofougaran et al. |
| 8,107,464 B2 | 1/2012 | Schmidt et al. |
| 8,174,428 B2 | 5/2012 | Wegener |
| 8,274,929 B2 | 9/2012 | Schmidt et al. |
| 8,275,265 B2 | 9/2012 | Kobyakov et al. |
| 8,279,800 B2 | 10/2012 | Schmidt et al. |
| 8,310,963 B2 | 11/2012 | Singh |
| 8,346,091 B2 | 1/2013 | Kummetz et al. |
| 8,422,884 B2 | 4/2013 | Mao |
| 8,467,823 B2 | 6/2013 | Seki et al. |
| 8,548,330 B2 | 10/2013 | Berlin et al. |
| 8,548,526 B2 | 10/2013 | Schmidt et al. |
| 8,583,100 B2 | 11/2013 | Koziy et al. |
| 8,599,794 B2 | 12/2013 | Ahmadi |
| 8,634,766 B2 | 1/2014 | Hobbs et al. |
| 8,676,214 B2 | 3/2014 | Fischer et al. |
| 8,681,917 B2 | 3/2014 | McAllister et al. |
| 8,693,342 B2 | 4/2014 | Uyehara et al. |
| 8,694,034 B2 | 4/2014 | Notargiacomo |
| 8,699,881 B1 | 4/2014 | Iannone |
| 8,699,982 B2 | 4/2014 | Singh |
| 8,737,300 B2 | 5/2014 | Stapleton et al. |
| 8,792,933 B2 | 7/2014 | Chen |
| 8,873,585 B2 | 10/2014 | Oren et al. |
| 8,908,607 B2 | 12/2014 | Kummetz et al. |
| 8,913,892 B2 | 12/2014 | Berlin et al. |
| 8,948,816 B2 | 2/2015 | Fischer et al. |
| 8,958,789 B2 | 2/2015 | Bauman et al. |
| 8,976,067 B2 | 3/2015 | Fischer |
| 9,001,811 B2 | 4/2015 | Wala et al. |
| 9,130,613 B2 | 9/2015 | Oren et al. |
| 9,258,052 B2 | 2/2016 | George et al. |
| 9,432,095 B2 | 8/2016 | Berlin et al. |
| 9,525,472 B2 * | 12/2016 | George ............... H04B 7/0469 |
| 9,531,452 B2 | 12/2016 | George et al. |
| 2001/0036199 A1 | 11/2001 | Terry |
| 2002/0003645 A1 | 1/2002 | Kim et al. |
| 2002/0009070 A1 | 1/2002 | Lindsay et al. |
| 2002/0012495 A1 | 1/2002 | Sasai et al. |
| 2002/0048071 A1 | 4/2002 | Suzuki et al. |
| 2002/0051434 A1 | 5/2002 | Ozluturk et al. |
| 2002/0075906 A1 | 6/2002 | Cole et al. |
| 2002/0085643 A1 | 7/2002 | Kitchener et al. |
| 2002/0092347 A1 | 7/2002 | Niekerk et al. |
| 2002/0111149 A1 | 8/2002 | Shoki |
| 2002/0111192 A1 | 8/2002 | Thomas et al. |
| 2002/0114038 A1 | 8/2002 | Arnon et al. |
| 2002/0123365 A1 | 9/2002 | Thorson et al. |
| 2002/0126967 A1 | 9/2002 | Panak et al. |
| 2002/0128009 A1 | 9/2002 | Boch et al. |
| 2002/0130778 A1 | 9/2002 | Nicholson |
| 2002/0181668 A1 | 12/2002 | Masoian et al. |
| 2002/0190845 A1 | 12/2002 | Moore |
| 2003/0002604 A1 | 1/2003 | Fifield et al. |
| 2003/0007214 A1 | 1/2003 | Aburakawa et al. |
| 2003/0016418 A1 | 1/2003 | Westbrook et al. |
| 2003/0045284 A1 | 3/2003 | Copley et al. |
| 2003/0078074 A1 | 4/2003 | Sesay et al. |
| 2003/0112826 A1 | 6/2003 | Ashwood Smith et al. |
| 2003/0141962 A1 | 7/2003 | Barink |
| 2003/0161637 A1 | 8/2003 | Yamamoto et al. |
| 2003/0165287 A1 | 9/2003 | Krill et al. |
| 2003/0174099 A1 | 9/2003 | Bauer et al. |
| 2003/0209601 A1 | 11/2003 | Chung |
| 2004/0001719 A1 | 1/2004 | Sasaki |
| 2004/0008114 A1 | 1/2004 | Sawyer |
| 2004/0017785 A1 | 1/2004 | Zelst |
| 2004/0033076 A1 | 2/2004 | Song et al. |
| 2004/0037565 A1 | 2/2004 | Young et al. |
| 2004/0041714 A1 | 3/2004 | Forster |
| 2004/0043764 A1 | 3/2004 | Bigham et al. |
| 2004/0047313 A1 | 3/2004 | Rumpf et al. |
| 2004/0068751 A1 | 4/2004 | Basawapatna et al. |
| 2004/0078151 A1 | 4/2004 | Aljadeff et al. |
| 2004/0095907 A1 | 5/2004 | Agee et al. |
| 2004/0100930 A1 | 5/2004 | Shapira et al. |
| 2004/0102196 A1 | 5/2004 | Weckstrom et al. |
| 2004/0105435 A1 | 6/2004 | Morioka |
| 2004/0126068 A1 | 7/2004 | Van Bijsterveld |
| 2004/0126107 A1 | 7/2004 | Jay et al. |
| 2004/0139477 A1 | 7/2004 | Russell et al. |
| 2004/0146020 A1 | 7/2004 | Kubler et al. |
| 2004/0149736 A1 | 8/2004 | Clothier |
| 2004/0151164 A1 | 8/2004 | Kubler et al. |
| 2004/0151503 A1 | 8/2004 | Kashima et al. |
| 2004/0157623 A1 | 8/2004 | Splett |
| 2004/0160912 A1 | 8/2004 | Kubler et al. |
| 2004/0160913 A1 | 8/2004 | Kubler et al. |
| 2004/0162084 A1 | 8/2004 | Wang |
| 2004/0162115 A1 | 8/2004 | Smith et al. |
| 2004/0162116 A1 | 8/2004 | Han et al. |
| 2004/0164902 A1 | 8/2004 | Karlsson et al. |
| 2004/0165568 A1 | 8/2004 | Weinstein |
| 2004/0165573 A1 | 8/2004 | Kubler et al. |
| 2004/0175173 A1 | 9/2004 | Deas |
| 2004/0196404 A1 | 10/2004 | Loheit et al. |
| 2004/0202257 A1 | 10/2004 | Mehta et al. |
| 2004/0203703 A1 | 10/2004 | Fischer |
| 2004/0203704 A1 | 10/2004 | Ommodt et al. |
| 2004/0203846 A1 | 10/2004 | Caronni et al. |
| 2004/0204109 A1 | 10/2004 | Hoppenstein |
| 2004/0208526 A1 | 10/2004 | Mibu |
| 2004/0208643 A1 | 10/2004 | Roberts et al. |
| 2004/0218873 A1 | 11/2004 | Nagashima et al. |
| 2004/0233877 A1 | 11/2004 | Lee et al. |
| 2004/0258105 A1 | 12/2004 | Spathas et al. |
| 2005/0041693 A1 | 2/2005 | Priotti |
| 2005/0052287 A1 | 3/2005 | Whitesmith et al. |
| 2005/0058451 A1 | 3/2005 | Ross |
| 2005/0068179 A1 | 3/2005 | Roesner |
| 2005/0076982 A1 | 4/2005 | Metcalf et al. |
| 2005/0078006 A1 | 4/2005 | Hutchins |
| 2005/0093679 A1 | 5/2005 | Zai et al. |
| 2005/0099343 A1 | 5/2005 | Asrani et al. |
| 2005/0116821 A1 | 6/2005 | Wilsey et al. |
| 2005/0123232 A1 | 6/2005 | Piede et al. |
| 2005/0141545 A1 | 6/2005 | Fein et al. |
| 2005/0143077 A1 | 6/2005 | Charbonneau |
| 2005/0147071 A1 | 7/2005 | Karaoguz et al. |

(56) References Cited

U.S. PATENT DOCUMENTS

| | | |
|---|---|---|
| 2005/0148306 A1 | 7/2005 | Hiddink |
| 2005/0159108 A1 | 7/2005 | Fletcher |
| 2005/0174236 A1 | 8/2005 | Brookner |
| 2005/0176458 A1 | 8/2005 | Shklarsky et al. |
| 2005/0201761 A1 | 9/2005 | Bartur et al. |
| 2005/0219050 A1 | 10/2005 | Martin |
| 2005/0224585 A1 | 10/2005 | Durrant et al. |
| 2005/0226625 A1 | 10/2005 | Wake et al. |
| 2005/0232636 A1 | 10/2005 | Durrant et al. |
| 2005/0242188 A1 | 11/2005 | Vesuna |
| 2005/0252971 A1 | 11/2005 | Howarth et al. |
| 2005/0266797 A1 | 12/2005 | Utsumi et al. |
| 2005/0266854 A1 | 12/2005 | Niiho et al. |
| 2005/0269930 A1 | 12/2005 | Shimizu et al. |
| 2005/0271396 A1 | 12/2005 | Iannelli |
| 2005/0272439 A1 | 12/2005 | Picciriello et al. |
| 2006/0002326 A1 | 1/2006 | Vesuna |
| 2006/0014548 A1 | 1/2006 | Bolin |
| 2006/0017633 A1 | 1/2006 | Pronkine |
| 2006/0025101 A1 | 2/2006 | Li |
| 2006/0028352 A1 | 2/2006 | McNamara et al. |
| 2006/0045054 A1 | 3/2006 | Utsumi et al. |
| 2006/0046662 A1 | 3/2006 | Moulsley et al. |
| 2006/0056283 A1 | 3/2006 | Anikhindi et al. |
| 2006/0056327 A1 | 3/2006 | Coersmeier |
| 2006/0062579 A1 | 3/2006 | Kim et al. |
| 2006/0063494 A1 | 3/2006 | Zhang et al. |
| 2006/0094470 A1 | 5/2006 | Wake et al. |
| 2006/0104643 A1 | 5/2006 | Lee et al. |
| 2006/0120395 A1 | 6/2006 | Xing et al. |
| 2006/0128425 A1 | 6/2006 | Rooyen |
| 2006/0159388 A1 | 7/2006 | Kawase et al. |
| 2006/0182446 A1 | 8/2006 | Kim et al. |
| 2006/0182449 A1 | 8/2006 | Iannelli et al. |
| 2006/0189280 A1 | 8/2006 | Goldberg |
| 2006/0189354 A1 | 8/2006 | Lee et al. |
| 2006/0203836 A1 | 9/2006 | Kim |
| 2006/0217132 A1 | 9/2006 | Drummond-Murray et al. |
| 2006/0223439 A1 | 10/2006 | Pinel et al. |
| 2006/0233506 A1 | 10/2006 | Noonan et al. |
| 2006/0239630 A1 | 10/2006 | Hase et al. |
| 2006/0262014 A1 | 11/2006 | Shemesh et al. |
| 2006/0268738 A1 | 11/2006 | Goerke et al. |
| 2006/0274704 A1 | 12/2006 | Desai et al. |
| 2006/0276227 A1 | 12/2006 | Dravida |
| 2007/0008939 A1 | 1/2007 | Fischer |
| 2007/0009266 A1 | 1/2007 | Bothwell |
| 2007/0040687 A1 | 2/2007 | Reynolds |
| 2007/0054682 A1 | 3/2007 | Fanning et al. |
| 2007/0058978 A1 | 3/2007 | Lee et al. |
| 2007/0060045 A1 | 3/2007 | Prautzsch |
| 2007/0060055 A1 | 3/2007 | Desai et al. |
| 2007/0071128 A1 | 3/2007 | Meir et al. |
| 2007/0072646 A1 | 3/2007 | Kuwahara et al. |
| 2007/0076649 A1 | 4/2007 | Lin et al. |
| 2007/0093273 A1 | 4/2007 | Cai |
| 2007/0099578 A1* | 5/2007 | Adeney ............... H04B 7/0408 455/69 |
| 2007/0104165 A1 | 5/2007 | Hanaoka et al. |
| 2007/0135169 A1 | 6/2007 | Sychaleun et al. |
| 2007/0149250 A1 | 6/2007 | Crozzoli et al. |
| 2007/0155314 A1 | 7/2007 | Mohebbi |
| 2007/0166042 A1 | 7/2007 | Seeds et al. |
| 2007/0173288 A1 | 7/2007 | Skarby et al. |
| 2007/0182626 A1 | 8/2007 | Samavati et al. |
| 2007/0184841 A1 | 8/2007 | Choi et al. |
| 2007/0224954 A1 | 9/2007 | Gopi |
| 2007/0243899 A1 | 10/2007 | Hermel et al. |
| 2007/0248358 A1 | 10/2007 | Sauer |
| 2007/0253714 A1 | 11/2007 | Seeds et al. |
| 2007/0257796 A1 | 11/2007 | Easton et al. |
| 2007/0264009 A1 | 11/2007 | Sabat, Jr. et al. |
| 2007/0264011 A1 | 11/2007 | Sone et al. |
| 2007/0268846 A1 | 11/2007 | Proctor et al. |
| 2007/0274279 A1 | 11/2007 | Wood et al. |
| 2007/0280159 A1* | 12/2007 | Liu ........................ H04W 28/08 370/330 |
| 2007/0280370 A1 | 12/2007 | Liu |
| 2007/0292143 A1 | 12/2007 | Yu et al. |
| 2007/0297005 A1 | 12/2007 | Montierth et al. |
| 2008/0002652 A1 | 1/2008 | Gupta et al. |
| 2008/0005219 A1 | 1/2008 | Nabar et al. |
| 2008/0007453 A1 | 1/2008 | Vassilakis et al. |
| 2008/0008134 A1 | 1/2008 | Satou et al. |
| 2008/0013473 A1 | 1/2008 | Proctor, Jr. et al. |
| 2008/0013909 A1 | 1/2008 | Kostet et al. |
| 2008/0013956 A1 | 1/2008 | Ware et al. |
| 2008/0013957 A1 | 1/2008 | Akers et al. |
| 2008/0014948 A1 | 1/2008 | Scheinert |
| 2008/0026765 A1 | 1/2008 | Charbonneau |
| 2008/0031628 A1 | 2/2008 | Dragas et al. |
| 2008/0043714 A1 | 2/2008 | Pernu |
| 2008/0056167 A1 | 3/2008 | Kim et al. |
| 2008/0058018 A1 | 3/2008 | Scheinert |
| 2008/0063397 A1 | 3/2008 | Hu et al. |
| 2008/0070502 A1 | 3/2008 | George et al. |
| 2008/0080863 A1 | 4/2008 | Sauer et al. |
| 2008/0084951 A1 | 4/2008 | Chen et al. |
| 2008/0089692 A1 | 4/2008 | Sorin |
| 2008/0089699 A1 | 4/2008 | Li et al. |
| 2008/0098203 A1 | 4/2008 | Master et al. |
| 2008/0107202 A1 | 5/2008 | Lee et al. |
| 2008/0118014 A1 | 5/2008 | Reunamaki et al. |
| 2008/0119198 A1 | 5/2008 | Hettstedt et al. |
| 2008/0124086 A1 | 5/2008 | Matthews |
| 2008/0124087 A1 | 5/2008 | Hartmann et al. |
| 2008/0129594 A1 | 6/2008 | Pera et al. |
| 2008/0129634 A1 | 6/2008 | Pera et al. |
| 2008/0134194 A1 | 6/2008 | Liu |
| 2008/0145061 A1 | 6/2008 | Lee et al. |
| 2008/0150514 A1 | 6/2008 | Codreanu et al. |
| 2008/0166094 A1 | 7/2008 | Bookbinder et al. |
| 2008/0194226 A1 | 8/2008 | Rivas et al. |
| 2008/0207253 A1 | 8/2008 | Jaakkola et al. |
| 2008/0212969 A1 | 9/2008 | Fasshauer et al. |
| 2008/0219670 A1 | 9/2008 | Kim et al. |
| 2008/0232305 A1 | 9/2008 | Oren et al. |
| 2008/0232799 A1 | 9/2008 | Kim |
| 2008/0233967 A1 | 9/2008 | Montojo et al. |
| 2008/0247716 A1 | 10/2008 | Thomas |
| 2008/0253280 A1 | 10/2008 | Tang et al. |
| 2008/0253351 A1 | 10/2008 | Pernu et al. |
| 2008/0253773 A1 | 10/2008 | Zheng |
| 2008/0260388 A1 | 10/2008 | Kim et al. |
| 2008/0261656 A1 | 10/2008 | Bella et al. |
| 2008/0268766 A1 | 10/2008 | Narkman et al. |
| 2008/0268833 A1 | 10/2008 | Huang et al. |
| 2008/0273844 A1 | 11/2008 | Kewitsch |
| 2008/0279137 A1 | 11/2008 | Pernu et al. |
| 2008/0280569 A1 | 11/2008 | Hazani et al. |
| 2008/0291818 A1 | 11/2008 | Leisten |
| 2008/0291830 A1 | 11/2008 | Pernu et al. |
| 2008/0292322 A1 | 11/2008 | Daghighian et al. |
| 2008/0298813 A1 | 12/2008 | Song et al. |
| 2008/0304831 A1 | 12/2008 | Miller, II et al. |
| 2008/0310464 A1 | 12/2008 | Schneider |
| 2008/0310848 A1 | 12/2008 | Yasuda et al. |
| 2008/0311876 A1 | 12/2008 | Leenaerts et al. |
| 2009/0022304 A1 | 1/2009 | Kubler et al. |
| 2009/0028087 A1 | 1/2009 | Nguyen et al. |
| 2009/0028317 A1 | 1/2009 | Ling et al. |
| 2009/0041413 A1 | 2/2009 | Hurley |
| 2009/0047023 A1 | 2/2009 | Pescod et al. |
| 2009/0059903 A1 | 3/2009 | Kubler et al. |
| 2009/0061796 A1 | 3/2009 | Arkko et al. |
| 2009/0061939 A1 | 3/2009 | Andersson et al. |
| 2009/0073916 A1 | 3/2009 | Zhang et al. |
| 2009/0087179 A1 | 4/2009 | Underwood et al. |
| 2009/0088071 A1 | 4/2009 | Rofougaran |
| 2009/0092073 A1 | 4/2009 | Doppler et al. |
| 2009/0135078 A1 | 5/2009 | Lindmark et al. |
| 2009/0141780 A1 | 6/2009 | Cruz-Albrecht et al. |
| 2009/0149221 A1 | 6/2009 | Liu et al. |
| 2009/0154621 A1 | 6/2009 | Shapira et al. |

(56) References Cited

U.S. PATENT DOCUMENTS

| | | |
|---|---|---|
| 2009/0169163 A1 | 7/2009 | Abbott, III et al. |
| 2009/0175214 A1 | 7/2009 | Sfar et al. |
| 2009/0180407 A1 | 7/2009 | Sabat et al. |
| 2009/0218407 A1 | 9/2009 | Rofougaran |
| 2009/0218657 A1 | 9/2009 | Rofougaran |
| 2009/0237317 A1 | 9/2009 | Rofougaran |
| 2009/0239521 A1 | 9/2009 | Mohebbi |
| 2009/0245084 A1 | 10/2009 | Moffatt et al. |
| 2009/0245153 A1 | 10/2009 | Li et al. |
| 2009/0245221 A1 | 10/2009 | Piipponen |
| 2009/0247109 A1 | 10/2009 | Rofougaran |
| 2009/0252136 A1 | 10/2009 | Mahany et al. |
| 2009/0252204 A1 | 10/2009 | Shatara et al. |
| 2009/0252205 A1 | 10/2009 | Rheinfelder et al. |
| 2009/0258652 A1 | 10/2009 | Lambert et al. |
| 2009/0278596 A1 | 11/2009 | Rofougaran et al. |
| 2009/0279593 A1 | 11/2009 | Rofougaran et al. |
| 2009/0285147 A1 | 11/2009 | Subasic et al. |
| 2009/0316609 A1 | 12/2009 | Singh |
| 2010/0002626 A1 | 1/2010 | Schmidt et al. |
| 2010/0027443 A1 | 2/2010 | LoGalbo et al. |
| 2010/0056200 A1 | 3/2010 | Tolonen |
| 2010/0080154 A1 | 4/2010 | Noh et al. |
| 2010/0080182 A1 | 4/2010 | Kubler et al. |
| 2010/0091475 A1 | 4/2010 | Toms et al. |
| 2010/0118864 A1 | 5/2010 | Kubler et al. |
| 2010/0127937 A1 | 5/2010 | Chandrasekaran et al. |
| 2010/0134257 A1 | 6/2010 | Puleston et al. |
| 2010/0142598 A1 | 6/2010 | Murray et al. |
| 2010/0142955 A1 | 6/2010 | Yu et al. |
| 2010/0144285 A1 | 6/2010 | Behzad et al. |
| 2010/0148373 A1 | 6/2010 | Chandrasekaran |
| 2010/0150060 A1 | 6/2010 | Vitek |
| 2010/0156721 A1 | 6/2010 | Alamouti et al. |
| 2010/0159859 A1 | 6/2010 | Rofougaran |
| 2010/0188998 A1 | 7/2010 | Pernu et al. |
| 2010/0190509 A1 | 7/2010 | Davis |
| 2010/0202326 A1 | 8/2010 | Rofougaran et al. |
| 2010/0225413 A1 | 9/2010 | Rofougaran et al. |
| 2010/0225520 A1 | 9/2010 | Mohamadi et al. |
| 2010/0225556 A1 | 9/2010 | Rofougaran et al. |
| 2010/0225557 A1 | 9/2010 | Rofougaran et al. |
| 2010/0232323 A1 | 9/2010 | Kubler et al. |
| 2010/0246541 A9 | 9/2010 | Kim |
| 2010/0246558 A1 | 9/2010 | Harel |
| 2010/0255774 A1 | 10/2010 | Kenington |
| 2010/0258949 A1 | 10/2010 | Henderson et al. |
| 2010/0260063 A1 | 10/2010 | Kubler et al. |
| 2010/0261501 A1 | 10/2010 | Behzad et al. |
| 2010/0265874 A1 | 10/2010 | Palanki et al. |
| 2010/0284323 A1 | 11/2010 | Tang et al. |
| 2010/0290355 A1 | 11/2010 | Roy et al. |
| 2010/0309049 A1 | 12/2010 | Reunamäki et al. |
| 2010/0311472 A1 | 12/2010 | Rofougaran et al. |
| 2010/0311480 A1 | 12/2010 | Raines et al. |
| 2010/0329161 A1 | 12/2010 | Ylanen et al. |
| 2010/0329166 A1 | 12/2010 | Mahany et al. |
| 2011/0007724 A1 | 1/2011 | Mahany et al. |
| 2011/0007733 A1 | 1/2011 | Kubler et al. |
| 2011/0008042 A1 | 1/2011 | Stewart |
| 2011/0013904 A1 | 1/2011 | Khermosh et al. |
| 2011/0019999 A1 | 1/2011 | George et al. |
| 2011/0021146 A1 | 1/2011 | Pernu |
| 2011/0021224 A1 | 1/2011 | Koskinen et al. |
| 2011/0022616 A1 | 1/2011 | Hardin |
| 2011/0026932 A1 | 2/2011 | Yeh et al. |
| 2011/0065450 A1 | 3/2011 | Kazmi |
| 2011/0066774 A1 | 3/2011 | Rofougaran |
| 2011/0069668 A1 | 3/2011 | Chion et al. |
| 2011/0071734 A1 | 3/2011 | Van Wiemeersch et al. |
| 2011/0086614 A1 | 4/2011 | Brisebois et al. |
| 2011/0116572 A1 | 5/2011 | Lee et al. |
| 2011/0122912 A1 | 5/2011 | Benjamin et al. |
| 2011/0126071 A1 | 5/2011 | Han et al. |
| 2011/0135308 A1 | 6/2011 | Tarlazzi et al. |
| 2011/0149879 A1 | 6/2011 | Noriega et al. |
| 2011/0158298 A1 | 6/2011 | Djadi et al. |
| 2011/0182230 A1 | 7/2011 | Ohm et al. |
| 2011/0194475 A1 | 8/2011 | Kim et al. |
| 2011/0200325 A1 | 8/2011 | Kobyakov et al. |
| 2011/0201368 A1 | 8/2011 | Faccin et al. |
| 2011/0204504 A1 | 8/2011 | Henderson et al. |
| 2011/0206383 A1 | 8/2011 | Chien et al. |
| 2011/0211439 A1 | 9/2011 | Manpuria et al. |
| 2011/0215901 A1 | 9/2011 | Van Wiemeersch et al. |
| 2011/0222415 A1 | 9/2011 | Ramamurthi et al. |
| 2011/0222434 A1 | 9/2011 | Chen |
| 2011/0222616 A1 | 9/2011 | Jiang et al. |
| 2011/0222619 A1 | 9/2011 | Ramamurthi et al. |
| 2011/0223958 A1 | 9/2011 | Chen et al. |
| 2011/0223960 A1 | 9/2011 | Chen et al. |
| 2011/0223961 A1 | 9/2011 | Chen et al. |
| 2011/0227795 A1 | 9/2011 | Lopez et al. |
| 2011/0243201 A1 | 10/2011 | Phillips et al. |
| 2011/0244887 A1 | 10/2011 | Dupray et al. |
| 2011/0256878 A1 | 10/2011 | Zhu et al. |
| 2011/0268033 A1 | 11/2011 | Boldi et al. |
| 2011/0268446 A1 | 11/2011 | Cune et al. |
| 2011/0274021 A1 | 11/2011 | He et al. |
| 2011/0274433 A1 | 11/2011 | Presi et al. |
| 2011/0281536 A1 | 11/2011 | Lee et al. |
| 2011/0305284 A1* | 12/2011 | Mueck ............... H04B 7/0413 375/260 |
| 2012/0002750 A1 | 1/2012 | Hooli et al. |
| 2012/0046039 A1 | 2/2012 | Hagerman et al. |
| 2012/0087670 A1 | 4/2012 | Han et al. |
| 2012/0140660 A1 | 6/2012 | Kang et al. |
| 2012/0170542 A1 | 7/2012 | Zangi |
| 2012/0177026 A1 | 7/2012 | Uyehara et al. |
| 2012/0208581 A1 | 8/2012 | Ishida et al. |
| 2012/0213111 A1* | 8/2012 | Shimezawa ............ H04B 7/063 370/252 |
| 2012/0243513 A1 | 9/2012 | Fujishima et al. |
| 2012/0281565 A1 | 11/2012 | Sauer |
| 2012/0314797 A1 | 12/2012 | Kummetz et al. |
| 2012/0327800 A1 | 12/2012 | Kim et al. |
| 2013/0017863 A1 | 1/2013 | Kummetz et al. |
| 2013/0095875 A1* | 4/2013 | Reuven ................. H04B 7/10 455/509 |
| 2013/0101005 A1* | 4/2013 | Aryanfar ............. H04B 5/0025 375/224 |
| 2013/0150063 A1 | 6/2013 | Berlin et al. |
| 2013/0195000 A1* | 8/2013 | Shen .................... H04B 7/024 370/312 |
| 2013/0235962 A1* | 9/2013 | O'Keefe .............. H01Q 3/267 375/371 |
| 2013/0343765 A1 | 12/2013 | Rohde et al. |
| 2014/0078920 A1* | 3/2014 | Tandra ................ H04L 25/022 370/252 |
| 2014/0126914 A1 | 5/2014 | Berlin et al. |
| 2014/0211875 A1 | 7/2014 | Berlin et al. |
| 2014/0226698 A1* | 8/2014 | Negus ................. H04B 7/0486 375/211 |
| 2014/0269859 A1 | 9/2014 | Hanson et al. |
| 2014/0314061 A1 | 10/2014 | Trajkovic et al. |
| 2015/0003565 A1* | 1/2015 | George ............... H04B 7/0413 375/299 |
| 2015/0023283 A1 | 1/2015 | Liu et al. |
| 2015/0098351 A1 | 4/2015 | Zavadsky et al. |
| 2015/0098372 A1 | 4/2015 | Zavadksy et al. |
| 2015/0098419 A1 | 4/2015 | Zavadsky et al. |
| 2015/0256237 A1 | 9/2015 | George et al. |
| 2016/0036505 A1 | 2/2016 | George et al. |
| 2016/0134348 A1 | 5/2016 | George et al. |
| 2016/0173223 A1 | 6/2016 | Rosenfelder et al. |

FOREIGN PATENT DOCUMENTS

| | | |
|---|---|---|
| CA | 2065090 C | 2/1998 |
| CA | 2242707 A1 | 1/1999 |
| DE | 20104862 U1 | 8/2001 |
| DE | 10249414 A1 | 5/2004 |
| EP | 0355328 A2 | 2/1990 |

(56) References Cited

FOREIGN PATENT DOCUMENTS

| | | |
|---|---|---|
| EP | 0477952 A2 | 4/1992 |
| EP | 0477952 A3 | 4/1992 |
| EP | 0709974 A1 | 5/1996 |
| EP | 0461583 B1 | 3/1997 |
| EP | 851618 A2 | 7/1998 |
| EP | 0687400 B1 | 11/1998 |
| EP | 0938204 A1 | 8/1999 |
| EP | 0993124 A2 | 4/2000 |
| EP | 1037411 A2 | 9/2000 |
| EP | 1085684 A2 | 3/2001 |
| EP | 1179895 A1 | 2/2002 |
| EP | 1267447 A1 | 12/2002 |
| EP | 1347584 A2 | 9/2003 |
| EP | 1363352 A1 | 11/2003 |
| EP | 1391897 A1 | 2/2004 |
| EP | 1443687 A1 | 8/2004 |
| EP | 1455550 A2 | 9/2004 |
| EP | 1501206 A1 | 1/2005 |
| EP | 1503451 A1 | 2/2005 |
| EP | 1530316 A1 | 5/2005 |
| EP | 1511203 B1 | 3/2006 |
| EP | 1267447 B1 | 8/2006 |
| EP | 1693974 A1 | 8/2006 |
| EP | 1742388 A1 | 1/2007 |
| EP | 1227605 B1 | 1/2008 |
| EP | 1954019 A1 | 8/2008 |
| EP | 1968250 A1 | 9/2008 |
| EP | 1056226 B1 | 4/2009 |
| EP | 1357683 B1 | 5/2009 |
| EP | 2219310 A1 | 8/2010 |
| GB | 2313020 A | 11/1997 |
| GB | 2323252 A | 9/1998 |
| GB | 2399963 A | 9/2004 |
| GB | 2428149 A | 1/2007 |
| JP | H4189036 A | 7/1992 |
| JP | 05252559 A | 9/1993 |
| JP | 05260018 A | 10/1993 |
| JP | 05327569 A | 12/1993 |
| JP | 05327576 A | 12/1993 |
| JP | 09083450 A | 3/1997 |
| JP | 09162810 A | 6/1997 |
| JP | 09200840 A | 7/1997 |
| JP | 11068675 A | 3/1999 |
| JP | 2000152300 A | 5/2000 |
| JP | 2000341744 A | 12/2000 |
| JP | 2002264617 A | 9/2002 |
| JP | 2002353813 A | 12/2002 |
| JP | 2003148653 A | 5/2003 |
| JP | 2003172827 A | 6/2003 |
| JP | 2004172734 A | 6/2004 |
| JP | 2004245963 A | 9/2004 |
| JP | 2004247090 A | 9/2004 |
| JP | 2004264901 A | 9/2004 |
| JP | 2004265624 A | 9/2004 |
| JP | 2004317737 A | 11/2004 |
| JP | 2004349184 A | 12/2004 |
| JP | 2005018175 A | 1/2005 |
| JP | 2005087135 A | 4/2005 |
| JP | 2005134125 A | 5/2005 |
| JP | 2007228603 A | 9/2007 |
| JP | 2008172597 A | 7/2008 |
| KR | 20010055088 A | 7/2001 |
| KR | 20110087949 A | 8/2011 |
| WO | 9603823 A1 | 2/1996 |
| WO | 9613102 A1 | 5/1996 |
| WO | 9804054 A1 | 1/1998 |
| WO | 9810600 A1 | 3/1998 |
| WO | 00042721 A1 | 7/2000 |
| WO | 0072475 A1 | 11/2000 |
| WO | 0178434 A1 | 10/2001 |
| WO | 0184760 A1 | 11/2001 |
| WO | 0186755 A2 | 11/2001 |
| WO | 0221183 A1 | 3/2002 |
| WO | 0230141 A1 | 4/2002 |
| WO | 02091618 A1 | 11/2002 |
| WO | 02102102 A1 | 12/2002 |
| WO | 03024027 A1 | 3/2003 |
| WO | 03098175 A1 | 11/2003 |
| WO | 2004030154 A2 | 4/2004 |
| WO | 2004047472 A1 | 6/2004 |
| WO | 2004056019 A1 | 7/2004 |
| WO | 2004059934 A1 | 7/2004 |
| WO | 2004086795 A2 | 10/2004 |
| WO | 2004093471 A2 | 10/2004 |
| WO | 2004107783 A1 | 12/2004 |
| WO | 2005062505 A1 | 7/2005 |
| WO | 2005069203 A2 | 7/2005 |
| WO | 2005073897 A1 | 8/2005 |
| WO | 2005079386 A2 | 9/2005 |
| WO | 2005101701 A2 | 10/2005 |
| WO | 2005111959 A2 | 11/2005 |
| WO | 2006011778 A1 | 2/2006 |
| WO | 2006018592 A1 | 2/2006 |
| WO | 2006019392 A1 | 2/2006 |
| WO | 2006039941 A1 | 4/2006 |
| WO | 2006051262 A1 | 5/2006 |
| WO | 2006060754 A2 | 6/2006 |
| WO | 2006094441 A1 | 9/2006 |
| WO | 2006105185 A2 | 10/2006 |
| WO | 2006133609 A1 | 12/2006 |
| WO | 2006136811 A1 | 12/2006 |
| WO | 2007048427 A1 | 5/2007 |
| WO | 2007075579 A2 | 7/2007 |
| WO | 2007077451 A1 | 7/2007 |
| WO | 2007088561 A1 | 8/2007 |
| WO | 2007091026 A1 | 8/2007 |
| WO | 2007133630 A2 | 11/2007 |
| WO | 2008008249 A2 | 1/2008 |
| WO | 2008027213 A2 | 3/2008 |
| WO | 2008033298 A2 | 3/2008 |
| WO | 2008039830 A2 | 4/2008 |
| WO | 2008116014 A2 | 9/2008 |
| WO | 2006046088 A1 | 5/2009 |
| WO | 2009100395 A1 | 8/2009 |
| WO | 2009100396 A1 | 8/2009 |
| WO | 2009100397 A2 | 8/2009 |
| WO | 2009100398 A2 | 8/2009 |
| WO | 2010087919 A2 | 8/2010 |
| WO | 2010090999 A1 | 8/2010 |
| WO | 2010132739 A1 | 11/2010 |
| WO | 2011005162 A1 | 1/2011 |
| WO | 2011043172 A1 | 4/2011 |
| WO | 2011100095 A1 | 8/2011 |
| WO | 2011112373 A1 | 9/2011 |
| WO | 2011139939 A1 | 11/2011 |
| WO | 2011158302 A1 | 12/2011 |
| WO | 2011160117 A1 | 12/2011 |
| WO | 2012024345 A2 | 2/2012 |
| WO | 2012054553 A1 | 4/2012 |
| WO | 2012148256 A1 | 11/2012 |
| WO | 2012148938 A1 | 11/2012 |
| WO | 2012148940 A1 | 11/2012 |
| WO | 2012170865 A2 | 12/2012 |
| WO | 2013009283 A1 | 1/2013 |
| WO | 2013009835 A1 | 1/2013 |
| WO | 2014070236 A1 | 5/2014 |
| WO | 2014082070 A1 | 5/2014 |
| WO | 2014082072 A1 | 5/2014 |
| WO | 2014082075 A1 | 5/2014 |
| WO | 2014144314 A1 | 9/2014 |
| WO | 2015054162 A1 | 4/2015 |
| WO | 2015054164 A1 | 4/2015 |
| WO | 2015054165 A1 | 4/2015 |

OTHER PUBLICATIONS

Bo Zhang et al., "Reconfigurable Multifunctional Operation Using Optical Injection-Locked Vertical-Cavity Surface-Emitting Lasers," Journal of Lightwave Technology, vol. 27, No. 15, Aug. 2009, 6 pages.

Chang-Hasnain, et al., "Ultrahigh-speed laser modulation by injection locking," Chapter 6, Optical Fiber Telecommunication V A: Components and Subsystems, Elsevier Inc., 2008, 20 pages.

(56) References Cited

OTHER PUBLICATIONS

Cheng Zhang et al., "60 GHz Millimeter-wave Generation by Two-mode Injection-locked Fabry-Perot Laser Using Second-Order Sideband Injection in Radio-over-Fiber System," Conference on Lasers and Electro-Optics and Quantum Electronics, Optical Society of America, May 2008, 2 pages.
Chrostowski, "Optical Injection Locking of Vertical Cavity Surface Emitting Lasers," Fall 2003, PhD dissertation University of California at Berkely, 122 pages.
Dang et al., "Radio-over-Fiber based architecture for seamless wireless indoor communication in the 60GHz band," Computer Communications, Elsevier B.V., Amsterdam, NL, vol. 30, Sep. 8, 2007, pp. 3598-3613.
Hyuk-Kee Sung et al., "Optical Single Sideband Modulation Using Strong Optical Injection-Locked Semiconductor Lasers," IEEE Photonics Technology Letters, vol. 19, No. 13, Jul. 1, 2007, 4 pages.
Lim et al., "Analysis of Optical Carrier-to-Sideband Ratio for Improving Transmission Performance in Fiber-Radio Links," IEEE Transactions of Microwave Theory and Techniques, vol. 54, No. 5, May 2006, 7 pages.
Lu H H et al., "Improvement of radio-on-multimode fiber systems based on light injection and optoelectronic feedback techniques," Optics Communications, vol. 266, No. 2, Elsevier B.V., Oct. 15, 2006, 4 pages.
Pleros et al., "A 60 GHz Radio-Over-Fiber Network Architecture for Seamless Communication With High Mobility," Journal of Lightwave Technology, vol. 27, No. 12, IEEE, Jun. 15, 2009, pp. 1957-1967.
Reza et al., "Degree-of-Polarization-Based PMD Monitoring for Subcarrier-Multiplexed Signals via Equalized Carrier/Sideband Filtering," Journal of Lightwave Technology, vol. 22, No. 4, IEEE, Apr. 2004, 8 pages.
Zhao, "Optical Injection Locking on Vertical-Cavity Surface-Emitting Lasers (VCSELs): Physics and Applications," Fall 2008, PhD dissertation University of California at Berkeley, pp. 1-209.
Advisory Action for U.S. Appl. No. 12/712,758 dated Sep. 16, 2013, 3 pages.
Final Office Action for U.S. Appl. No. 12/712,758 dated May 24, 2013, 17 pages.
Non-final Office Action for U.S. Appl. No. 12/712,758 dated Jan. 10, 2012, 14 pages.
Examination Report for European patent application 07835803.3 dated Aug. 13, 2013, 6 pages.
Extended European Search Report for patent application 10014262.9 dated Mar. 14, 2011, 6 pages.
International Search Report and Written Opinion for PCT/US2012/034853 dated Aug. 6, 2012, 12 pages.
International Search Report and Written Opinion for PCT/US20121034855 dated Jul. 26, 2012, 10 pages.
Written Opinion of the International Searching Authority for European patent application 11701916.6 dated Sep. 21, 2012, 10 pages.
International Search Report for PCT/US2011/021799 dated Apr. 6, 2011, 4 pages.
Notice of Allowance for U.S. Appl. No. 14/962,279, dated May 12, 2017, 8 pages.
Notice of Allowance for U.S. Appl. No. 14/997,694, dated Jul. 5, 2017, 8 pages.
Non-Final Office Action for U.S. Appl. No. 151271,843, dated Jun. 21, 2017, 21 pages.
Lee et al; "Evaluation of 60 GHZ MIMO Channel Capacity in the Conference Room STA-STA Scenario"; 2011 IEEE, 5 Pages.
Sheldon et al; "A 60GHZ Line-of-Sight 2×2 MIMO Link Operating at 1.2GBPS"; IEEE Xplore; IEEE 2008; 4 Pages.
Fan et al; "Spectrally Efficient 60-GHZ XY-MIMO Data Transport Over a Radio-Over-Fiber System for Gigabit Wireless Local Area Network"; IEEE 2010; 4 Pages.
Examination Report for European patent application 10702806.0 dated Sep. 12, 2013, 11 pages.
Non-final Office Action for U.S. Appl. No. 13/194,429 dated Mar. 1, 2013, 22 pages.

Notice of Allowance for U.S. Appl. No. 13/194,429 dated Jul. 9, 2013, 9 pages.
International Search Report for PCT/US2011/043405 dated Apr. 25, 2012, 4 pages.
Non-final Office Action for U.S. Appl. No. 11/958,062 dated Nov. 6, 2013, 16 pages.
Chowdhury et al., "Multi-service Multi-carrier Broadband MIMO Distributed Antenna Systems for In-building Optical Wireless Access," Presented at the 2010 Conference on Optical Fiber Communication and National Fiber Optic Engineers Conference, Mar. 21-25, 2010, San Diego, California, IEEE, pp. 1-3.
International Search Report and Written Opinion for PCT/US2007/025855 dated Mar. 19, 2008, 14 pages.
International Preliminary Report on Patentability for PCT/US2007/025855 dated Jul. 2, 2009, 9 pages.
Bahl et al. "Enhancements to the Radar User Location and Tracking System," Microsoft Research Technical Report, Feb. 2000, pp. 1-13.
Frikel et al, "A Robust Mobile Positioning Algorithm," EURASIP Proceedings, ISCCSP 2006, pp. 1-4.
Pahlavan et al, "An Overview of Wireless Indoor Geolocation Techniques and Systems," LNCS 1818, pp. 1-13, 2000.
Wann et al, "Hybrid TDOA/AOA Indoor Positioning and Tracking Using Extended Kalman Filters," 63rd IEEE VTC 2006, pp. 1058-1062.
Ibernon-Fernandez, R., et al., "Comparison Between Measurements and Simulations of Conventional and Distributed MIMO System," IEEE Antennas and Wireless Propagation Letters, vol. 7, Aug. 2008, pp. 546-549.
Tarlazzi L, et al., "Characterization of an Interleaved F-DAS MIMO Indoor Propagation Channel," Loughborough Antennas & Propagation Conference, Nov. 2010, Loughborough, United Kingdom, IEEE, pp. 505-508.
Tolli, Antti, "Resource Management in Cooperative MIMO-OFDM Cellular Systems," Academic Dissertation—ACTA Universitatis Ouluensis, No. C Technica 296, Apr. 11, 2008, pp. 1-198.
Vitucci, E.M., et al., "Analysis of the Performance of LTE Systems in an Interleaved F-DAS MIMO Indoor Environment," Proceedings of the 5th European Conference on Antennas and Propagation (EUCAP), Apr. 11-15, 2011, Rome, Italy, IEEE, pp. 2184-2186.
Wei, Xinning, et al., "Cooperative communication with partial channel-state information in multiuser MIMO systems," International Journal of Electronics and Communications, vol. 65, No. 4, Apr. 2011 (available online May 15, 2010), Elsevier GmbH, pp. 349-360.
International Search Report for PCPUS2013/070489 dated Feb. 24, 2014, 4 pages.
Biton et al., "Challenge: CeTV and Ca-Fi—Cellular and Wi-Fi over CATV," Proceedings of the Eleventh Annual International Conference on Mobile Computing and Networking, Aug. 28-Sep. 2, 2005, Cologne, Germany, Association for Computing Machinery, 8 pages.
Hansryd, Jonas et al., "Microwave capacity evolution," Ericsson Review, Jun. 21, 2011, 6 pages.
Seto et al., "Optical Subcarrier Multiplexing Transmission for Base Station With Adaptive Array Antenna," IEEE Transactions on Microwave Theory and Techniques, vol. 49, No. 10, Oct. 2001, pp. 2036-2041.
Examination Report for European Patent Application No. 11733965.5 dated Oct. 10, 2014, 6 pages.
International Search Report for PCT/US2013/034328 dated Jul. 3, 2013, 5 pages.
International Preliminary Report on Patentability for PCT/US2013/034328 dated Oct. 1, 2014, 8 pages.
Non-final Office Action for U.S. Appl. No. 13/598,078 dated Dec. 22, 2014, 7 pages.
Non-Final Office Action for U.S. Appl. No. 14/078,949 dated Sep. 10, 2015, 29 pages.
Notice of Allowance for U.S. Appl. No. 13/598,078 dated May 12, 2015, 8 pages.
Non-final Office Action for U.S. Appl. No. 14/148,908 dated May 22, 2015, 20 pages.
Notice of Allowance for U.S. Appl. No. 14/242,139 dated Oct. 22, 2014, 12 pages.

(56) References Cited

OTHER PUBLICATIONS

Diehm, et al., "The FUTON Prototype: Broadband Communication through Coordinated Multi-Point using a Novel Integrated Optical/Wireless Architecture," Presented at Globecom Workshops, Dec. 6-10, 2010, Miami, Florida, IEEE, pp. 757-762.
Fan, Shu-Hao et al., "Spectrally Efficient 60-GHz xy-MIMO Data Transport over a Radio-Over-Fiber System for Gigabit Wireless Local Area Networks," Presented at IEEE Global Telecommunications Conference, Dec. 6-10, 2010, Miami, Florida, IEEE, 4 pages.
Lee et al., "Evaluation of 60 GHz MIMO Channel Capacity in the Conference Room STA-STA Scenario," Vehicular Technology Conference (VTC Sping), 2011 IEEE 73rd, pp. 1-5, May 15-18, 2011.
Sheldon, C. et al., "A 60GHz Line-of-Sight 2×2 MIMO Link Operating at 1.2 Gbps," Presented at Antennas and Propogation Society International Symposium, Jul. 5-11, 2008, San Diego, California, IEEE, 4 pages.
Written Opinion for European Patent Application No. 13798863.0 dated Aug. 6, 2015, 10 pages.
Non-final Office Action for U.S. Appl. No. 14/487,232 dated Jun. 23, 2015, 15 pages.
Notice of Allowance for U.S. Appl. No. 14/227,108 dated Nov. 18, 2015, 8 pages.
Final Office Action for U.S. Appl. No. 14/487,232 dated Oct. 15, 2015, 7 pages.
Author Unknown, "Fiber Optic Distributed Antenna System," Installation and Users Guide, ERAU Version 1.5, May 2002, Andrews Corporation, 53 pages.
Heath, Robert, et al., "Multiuser MIMO in Distributed Antenna Systems with Out-of-Cell Interference," IEEE Transactions on Signal Processing, vol. 59, Issue 10, Oct. 2011, IEEE, 4885-4899.
Notice of Allowance for U.S. Appl. No. 14/078,949 dated Feb. 3, 2016, 9 pages.
Non-final Office Action for U.S. Appl. No. 14/079,977 dated Mar. 4, 2016, 21 pages.
Notice of Allowance for U.S. Appl. No. 14/079,977 dated Apr. 29, 2016, 8 pages.
Non-final Office Action for U.S. Appl. No. 14/447,014 dated Jan. 20, 2016, 6 pages.
Non-final Office Action for U.S. Appl. No. 14/721,357, dated Jan. 4, 2016, 10 pages.
Final Office Action for U.S. Appl. No. 14/721,357 dated Mar. 1, 2016, 12 pages.
Advisory Action for U.S. Appl. No. 14/721,357, dated Jun. 30, 2016, 3 pages.
Notice of Allowance for U.S. Appl. No. 14/721,357, dated Aug. 16, 2016, 7 pages.
Non-Final Office Action for U.S. Appl. No. 14/962,279, dated Jan. 27, 2017, 18 pages.
Non-Final Office Action for U.S. Appl. No. 14/997,694, dated Feb. 8, 2017, 16 pages.
Arredondo, Albedo et al., "Techniques for Improving In-Building Radio Coverage Using Fiber-Fed Distributed Antenna Networks," IEEE 46th Vehicular Technology Conference, Atlanta, Georgia, Apr. 28-May 1, 1996, pp. 1540-1543, vol. 3.
Bakaul, M., et al., "Efficient Multiplexing Scheme for Wavelength-Interleaved DWDM Millimeter-Wave Fiber-Radio Systems," IEEE Photonics Technology Letters, Dec. 2005, vol. 17, No. 12, pp. 2718-2720.
Cho, Bong Youl et al. "The Forward Link Performance of a PCS System with an AGC," 4th CDMA International Conference and Exhibition, "The Realization of IMT-2000," 1999, 10 pages.
Chu, Ta-Shing et al. "Fiber optic microcellular radio", IEEE Transactions on Vehicular Technology, Aug. 1991, pp. 599-606, vol. 40, Issue 3.
Cooper, A.J., "Fiber/Radio for the Provision of Cordless/Mobile Telephony Services in the Access Network," Electronics Letters, 1990, pp. 2054-2056, vol. 26.
Cutrer, David M. et al., "Dynamic Range Requirements for Optical Transmitters in Fiber-Fed Microcellular Networks," IEEE Photonics Technology Letters, May 1995, pp. 564-566, vol. 7, No. 5.

Dolmans, G. et al. "Performance study of an adaptive dual antenna handset for indoor communications", IEE Proceedings: Microwaves, Antennas and Propagation, Apr. 1999, pp. 138-144, vol. 146, Issue 2.
Ellinger, Frank et al., "A 5.2 GHz variable gain LNA MMIC for adaptive antenna combining", IEEE MTT-S International Microwave Symposium Digest, Anaheim, California, Jun. 13-19, 1999, pp. 501-504, vol. 2.
Fan, J.C. et al., "Dynamic range requirements for microcellular personal communication systems using analog fiber-optic links", IEEE Transactions on Microwave Theory and Techniques, Aug. 1997, pp. 1390-1397, vol. 45, Issue 8.
Gibson, B.C., et al., "Evanescent Field Analysis of Air-Silica Microstructure Waveguides," The 14th Annual Meeting of the IEEE Lasers and Electro-Optics Society, 1-7803-7104-4/01, Nov. 12-13, 2001, vol. 2, pp. 709-710.
Huang, C., et al., "A WLAN-Used Helical Antenna Fully Integrated with the PCMCIA Carrier," IEEE Transactions on Antennas and Propagation, Dec. 2005, vol. 53, No. 12, pp. 4164-4168.
Kojucharow, K., et al., "Millimeter-Wave Signal Properties Resulting from Electrooptical Upconversion," IEEE Transaction on Microwave Theory and Techniques, Oct. 2001, vol. 49, No. 10, pp. 1977-1985.
Monro, T.M., et al., "Holey Fibers with Random Cladding Distributions," Optics Letters, Feb. 15, 2000, vol. 25, vol. 4, pp. 206-208.
Moreira, J.D., et al., "Diversity Techniques for OFDM Based WLAN Systems," The 13th IEEE International Symposium on Personal, Indoor and Mobile Radio Communications, Sep. 15-18, 2002, vol. 3, pp. 1008-1011.
Niiho, T., et al., "Multi-Channel Wireless LAN Distributed Antenna System Based on Radio-Over-Fiber Techniques," The 17th Annual Meeting of the IEEE Lasers and Electro-Optics Society, Nov. 2004, vol. 1, pp. 57-58.
Author Unknown, "ITU-T G.652, Telecommunication Standardization Sector of ITU, Series G: Transmission Systems and Media, Digital Systems and Networks, Transmission Media and Optical Systems Characteristics—Optical Fibre Cables, Characteristics of a Single-Mode Optical Fiber and Cable," ITU-T Recommendation G.652, International Telecommunication Union, Jun. 2005, 22 pages.
Author Unknown, "ITU-T G.657, Telecommunication Standardization Sector of ITU, Dec. 2006, Series G: Transmission Systems and Media, Digital Systems and Networks, Transmission Media and Optical Systems Characteristics—Optical Fibre Cables, Characteristics of a Bending Loss Insensitive Single Mode Optical Fibre and Cable for the Access Network," ITU-T Recommendation G.657, International Telecommunication Union, 20 pages.
Opatic, D., "Radio over Fiber Technology for Wireless Access," Ericsson, Oct. 17, 2009, 6 pages.
Paulraj, A.J., et al., "An Overview of MIMO Communications—A Key to Gigabit Wireless," Proceedings of the IEEE, Feb. 2004, vol. 92, No. 2, 34 pages.
Pickrell, G.R., et al., "Novel Techniques for the Fabrication of Holey Optical Fibers," Proceedings of SPIE, Oct. 28-Nov. 2, 2001, vol. 4578, 2001, pp. 271-282.
Roh, W., et al., "MIMO Channel Capacity for the Distributed Antenna Systems," Proceedings of the 56th IEEE Vehicular Technology Conference, Sep. 2002, vol. 2, pp. 706-709.
Schweber, Bill, "Maintaining cellular connectivity indoors demands sophisticated design," EDN Network, Dec. 21, 2000, 2 pages, http://www.edn.com/design/integrated-circuit-design/4362776/Maintaining-cellular-connectivity-indoors-demands-sophisticated-design.
Seto, I., et al., "Antenna-Selective Transmit Diversity Technique for OFDM-Based WLANs with Dual-Band Printed Antennas," 2005 IEEE Wireless Communications and Networking Conference, Mar. 13-17, 2005, vol. 1, pp. 51-56.
Shen, C., et al., "Comparison of Channel Capacity for MIMO-DAS versus MIMO-CAS," the 9th Asia-Pacific Conference on Communications, Sep. 21-24, 2003, vol. 1, pp. 113-118.
Wake, D. et al., "Passive Picocell: A New Concept n Wireless Network Infrastructure," Electronics Letters, Feb. 27, 1997, vol. 33, No. 5, pp. 404-406.

(56) References Cited

OTHER PUBLICATIONS

Windyka, John et al., "System-Level Integrated Circuit (SLIC) Technology Development for Phased Array Antenna Applications," Contractor Report 204132, National Aeronautics and Space Administration, Jul. 1997, 94 pages.
Winters, J., et al., "The Impact of Antenna Diversity on the Capacity of Wireless Communications Systems," IEEE Transcations on Communications, vol. 42, No. 2/3/4, Feb./Mar./Apr. 1994, pp. 1740-1751.
Yu et al., "A Novel Scheme to Generate Single-Sideband Millimeter-Wave Signals by Using Low-Frequency Local Oscillator Signal," IEEE Photonics Technology Letters, vol. 20, No. 7, Apr. 1, 2008, pp. 478-480.
Second Office Action for Chinese patent application 20078002293.6 dated Aug. 30, 2012, 10 pages.
International Search Report for PCT/US2010/022847 dated Jul. 12, 2010, 3 pages.
International Search Report for PCT/US2010/022857 dated Jun. 18,2010, 3 pages.
Decision on Appeal for U.S. Appl. No. 11/451,237 dated Mar. 19, 2013, 7 pages.
Decision on Rejection for Chinese patent application 200780022093.6 dated Feb. 5, 2013, 9 pages.
International Search Report and Written Opinion for International patent application PCT/US2007/013802 dated May 8, 2008, 12 pages.

\* cited by examiner

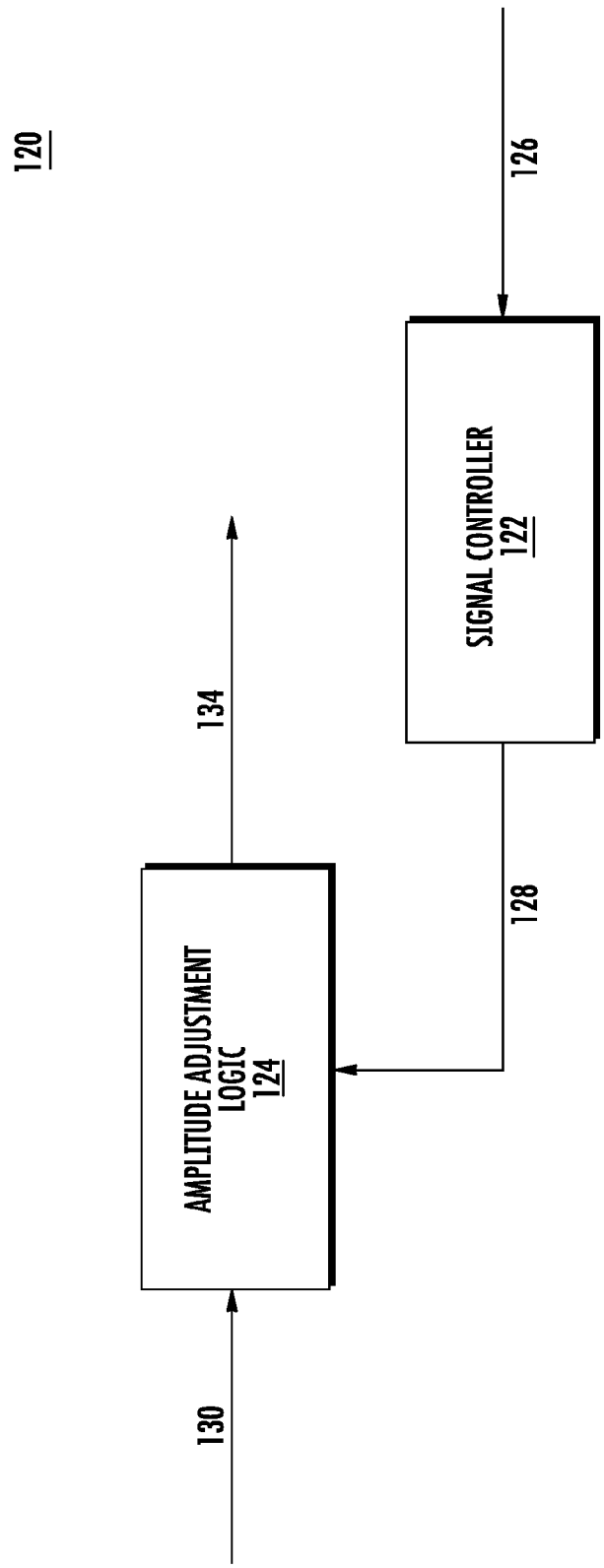

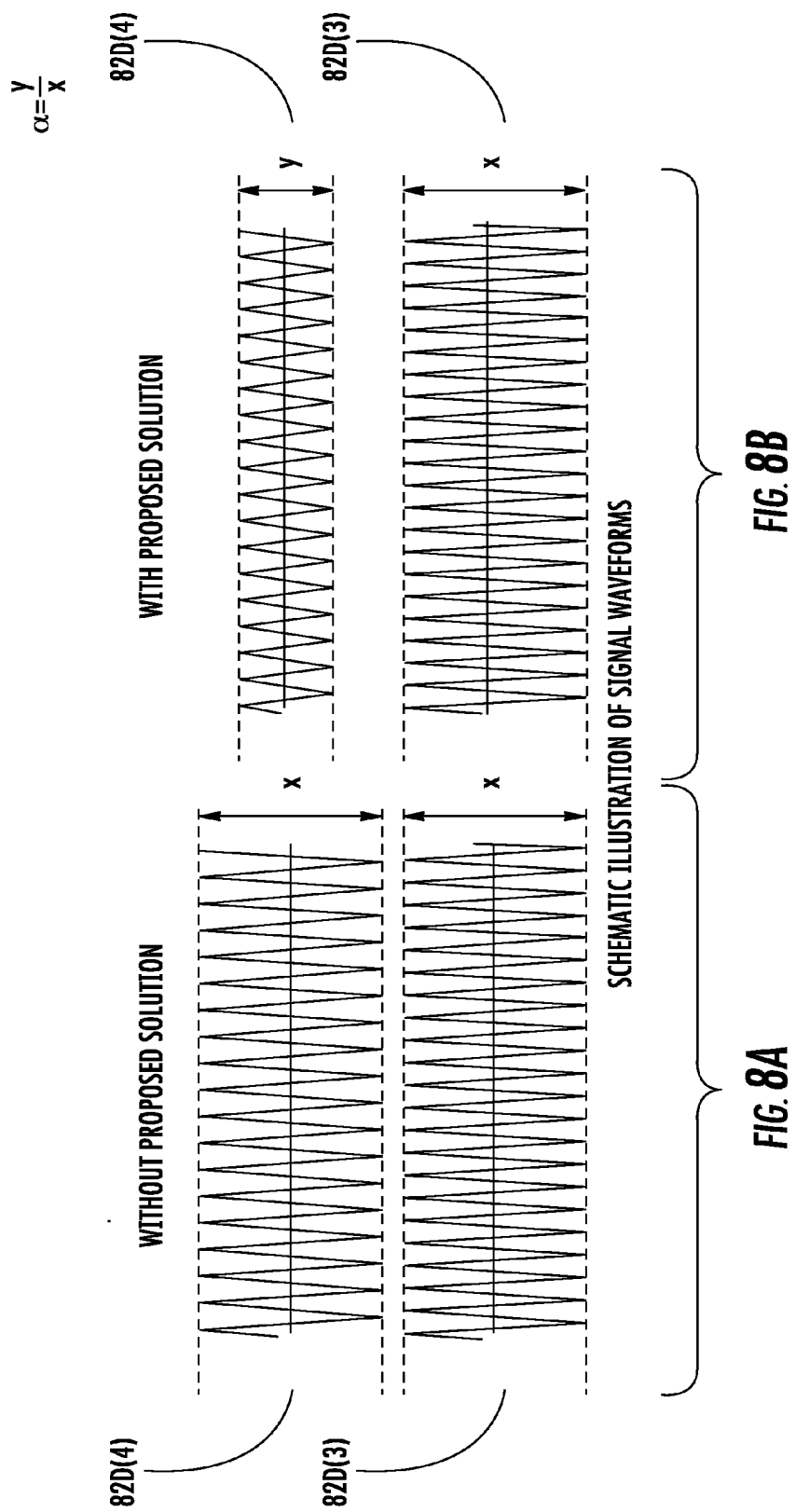

REDUCING LOCATION-DEPENDENT DESTRUCTIVE INTERFERENCE IN DISTRIBUTED ANTENNA SYSTEMS (DASS) OPERATING IN MULTIPLE-INPUT, MULTIPLE-OUTPUT (MIMO) CONFIGURATION, AND RELATED COMPONENTS, SYSTEMS, AND METHODS

PRIORITY APPLICATIONS

This application is a continuation of U.S. application Ser. No. 14/447,014, filed on Jul. 30, 2014, the content of which is relied upon and incorporated herein by reference in its entirety and the benefit of priority under 35 U.S.C. § 120 is hereby claimed.

BACKGROUND

The disclosure relates generally to distribution of data (e.g., digital data services and radio-frequency communications services) in a distributed antenna system (DAS) and more particularly to multiple-input, multiple-output MIMO technology, which may be used in the DAS.

Wireless customers are demanding digital data services, such as streaming video signals. Concurrently, some wireless customers use their wireless devices in areas that are poorly served by conventional cellular networks, such as inside certain buildings or areas where there is little cellular coverage. One response to the intersection of these two concerns has been the use of distributed antenna systems. Distributed antenna systems can be particularly useful to be deployed inside buildings or other indoor environments where client devices may not otherwise be able to effectively receive radio-frequency (RF) signals from a source. Distributed antenna systems include remote units (also referred to as "remote antenna units") configured to receive and wirelessly transmit wireless communications signals to client devices in antenna range of the remote units. Such distributed antenna systems may use Wireless Fidelity (WiFi) or wireless local area networks (WLANs), as examples, to provide digital data services.

Distributed antenna systems may employ optical fiber to support distribution of high bandwidth data (e.g., video data) with low loss. Even so, WiFi and WLAN-based technology may not be able to provide sufficient bandwidth for expected demand, especially as HD video becomes more prevalent. WiFi was initially limited in data rate transfer to 12.24 Mb/s and is provided at data transfer rates of up to 54 Mb/s using WLAN frequencies of 2.4 GHz and 5.8 GHz. While interesting for many applications, WiFi bandwidth may be too small to support real time downloading of uncompressed HD television signals to wireless client devices.

MIMO technology can be employed in distributed antenna systems to increase the bandwidth up to twice the nominal bandwidth, as a non-limiting example. MIMO is the use of multiple antennas at both a transmitter and receiver to increase data throughput and link range without additional bandwidth or increased transmit power. However, even doubling bandwidth alone may not be enough to support high bandwidth data to wireless client devices, such as the example of real time downloading of uncompressed high definition (HD) television signals.

The frequency of wireless communications signals could also be increased in a MIMO distributed antenna system to provide larger channel bandwidth as a non-limiting example. For example, an extremely high frequency (EHF) in the range of approximately 30 GHz to approximately 300 GHz could be employed. For example, the sixty GHz (60 GHz) spectrum is an EHF that is an unlicensed spectrum by the Federal Communications Commission (FCC). EHFs could be employed to provide for larger channel bandwidths. However, higher frequency wireless signals are more easily attenuated and/or blocked from traveling through walls, building structures, or other obstacles where distributed antenna systems are commonly installed. Higher frequency wireless signals also provide narrow radiation patterns. Thus, remote units in distributed antenna systems may be arranged for line-of-sight (LOS) communications to allow for higher frequencies for higher bandwidth. However, if remote units are provided in a LOS configuration and the remote units are also configured to support MIMO, multiple spatial streams received by multiple receiver antennas in the remote units may be locked into a relative phase and/or amplitude pattern. This can lead to multiple received spatial streams periodically offsetting each other when the spatial streams are combined at MIMO receivers, leading to performance degradation and reduced wireless coverage.

No admission is made that any reference cited herein constitutes prior art. Applicant expressly reserves the right to challenge the accuracy and pertinency of any cited documents.

SUMMARY

Components, systems, and methods for reducing location-dependent destructive interference in distributed antenna systems (DASs) operating in multiple-input, multiple-output (MIMO) configuration are disclosed. The DASs include remote units employing MIMO transmitters configured to transmit multiple data streams in MIMO configuration to MIMO receivers in wireless client devices. Destructive interference in a MIMO system can occur when two or more spatial streams transmitted from multiple MIMO antennas are locked into a relative phase and/or amplitude pattern, causing periodic destructive interferences when the two or more spatial streams are combined at MIMO receivers in client devices. These issues can occur due to lack of separation (i.e., phase, amplitude) in the received MIMO communications signals, especially with closely located MIMO transmitters configured for line-of-sight (LOS) communications. Thus, to provide spatial separation of MIMO communications signals received by MIMO receivers in client devices, multiple MIMO transmitters in a remote unit in a DAS are each configured to employ multiple transmitter antennas, which are each configured to transmit in different polarization states. In certain embodiments, the amplitude of one of the MIMO communications signals is modified in one of the polarization states to further provide amplitude separation between the MIMO communications signals received by the MIMO receivers.

The components, systems, and methods for reducing location-dependent periodic destructive interference in distributed antenna systems operating in MIMO configuration may significantly improve high-data rate wireless coverage without significant dependence on transmitter and/or receive placement. This may allow for LOS communications to be more easily achieved between MIMO transmitters and MIMO receivers, especially for higher frequency communications where LOS communications may be required to reduce destructions to higher frequency signals by obstacles on the transmission path. High antenna isolation is not required in the MIMO receivers. No additional hardware component is required in the MIMO transmitters or receivers as well. The improved MIMO performance and increased coverage area can also allow higher frequency bands (e.g., 60 GHz) to be used efficiently to provide multi-gigabit per second (Gbps) data access to client devices in indoor and outdoor environments.

One embodiment of the disclosure relates to a MIMO remote unit configured to wirelessly distribute MIMO communications signals to wireless client devices in a distributed antenna system. The MIMO remote unit comprises a first MIMO transmitter comprising a first MIMO transmitter antenna configured to transmit MIMO communications signals in a first polarization and a second MIMO transmitter antenna configured to transmit MIMO communications signals in a second polarization different from the first polarization. The MIMO remote unit also comprises a second MIMO transmitter comprising a third MIMO transmitter antenna configured to transmit MIMO communications signals in the first polarization and a fourth MIMO transmitter antenna configured to transmit MIMO communications signals in the second polarization. The first MIMO transmitter is configured to receive a first downlink MIMO communications signal at a first amplitude over a first downlink communications medium, and transmit the first downlink MIMO communications signal wirelessly as a first electrical downlink MIMO communications signal over the first MIMO transmitter antenna in the first polarization. The first MIMO transmitter is also configured to receive a second downlink MIMO communications signal at the first amplitude over a second downlink communications medium, and transmit the second downlink MIMO communications signal wirelessly as a second electrical downlink MIMO communications signal over the second MIMO transmitter antenna in the second polarization. The second MIMO transmitter is configured to receive a third downlink MIMO communications signal at the first amplitude over a third downlink communications medium, and transmit the third downlink MIMO communications signal wirelessly as a third electrical downlink MIMO communications signal over the third MIMO transmitter antenna in the first polarization. The second MIMO transmitter is also configured to receive a fourth downlink MIMO communications signal over a fourth downlink communications medium, and transmit the fourth downlink MIMO communications signal at a second amplitude modified from the first amplitude, wirelessly as a fourth electrical downlink MIMO communications signal over the fourth MIMO transmitter antenna in the second polarization.

An additional embodiment of the disclosure relates to a method of transmitting MIMO communications signals to wireless client devices in a distributed antenna system is provided. The method includes receiving a first downlink MIMO communications signal at a first amplitude over a first downlink communications medium. The method also includes transmitting the first downlink MIMO communications signal wirelessly as a first electrical downlink MIMO communications signal over a first MIMO transmitter antenna in a first polarization. The method also includes receiving a second downlink MIMO communications signal at the first amplitude over a second downlink communications medium. The method also includes transmitting the second downlink MIMO communications signal wirelessly as a second electrical downlink MIMO communications signal over a second MIMO transmitter antenna in a second polarization. The method also includes receiving a third downlink MIMO communications signal at the first amplitude over a third downlink communications medium. The method also includes transmitting the third downlink MIMO communications signal wirelessly as a third electrical downlink MIMO communications signal over a third MIMO transmitter antenna in the first polarization. The method also includes receiving a fourth downlink MIMO communications signal over a fourth downlink communications medium. The method also includes transmitting the fourth downlink MIMO communications signal at a second amplitude modified from the first amplitude, wirelessly as a fourth electrical downlink MIMO communications signal over a fourth MIMO transmitter antenna in the second polarization.

An additional embodiment of the disclosure relates to a distributed antenna system for distributing MIMO communications signals to wireless client devices. The distributed antenna system comprises a central unit. The central unit comprises a central unit transmitter configured to receive a downlink communications signal. The central unit transmitter is also configured to transmit the received downlink communications signal as a first downlink MIMO communications signal over a first downlink communications medium, a second downlink MIMO communications signal over a second downlink communications medium, a third MIMO downlink communications signal over a third downlink communications medium, and a fourth downlink MIMO communications signal over a fourth downlink communications medium.

This distributed antenna system also comprises a remote unit. The remote unit comprises a first MIMO transmitter comprising a first MIMO transmitter antenna configured to transmit MIMO communications signals in a first polarization and a second MIMO transmitter antenna configured to transmit MIMO communications signals in a second polarization different from the first polarization. The remote unit also comprises a second MIMO transmitter comprising a third MIMO transmitter antenna configured to transmit MIMO communications signals in the first polarization and a fourth MIMO transmitter antenna configured to transmit MIMO communications signals in the second polarization. The first MIMO transmitter is configured to receive a first downlink MIMO communications signal at a first amplitude over a first downlink communications medium, and transmit the first downlink MIMO communications signal wirelessly as a first electrical downlink MIMO communications signal over the first MIMO transmitter antenna in the first polarization. The first MIMO transmitter is also configured to receive a second downlink MIMO communications signal at the first amplitude over a second downlink communications medium, and transmit the second downlink MIMO communications signal wirelessly as a second electrical downlink MIMO communications signal over the second MIMO transmitter antenna in the second polarization. The second MIMO transmitter is configured to receive a third downlink MIMO communications signal at the first amplitude over a third downlink communications medium, and transmit the third downlink MIMO communications signal wirelessly as a third electrical downlink MIMO communications signal over the third MIMO transmitter antenna in the first polarization. The second MIMO transmitter is also configured to receive a fourth downlink MIMO communications signal over a fourth downlink communications medium, and transmit the fourth downlink MIMO communications signal at a second amplitude modified from the first amplitude, wirelessly as a fourth electrical downlink MIMO communications signal over the fourth MIMO transmitter antenna in the second polarization. The remote unit also comprises at least one amplitude adjustment circuit configured to amplitude adjust the fourth downlink MIMO communications signal to the second amplitude.

The distributed antenna systems disclosed herein can be configured to support one or more radio-frequency (RF)-based services and/or distribution of one or more digital data services. The remote units in the distributed antenna systems may be configured to transmit and receive wireless communications signals at one or more frequencies, including but not limited to extremely high frequencies (EHF) (i.e., approximately 30 GHz-approximately 300 GHz). The distributed antenna systems may include, without limitation, wireless local area networks (WLANs). Further, as a non-limiting example, the distributed antenna systems may be an optical fiber-based distributed antenna system, but such is not required. An optical fiber-based distributed antenna system may employ Radio-over-Fiber (RoF) communications. The embodiments disclosed herein are also applicable to other remote antenna clusters and distributed antenna systems, including those that include other forms of communications media for distribution of communications signals, including electrical conductors and wireless transmission. For example, the distributed antenna systems may include electrical and/or wireless communications mediums between a central unit and remote units in addition or in lieu of optical fiber communications medium. The embodiments disclosed herein may also be applicable to remote antenna clusters and distributed antenna systems and may also include more than one communications media for distribution of communications signals (e.g., digital data services, RF communications services). The communications signals in the distributed antenna system may or may not be frequency shifted.

Additional features and advantages will be set forth in the detailed description which follows, and in part will be readily apparent to those skilled in the art from the description or recognized by practicing the embodiments as described in the written description and the claims hereof, as well as the appended drawings.

It is to be understood that both the foregoing general description and the following detailed description are merely exemplary, and are intended to provide an overview or framework to understand the nature and character of the claims. The accompanying drawings are included to provide a further understanding and are incorporated in and constitute a part of this specification. The drawings illustrate one or more embodiments, and together with the description serve to explain principles and operation of the various embodiments.

BRIEF DESCRIPTION OF THE DRAWINGS

FIG. 4 is a schematic diagram of an exemplary amplitude adjustment circuit for amplitude adjusting a downlink (DL) MIMO communications signal transmitted by a MIMO transmitter antenna in FIG. 2;

FIG. 8A is a graph illustrating exemplary MIMO communications signal waveforms transmitted by a first MIMO transmitter antenna and a second MIMO transmitter antenna of a MIMO transmitter in a remote unit in FIGS. 6A-6C without amplitude adjustment;

FIG. 8B is a graph illustrating exemplary MIMO communications signal waveforms transmitted by a first MIMO transmitter antenna and a second MIMO transmitter antenna of a MIMO transmitter in a remote unit in FIGS. 6A-6C with amplitude adjustment;

DETAILED DESCRIPTION

Components, systems, and methods for reducing location-dependent destructive interference in distributed antenna systems (DASs) operating in multiple-input, multiple-output (MIMO) configuration are disclosed. The DASs include remote units employing MIMO transmitters configured to transmit multiple data streams in MIMO configuration to MIMO receivers in wireless client devices. Destructive interference in a MIMO system can occur when two or more spatial streams transmitted from multiple MIMO antennas are locked into a relative phase and/or amplitude pattern, causing periodic destructive interferences when the two or more spatial streams are combined at MIMO receivers in client devices. These issues can occur due to lack of separation (i.e., phase, amplitude) in the received MIMO communications signals, especially with closely located MIMO transmitters configured for line-of-sight (LOS) communications. Thus, to provide spatial separation of MIMO communications signals received by MIMO receivers in client devices, multiple MIMO transmitters in a remote unit in a DAS are each configured to employ multiple transmitter antennas, which are each configured to transmit in different polarization states. In certain embodiments, the amplitude of one of the MIMO communications signals is modified in one of the polarization states to further provide amplitude separation between the MIMO communications signals received by the MIMO receivers. Various embodiments will be explained by the following examples.

Figure 1:
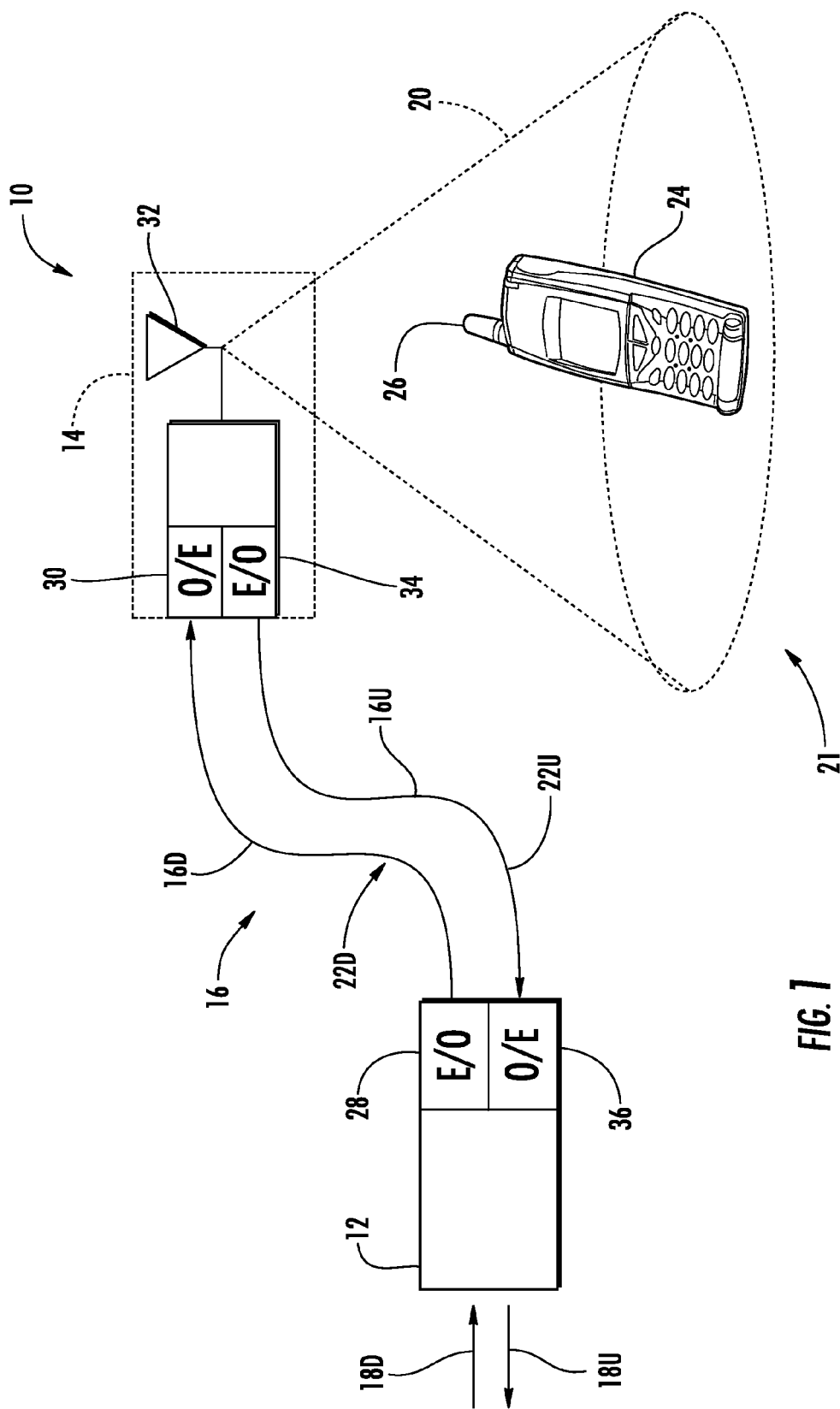
FIG. 1 is a schematic of an exemplary distributed antenna system.

Before discussing examples of components, systems, and methods for reducing location-dependent destructive interference in distributed antenna systems operating in MIMO configuration starting at FIG. 4, an exemplary distributed antenna system is described in regard to FIGS. 1-3C. In this regard, FIG. 1 is a schematic diagram of a conventional distributed antenna system 10. The distributed antenna system 10 is an optical fiber-based distributed antenna system. The distributed antenna system 10 is configured to create one or more antenna coverage areas for establishing communications with wireless client devices located in the radio frequency (RF) range of the antenna coverage areas. In an exemplary embodiment, the distributed antenna system 10 may provide RF communication services (e.g., cellular services). As illustrated, the distributed antenna system 10 includes a central unit 12, one or more remote units 14, and an optical fiber 16 that optically couples the central unit 12 to the remote unit 14. The central unit 12 may also be referred to as a head-end unit. The remote unit 14 is a type of remote communications unit, and may also be referred to as a "remote antenna unit." In general, a remote communications unit can support wireless communications or wired communications, or both. The central unit 12 is configured to receive communications over downlink electrical RF signals 18D from a source or sources, such as a network or carrier as examples, and provide such communications to the remote unit 14. The central unit 12 is also configured to return communications received from the remote unit 14, via uplink electrical RF signals 18U, back to the source or sources. In this regard, in this embodiment, the optical fiber 16 includes at least one downlink optical fiber 16D to carry signals communicated from the central unit 12 to the remote unit 14 and at least one uplink optical fiber 16U to carry signals communicated from the remote unit 14 back to the central unit 12.

One downlink optical fiber 16D and one uplink optical fiber 16U could be provided to support multiple full-duplex channels each using wave-division multiplexing (WDM), as discussed in U.S. patent application Ser. No. 12/892,424, entitled "Providing Digital Data Services in Optical Fiber-based Distributed Radio Frequency (RF) Communications Systems, And Related Components and Methods," incorporated herein by reference in its entirety. Other options for WDM and frequency-division multiplexing (FDM) are also disclosed in U.S. patent application Ser. No. 12/892,424, any of which can be employed in any of the embodiments disclosed herein. Further, U.S. patent application Ser. No. 12/892,424 also discloses distributed digital data communications signals in a distributed antenna system which may also be distributed in the distributed antenna system 10 either in conjunction with the RF communications signals or not.

The distributed antenna system 10 has an antenna coverage area 20 that can be disposed around the remote unit 14. The antenna coverage area 20 of the remote unit 14 forms an RF coverage area 21. The central unit 12 is adapted to perform or to facilitate any one of a number of Radio-over-Fiber (RoF) applications, such as RF identification (RFID), wireless local-area network (WLAN) communication, or cellular phone service. Shown within the antenna coverage area 20 is a client device 24 in the form of a mobile device, which may be a cellular telephone as an example. The client device 24 can be any device that is capable of receiving RF communications signals. The client device 24 includes an antenna 26 (e.g., a wireless card) adapted to receive and/or send electromagnetic RF signals.

With continuing reference to FIG. 1, to communicate the electrical RF signals over the downlink optical fiber 16D to the remote unit 14, to in turn be communicated to the client device 24 in the antenna coverage area 20 formed by the remote unit 14, the central unit 12 includes a radio interface in the form of an electrical-to-optical (E/O) converter 28. The E/O converter 28 converts the downlink electrical RF signals 18D to downlink optical RF signals 22D to be communicated over the downlink optical fiber 16D. The remote unit 14 includes an optical-to-electrical (O/E) converter 30 to convert the received downlink optical RF signals 22D back to electrical RF signals to be communicated wirelessly through an antenna 32 of the remote unit 14 to the client device 24 located in the antenna coverage area 20.

Similarly, the antenna 32 is also configured to receive wireless RF communications from the client device 24 in the antenna coverage area 20. In this regard, the antenna 32 receives wireless RF communications from the client device 24 and communicates electrical RF signals representing the wireless RF communications to an E/O converter 34 in the remote unit 14. The E/O converter 34 converts the electrical RF signals into uplink optical RF signals 22U to be communicated over the uplink optical fiber 16U. An O/E converter 36 provided in the central unit 12 converts the uplink optical RF signals 22U into uplink electrical RF signals, which can then be communicated as uplink electrical RF signals 18U back to a network or other source.

As noted, one or more of the network or other sources can be a cellular system, which may include a base station or base transceiver station (BTS). The BTS may be provided by a second party such as a cellular service provider, and can be co-located or located remotely from the central unit 12.

In a typical cellular system, for example, a plurality of BTSs is deployed at a plurality of remote locations to provide wireless telephone coverage. Each BTS serves a corresponding cell and when a mobile client device enters the cell, the BTS communicates with the mobile client device. Each BTS can include at least one radio transceiver for enabling communication with one or more subscriber units operating within the associated cell. As another example, wireless repeaters or bi-directional amplifiers could also be used to serve a corresponding cell in lieu of a BTS. Alternatively, radio input could be provided by a repeater, picocell, or femtocell, as other examples. In a particular exemplary embodiment, cellular signal distribution in the frequency range from 400 MHz to 2.7 GHz is supported by the distributed antenna system 10.

Although the distributed antenna system 10 in FIG. 1 allows for distribution of radio frequency (RF) communications signals; the distributed antenna system 10 is not limited to distribution of RF communications signals. Data communications signals, including digital data signals, for distributing data services could also be distributed in the distributed antenna system 10 in lieu of or in addition to RF communications signals. Also note that while the distributed antenna system 10 in FIG. 1 discussed below includes distribution of communications signals over optical fiber, the distributed antenna system 10 is not limited to distribution of communications signals over optical fiber. Distribution media could also include, but are not limited to, coaxial cable, twisted-pair conductors, wireless transmission and reception, and any combination thereof. Also, any combination can be employed that also involves optical fiber for portions of the distributed system.

Figure 2:
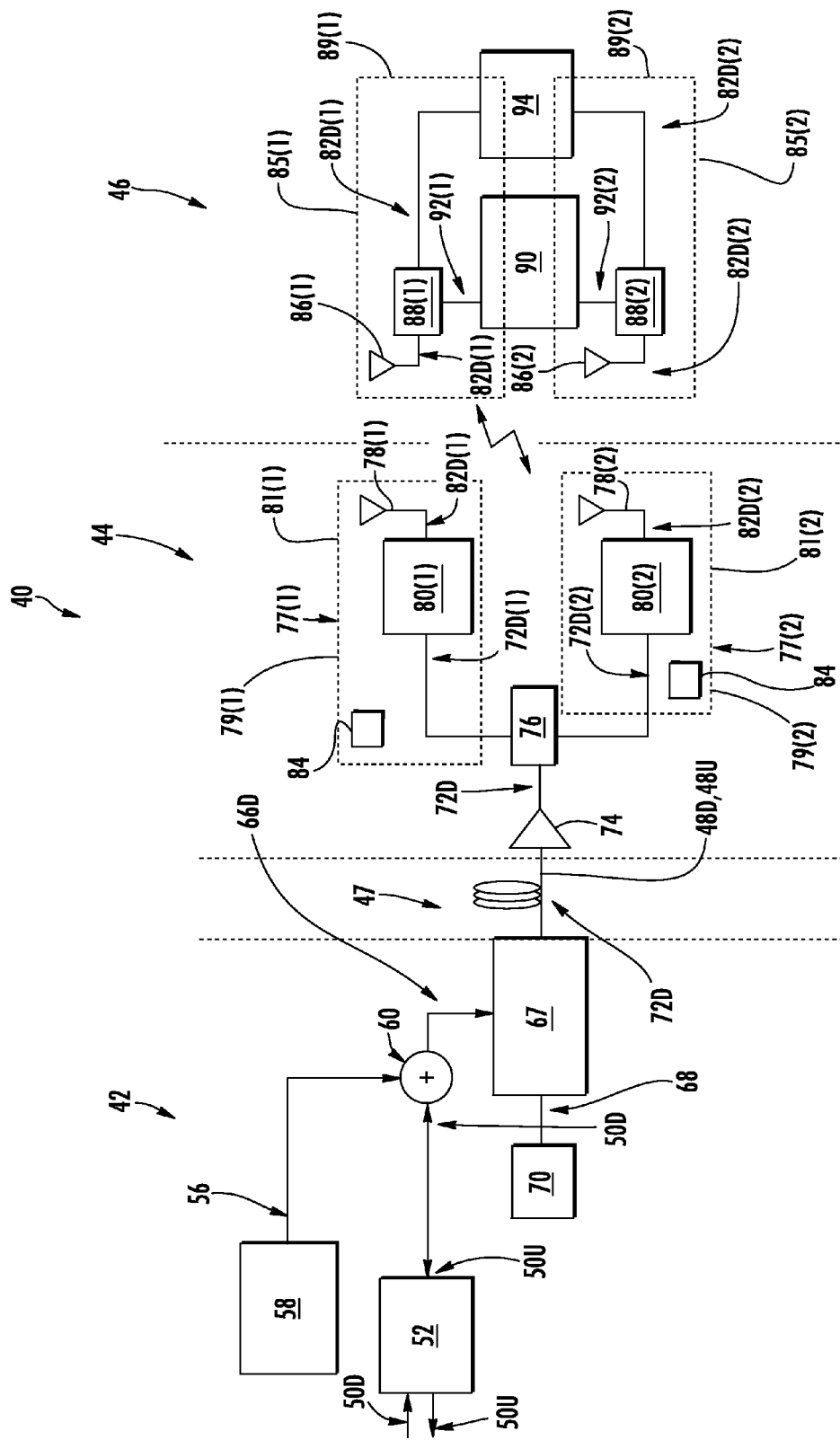
FIG. 2 is a schematic diagram of an exemplary multiple-input, multiple-output (MIMO) optical fiber-based distributed antenna system.

A distributed antenna system, including the distributed antenna system 10 in FIG. 1, can be configured in MIMO configuration for MIMO operation. In this regard, FIG. 2 illustrates a schematic diagram of an exemplary MIMO optical fiber-based distributed antenna system 40 (hereinafter referred to as "MIMO distributed antenna system 40"). The MIMO distributed antenna system 40 is configured to operate in MIMO configuration. MIMO technology involves the use of multiple antennas at both a transmitter and receiver to improve communication performance. In this regard, a central unit 42 is provided that is configured to distribute downlink communications signals to one or more remote units 44. FIG. 2 only illustrates one remote unit 44, but note that a plurality of remote units 44 is typically provided. The remote units 44 are configured to wirelessly communicate the downlink communication signals to one or more client devices 46 that are in communication range of the remote unit 44. The remote units 44 may also be referred to as "remote antenna units 44" because of their wireless transmission over antenna functionality. The remote unit 44 is also configured to receive uplink communication signals from the client devices 46 to be distributed to the central unit 42. In this embodiment, an optical fiber communications medium 47 comprising at least one downlink optical fiber 48D and at least one uplink optical fiber 48U is provided to commutatively couple the central unit 42 to the remote units 44. The central unit 42 is also configured to receive uplink communication signals from the remote units 44 via the optical fiber communications medium 47, although more specifically over the at least one uplink optical fiber 48U.

The client device 46 in communication with the remote unit 44 can provide uplink communication signals to the remote unit 44 which are then distributed over the optical fiber communications medium 47 to the remote unit 44 to be provided to a network or other source, such as a base station for example.

With continuing reference to FIG. 2, more detail will be discussed regarding the components of the central unit 42, the remote unit 44, and the client device 46 and the distribution of downlink communications signals. The central unit 42 is configured to receive electrical downlink MIMO communication signals 50D from outside the MIMO distributed antenna system 40 in a signal processor 52 and provide electrical uplink communications signals 50U received from client devices 46, to other systems. The signal processor 52 is configured to provide the electrical downlink communication signals 50D to a mixer 60, which may be an IQ signal mixer in this example. The mixer 60 in this embodiment is configured to convert the electrical downlink MIMO communication signals 50D to IQ signals. The mixer 60 is driven by a frequency signal 56 that is provided by a local oscillator 58. Frequency conversion is optional. In this embodiment, it is desired to up-convert the frequency of the electrical downlink MIMO communication signals 50D to a higher frequency to provide electrical downlink MIMO communication signals 66D to provide for a greater bandwidth capability before distributing the electrical downlink MIMO communications signals 66D to the remote units 44. For example, the up-conversion carrier frequency may be provided as an extremely high frequency (e.g. approximately 30 GHz to 300 GHz).

With continuing reference to FIG. 2, because the communication medium between the central unit 42 and the remote unit 44 is the optical fiber communications medium 47, the electrical downlink MIMO communication signals 66D are converted to optical signals by an electro-optical converter 67. The electro-optical converter 67 includes components to receive a light wave 68 from a light source 70, such as a laser. The light wave 68 is modulated by the frequency oscillations in the electrical downlink MIMO communication signals 66D to provide optical downlink MIMO communication signals 72D to be communicated over the downlink optical fiber 48D to the remote unit 44. The electro-optical converter 67 may be provided so that the electrical downlink MIMO communication signals 66D are provided as radio-over-fiber (RoF) communications signals over the downlink optical fiber 48D.

With continuing reference to FIG. 2, the optical downlink MIMO communication signals 72D are received by an optical bi-directional amplifier 74, which is then provided to a MIMO splitter 76 in the remote unit 44. The MIMO splitter 76 is provided so that the optical downlink MIMO communication signals 72D can be split among two separate communication paths 77(1), 77(2) to be radiated over two separate MIMO transmitter antennas 78(1), 78(2) provided in two separate MIMO transmitters 79(1), 79(2) configured in MIMO configuration. The MIMO splitter 76 in the remote unit 44 is an optical splitter since the received optical downlink MIMO communication signals 72D are optical signals. In each communication path 77(1), 77(2), optical-to-electrical converters 80(1), 80(2) are provided to convert the optical downlink MIMO communication signals 72D to electrical downlink MIMO communication signals 82D(1), 82D(2). In this embodiment, as will be discussed in more detail below, an amplitude adjustment circuit 84 is provided in one of the transmission paths 77(1), 77(2) to provide amplitude adjustment in one of the optical downlink MIMO communication signals 72D(1), 72D(2) transmitted over one of the MIMO transmitter antennas 78(1), 78(2) to help reduce or eliminate periodic destructive interferences when received electrical downlink MIMO communication signals 82D are combined at the client device 46.

A destructive interference occurs when the electrical downlink MIMO communication signals 82D(1), 82D(2) are locked into a relative phase and/or amplitude pattern, causing them to cancel each other when combined at MIMO receivers 85(1), 85(2). Because the electrical downlink MIMO communication signals 82D(1), 82D(2) are periodic radio frequency waves, the destructive interference also becomes periodic as result. When physical obstacles (e.g., buildings, walls, trees, vehicles, etc.) standing in radio transmission paths between the MIMO transmitter antennas 78(1), 78(2) and the MIMO receiver antennas 86(1), 86(2), the electrical downlink MIMO communication signals 82D(1), 82D(2) transmitted by the MIMO transmitter antennas 78(1), 78(2) typically arrive at the MIMO receiver antennas 86(1), 86(2) from different directions and/or angles (also known as "multipath") due to reflections from the physical obstacles. Due to multipath effect, the electrical downlink MIMO communication signals 82D(1), 82D(2) transmitted by the MIMO transmitter antennas 78(1), 78(2) may arrive at the MIMO receiver antennas 86(1), 86(2) with slight delays among each other, resulting in natural phase shifts between the electrical downlink MIMO communication signals 82D(1), 82D(2). Further, the amplitudes of the electrical downlink MIMO communication signals 82D(1), 82D(2) may also be modified due to different reflection angles caused by different obstacles along different transmission paths. In this regard, multipath acts to break up the locked-in phase and/or amplitude pattern among the electrical downlink MIMO communication signals 82D(1), 82D(2) transmitted by the MIMO transmitter antennas 78(1), 78(2) and, thus, helps mitigate periodic destructive interferences at MIMO receivers 85(1), 85(2). However, when a millimeter wave radio frequency band (e.g., 60 GHz) is employed as the carrier frequency between the MIMO transmitter antennas 78(1), 78(2) and the MIMO receiver antennas 86(1), 86(2), there cannot be any physical obstacle stand in the radio transmission path. This is because higher frequency signals like a 60 GHz signal are inherently incapable of penetrating or bouncing off physical obstacles. To prevent millimeter wave radio frequency signals from being blocked by physical obstacles, the MIMO transmitter antennas 78(1), 78(2) and the MIMO receiver antennas 86(1), 86(2) must be configured in a line-of-sight (LOS) arrangement, which is further elaborated in FIGS. 3A-3C. With the LOS arrangement, multipath becomes non-existent between the MIMO transmitter antennas 78(1), 78(2) and the MIMO receiver antennas 86(1), 86(2). Therefore, periodic destructive interferences often occur when the electrical downlink MIMO communication signals 82D(1), 82D(2) are combined at the MIMO receivers 85(1), 85(2).

With continuing reference to FIG. 2, the client device 46 includes two MIMO receivers 85(1), 85(2) that include MIMO receiver antennas 86(1), 86(2) also configured in MIMO configuration. The MIMO receiver antennas 86(1), 86(2) are configured to receive the electrical downlink MIMO communication signals 82D(1), 82D(2) wirelessly from the remote unit 44. Mixers 88(1), 88(2) are provided and coupled to the MIMO receiver antennas 86(1), 86(2) in the client device 46 to provide frequency conversion of the electrical downlink MIMO communication signals 82D(1), 82D(2). In this regard, a local oscillator 90 is provided that is configured to provide oscillation signals 92(1), 92(2) to the mixers 88(1), 88(2), respectively, for frequency conversion. In this embodiment, the electrical downlink MIMO communications signals 82D(1), 82D(2) are down converted back to their native frequency as received by the central unit 42. The down converted electrical downlink MIMO communication signals 82D(1), 82D(2) are then provided to a signal analyzer 94 in the client device 46 for any processing desired.

Figure 3A:
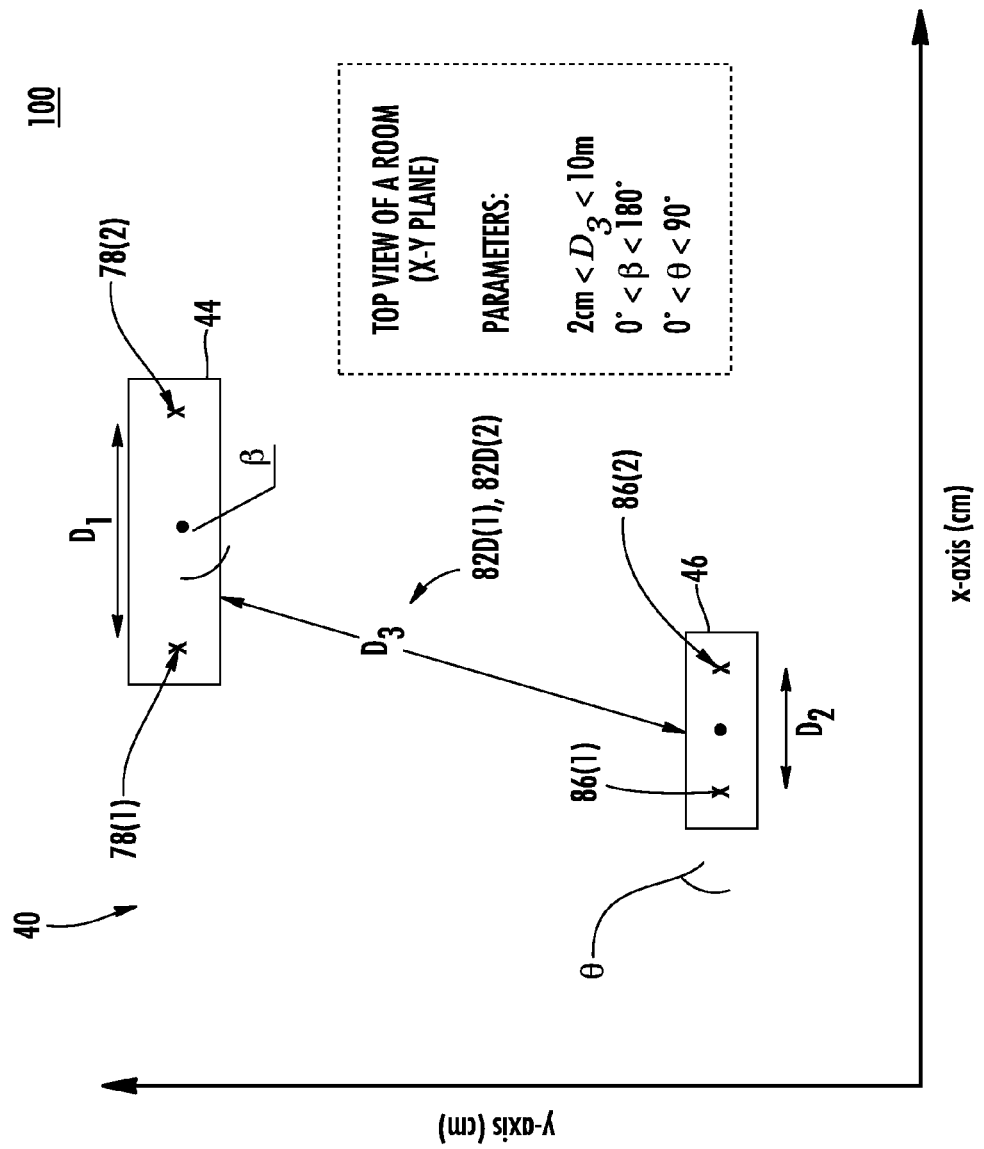
FIG. 3A is a top view diagram of a room having an exemplary MIMO antenna system comprising two (2) MIMO transmitter antennas in line-of-sight (LOS) with two (2) MIMO receiver antennas to illustrate periodic destructive interference in MIMO communications signals received in the same frequency channel by the MIMO receiver antennas.

FIG. 3A illustrates a top view of a room 100 employing the exemplary MIMO distributed antenna system 40 in FIG. 2 to discuss performance of MIMO communications as affected by antenna placement. As illustrated in FIG. 3A, the two MIMO transmitter antennas 78(1), 78(2) of the remote unit 44 are shown as being located in the room 100. Similarly, a client device 46 is shown with its two MIMO receiver antennas 86(1), 86(2) configured to receive the electrical downlink MIMO communication signals 82D(1), 82D(2) from the two MIMO transmitters 81(1), 81(2) (shown in FIG. 2) in MIMO configuration. The two MIMO transmitter antennas 78(1), 78(2) and two MIMO receiver antennas 86(1), 86(2) are placed according to the LOS arrangement. The LOS arrangement ensures that the electrical downlink MIMO communication signals 82D(1), 82D(2) from the two MIMO transmitters 81(1), 81(2) are directed towards the two MIMO receiver antennas 86(1), 86(2), even if the electrical downlink MIMO communication signals 82D(1), 82D(2) are reflected on the downlink propagation path. In other words, the LOS arrangement does not stop the two MIMO receiver antennas 86(1), 86(2) from receiving reflected signals. The MIMO transmitter antennas 78(1), 78(2) in the MIMO transmitters 81(1), 81(2) in the remote unit 44 are separated by a distance $D_1$. The MIMO receiver antennas 86(1), 86(2) in the client device 46 are separated by a distance $D_2$. In absence of multipath due to the LOS arrangement, issues can arise, due to destructive interference, with MIMO algorithm being able to solve the channel matrix for received electrical downlink MIMO communication signals 82D(1), 82D(2) at the client device 46 as a function of the distance $D_1$ between the MIMO transmitter antennas 78(1), 78(2) in the remote unit 44, the distance $D_2$ between MIMO receiver antennas 86(1), 86(2) in the client device 46, and the distance $D_3$ between remote unit 44 and the client device 46. These issues are also referred to herein as location-dependent destructive interference issues.

Figure 3B:
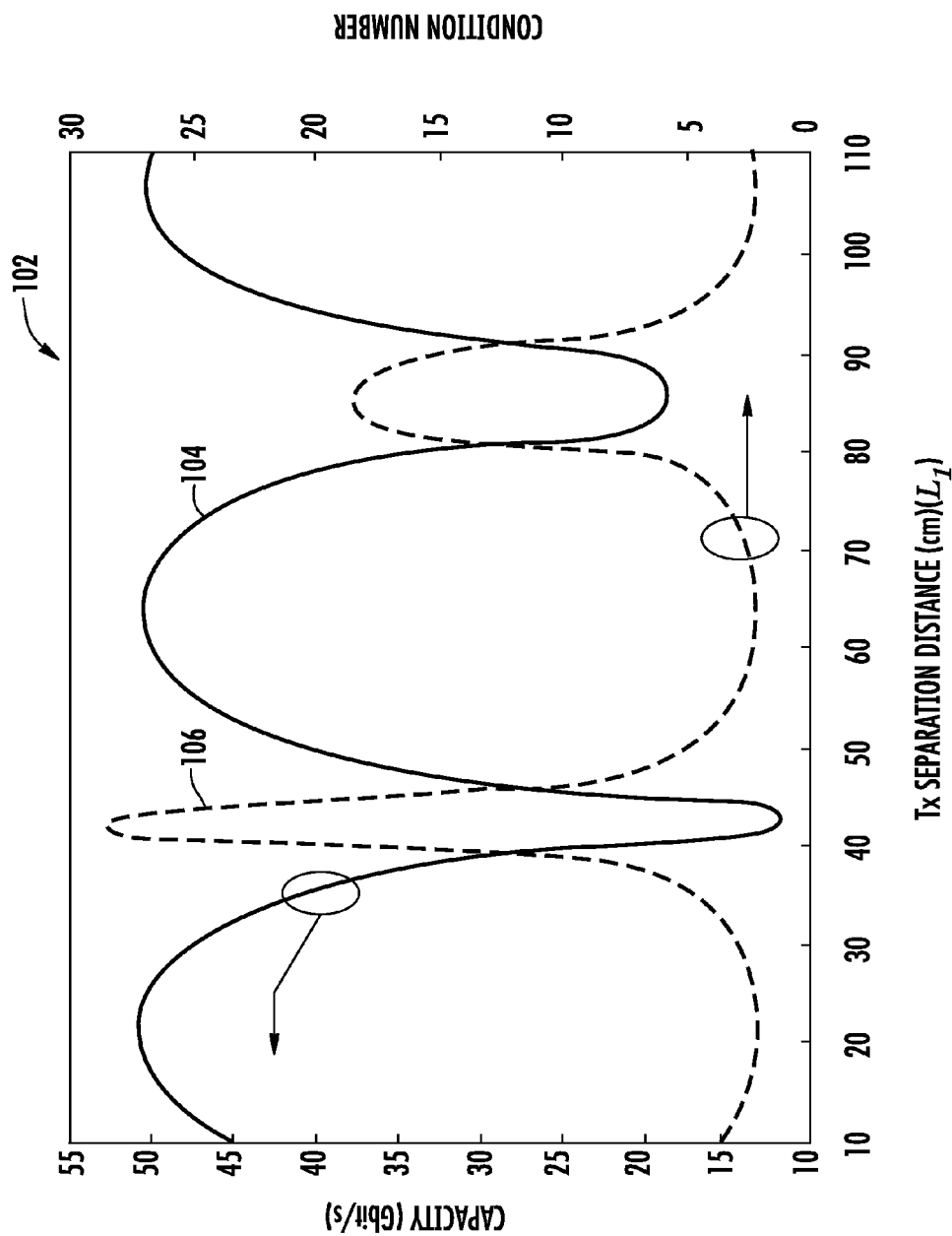
FIG. 3B is a graph illustrating exemplary measured periodic performance degradations for a given placement distance between the MIMO transmitter antennas in the MIMO antenna system in FIG. 3A.

Location-dependent destructive interference for the received electrical downlink MIMO communication signals 82D(1), 82D(2) can negatively affect MIMO communications performance. These issues with electrical downlink MIMO communication signals 82D(1), 82D(2) received by the MIMO receiver antennas 86(1), 86(2) can occur due to lack of separation (e.g., phase, amplitude) in the received electrical downlink MIMO communication signals 82D(1), 82D(2), especially in LOS communications. To illustrate the effect of these issues, FIG. 3B illustrates a graph 102 illustrating the exemplary measured performance degradation for a given placement distance between the MIMO transmitter antennas 78(1), 78(2) in FIG. 3A. The graph 102 in FIG. 3B illustrates the capacity on the y-axis in Gigabits per second (Gbps) versus the MIMO transmitter antennas 78(1), 78(2) separation distance $D_1$ in centimeters. As illustrated in the graph 102, at separation distances $D_1$ of approximately 42 centimeters (cm) and 85 cm, the communications capacity illustrated by a capacity curve 104 is periodically degraded due to periodic destructive interferences between the received electrical downlink MIMO communication signals 82D(1), 82D(2). Similarly, a MIMO condition number curve 106 in FIG. 3B also illustrates the effect periodic destructive interferences between the received electrical downlink MIMO communication signals 82D(1), 82D(2), which is complementary to the capacity curve 104.

Figure 3C:
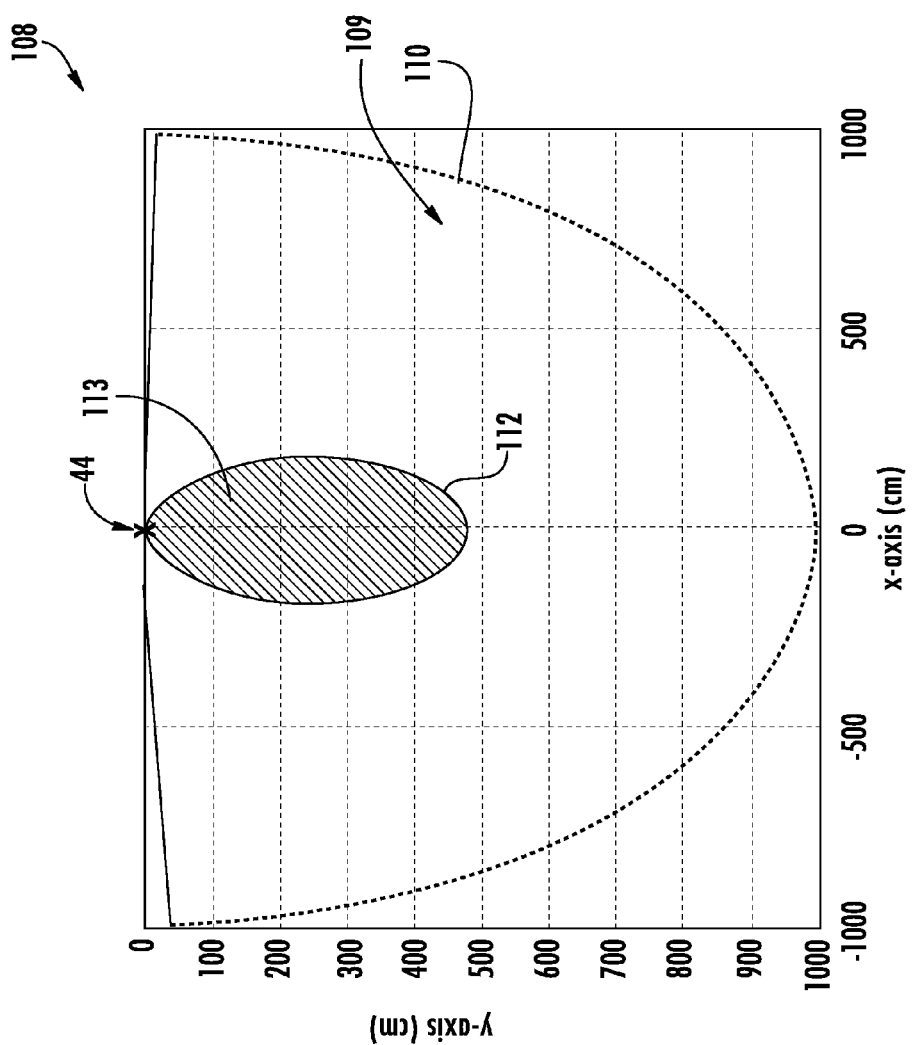
FIG. 3C is a graph illustrating an exemplary effective antenna coverage area in proximity to the MIMO transmitter antennas in FIG. 3A.

FIG. 3C illustrates a graph 108 representing an exemplary effective communication coverage area provided by the MIMO distributed antenna system 40 in FIG. 2 according to the MIMO transmitter antennas 78(1), 78(2), separation distance $D_1$, the MIMO receiver antennas 86(1), 86(2), separation distance $D_2$ in FIG. 3A, and distance $D_3$ therebetween. As illustrated in FIG. 3C, a desired antenna coverage area 109 is shown as being provided by the area formed inside a boundary line 110. However, an actual communication coverage area 113 for the remote unit 44 is provided inside the boundary line 112, illustrating the effect in reduction communication range of the remote unit 44.

To address these issues, FIGS. 4-8D are provided to illustrate exemplary distributed antenna systems configured to reduce location-dependent destructive interference in distributed antenna systems operating in MIMO configuration. In these embodiments, to provide spatial separation of MIMO communication signals received by MIMO receivers in client devices, multiple MIMO transmitters in a remote unit are each configured to employ multiple transmitter antennas. The multiple transmitter antennas are each configured to transmit communications signals in different polarization states. In certain embodiments, one of the MIMO communications signals is amplitude adjusted in one of the polarization states to provide amplitude separation between MIMO communication signals received by the MIMO receivers.

In this regard, FIG. 4 illustrates an exemplary amplitude adjustment circuit for amplitude adjusting a DL MIMO communication signal transmitted by a MIMO transmitter antenna 78 in FIG. 2. The exemplary amplitude adjustment circuit 120 comprises a signal controller 122 and an amplitude adjustment logic 124. As a non-limiting example, the amplitude adjustment logic 124 may be implemented by a hardware component, a software function, or a combination of both. In another non-limiting example, the signal controller 122 may be a digital baseband processor, a digital signal processor, a MIMO controller, or a general-purpose processor (e.g., central processing unit (CPU)). The signal controller 122 receives a MIMO performance measurement 126 on an uplink reception path (not shown). The signal controller 122 is configured to compare the MIMO performance measurement 126 with a pre-determined MIMO performance threshold. If the MIMO performance measurement 126 indicates a MIMO performance level is below the pre-determined MIMO performance threshold, the signal controller 122 is further configured to provide an amplitude adjustment signal 128 to the amplitude adjustment logic 124 to perform amplitude adjustment on a downlink MIMO communication signal 130. The amplitude adjustment logic 124 in turn performs amplitude adjustment on the downlink communication signal 130 received from a downlink transmission path (not shown). The amplitude adjustment circuit thus produces an amplitude-adjusted downlink communication signal 134 that is sent to a MIMO transmitter antenna on the downlink transmission path (not shown). In a non-limiting example, if the DL MIMO communication signal 130 has an original amplitude x, the amplitude adjustment logic 124 may produce a modified amplitude y that is different from the original amplitude x for the amplitude-adjusted downlink communication signal 134.

Figure 5:
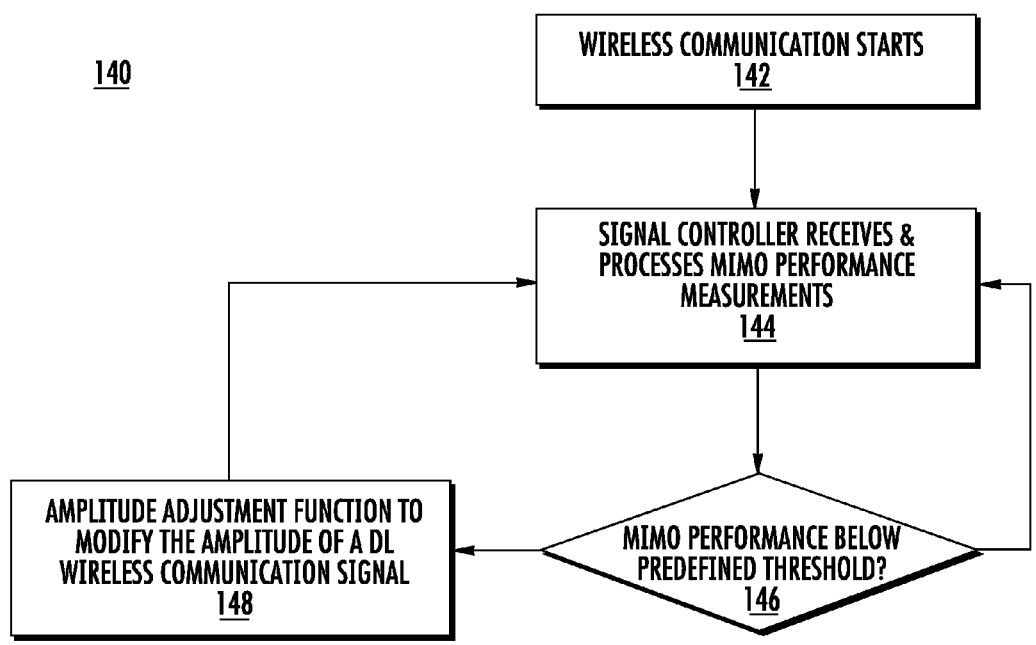
FIG. 5 is a flowchart illustrating an exemplary amplitude adjustment process performed by the exemplary amplitude adjustment circuit in FIG. 4 for amplitude adjusting a downlink (DL) MIMO communications signal transmitted by a MIMO transmitter antenna in FIG. 2.

With continuing reference to FIG. 4, FIG. 5 illustrates an exemplary amplitude adjustment process performed by the exemplary amplitude adjustment circuit in FIG. 4. FIGS. 2 and 4 are referenced in connection with FIG. 5 and will not be re-described herein. The amplitude adjustment process 140 is invoked when wireless communication starts (block 142). The signal controller 122 receives and processes a MIMO performance measurement (block 144) and compares the MIMO performance measurement with a pre-determined threshold (block 146). If the MIMO performance measurement is above the pre-determined threshold, it indicates that the MIMO transmitter antennas 78 are performing as expected. In this case, the signal controller 122 will not take any action and awaits a next MIMO performance measurement. If, however, the MIMO performance measurement is below the pre-determined threshold, it is an indication that the MIMO transmitter antennas 78 are not performing as expected. Under such circumstance, the signal controller 122 will instruct the amplitude adjustment logic 124 to modify the amplitude of the downlink MIMO communication signal 130 (block 148). The amplitude adjustment process 140 repeats the step of comparing MIMO performance measurement against the pre-determined threshold (block 146) and the step of amplitude adjustment (block 148) until the next MIMO performance measurement is above the pre-determined threshold.

Figure 6A:
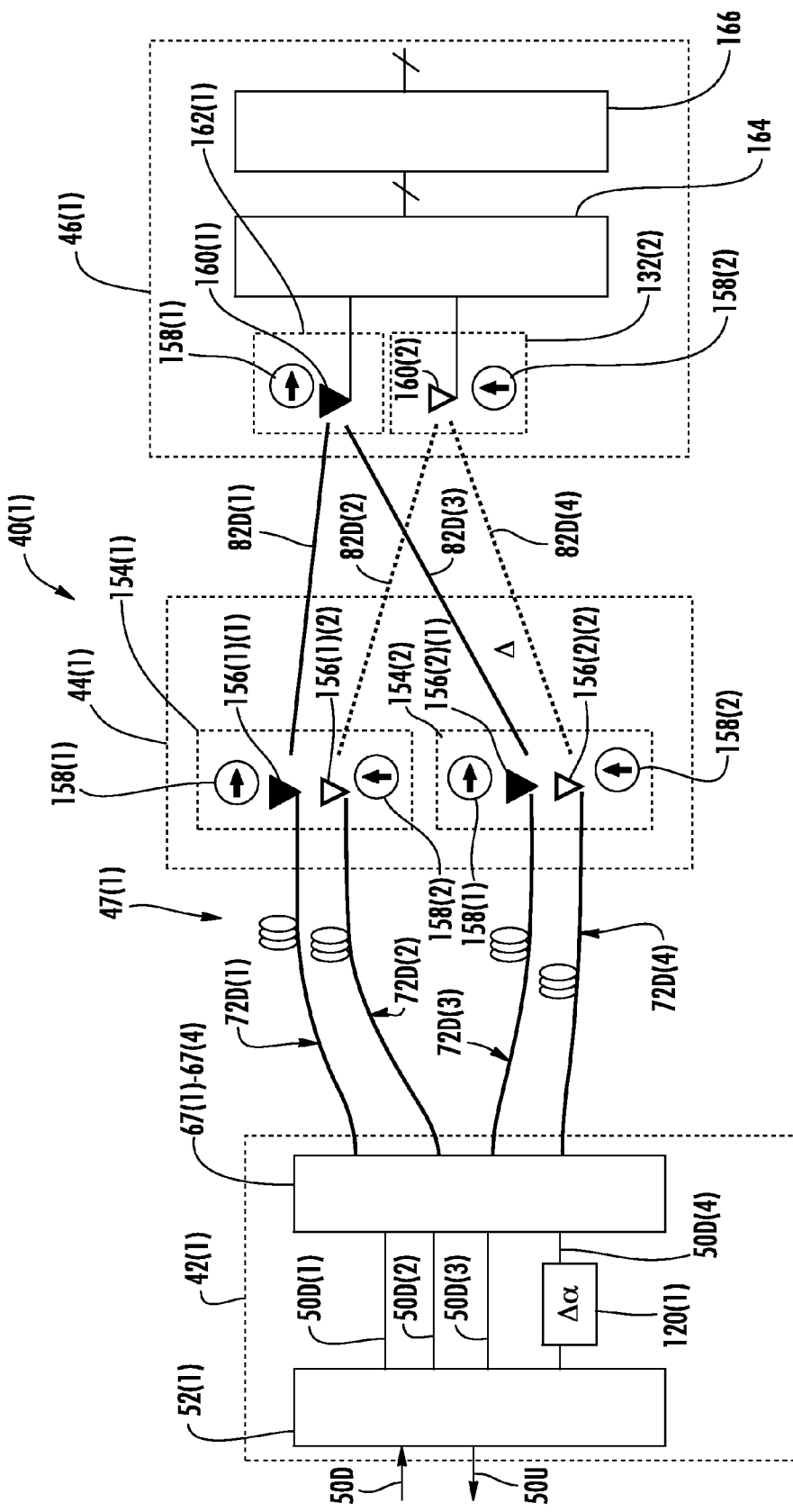
FIG. 6A is a schematic diagram of an exemplary MIMO optical fiber-based distributed antenna system employing a central unit employing a MIMO transmitter configured to electrically amplitude adjust at least one transmitted MIMO electrical downlink communications signal received and transmitted by a remote unit employing multiple MIMO transmitters each configured with multiple MIMO transmitter antennas configured to transmit in different polarization states.
Figure 6B:
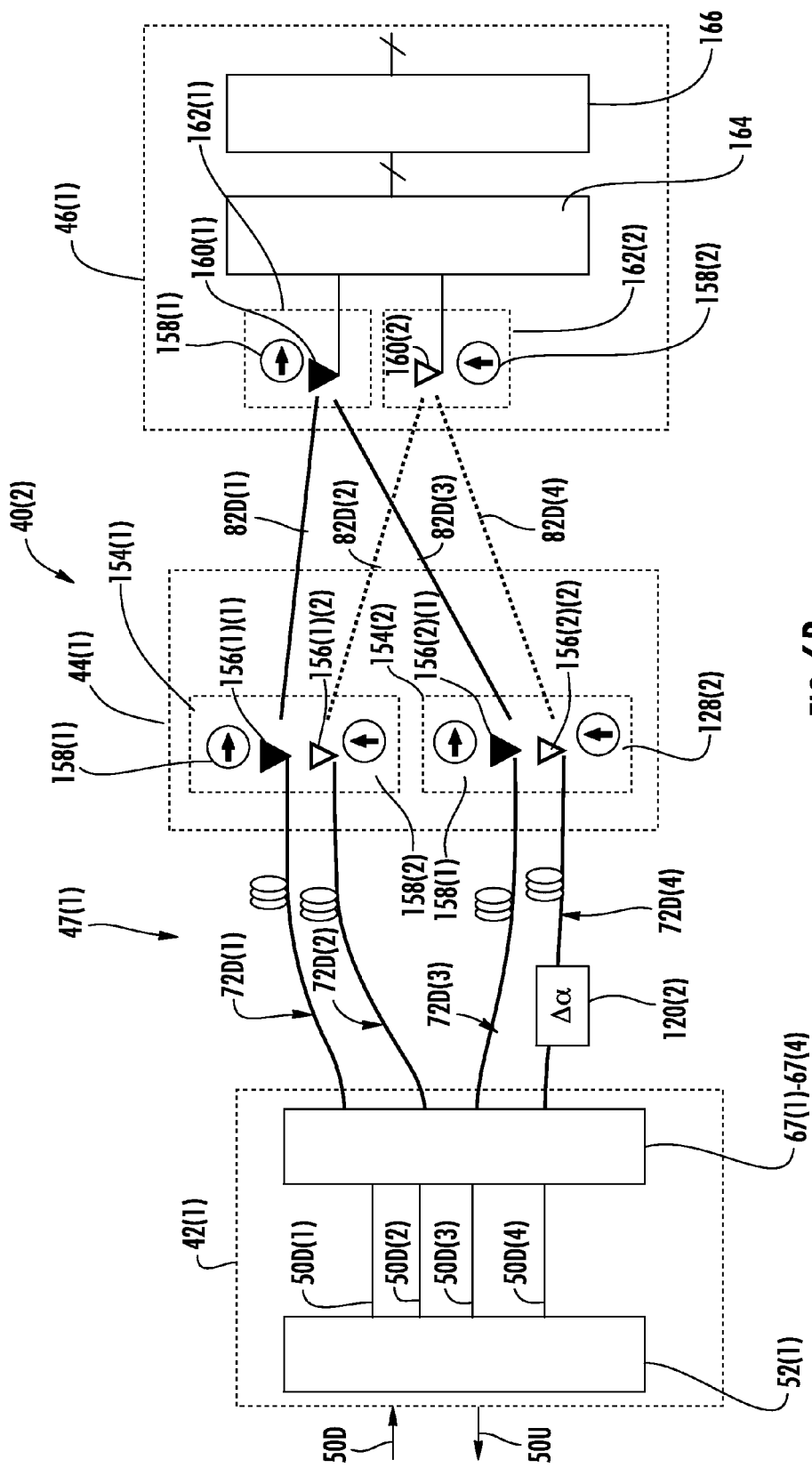
FIG. 6B is a schematic diagram of an exemplary MIMO optical fiber-based distributed antenna system employing an amplitude adjustment circuit of FIG. 4 in an optical downlink communications medium configured to provide amplitude adjustment to at least one transmitted MIMO electrical downlink communications signal received and transmitted by a remote unit employing multiple MIMO transmitters each configured with multiple MIMO transmitter antennas configured to transmit in different polarization states.
Figure 6C:
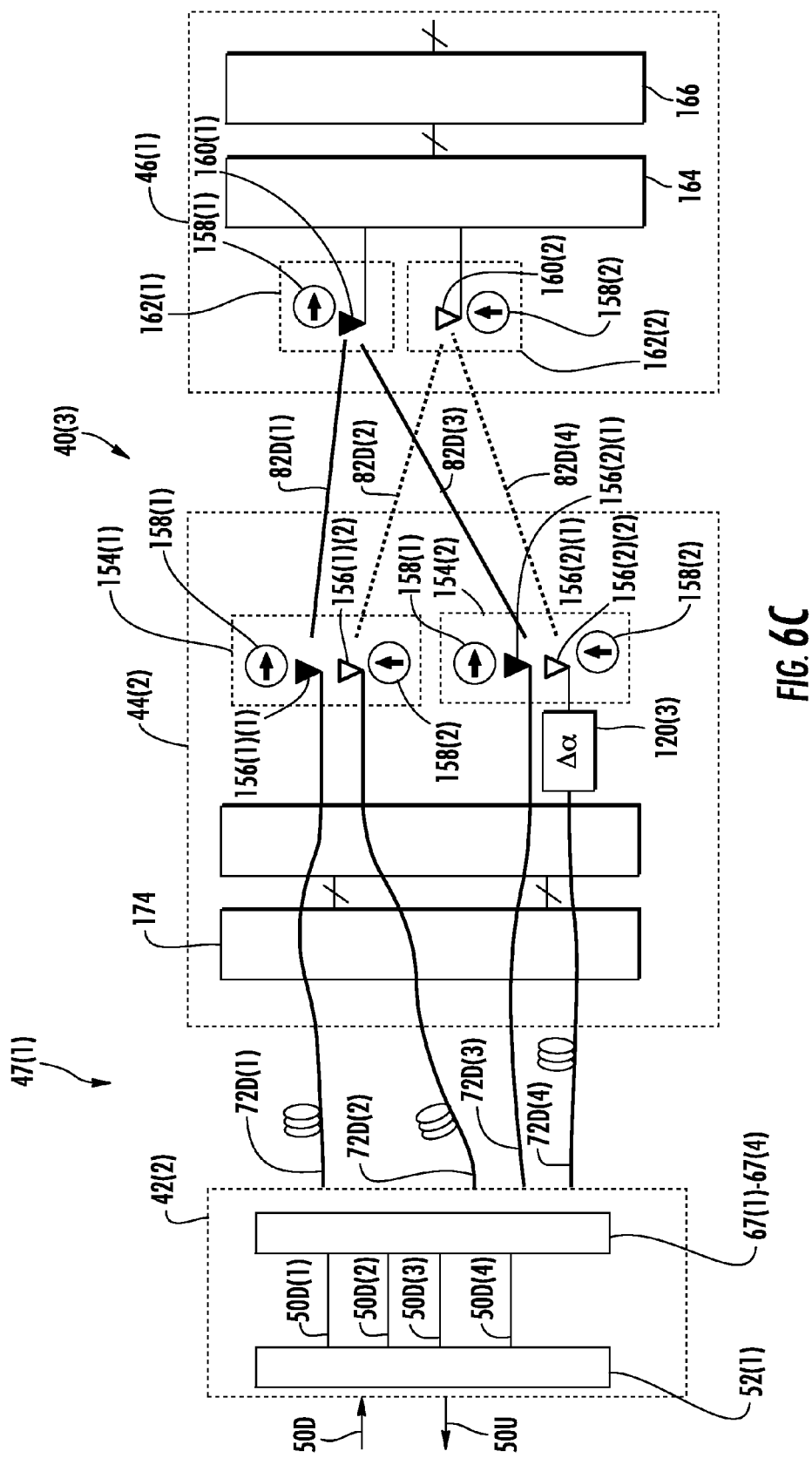
FIG. 6C is a schematic diagram of an exemplary MIMO optical fiber-based distributed antenna system employing remote units employing multiple MIMO transmitters each employing multiple MIMO transmitter antennas configured to transmit in different polarization states, wherein one of the MIMO electrical downlink communications signals transmitted by one of the MIMO transmitters in a polarization state is electrically amplitude adjusted.

In this regard, FIGS. 6A-6C illustrate alternative MIMO distributed antenna systems 40(1)-40(3) similar to the MIMO distributed antenna system 40 in FIG. 2. FIGS. 6A-6C respectively illustrate three (3) different downlink signal processing stages in the MIMO distributed antenna systems 40(1)-40(3) wherein the amplitude adjustment circuit 120 may be provided. The MIMO distributed antenna systems 40(1)-40(3) in FIGS. 6A-6C are configured to reduce or eliminate periodic destructive interferences between received downlink communication signals at a MIMO receiver in a client device so as to reduce or eliminate performance degradation such as shown in FIGS. 3B and 3C above. The MIMO distributed antenna systems 40(1)-40(3) may include the same components in the MIMO distributed antenna system 40 in FIG. 2 unless otherwise noted in FIGS. 6A-6C. Elements of FIG. 4 are referenced in connection with FIGS. 6A-6C and will not be re-described herein.

With reference to FIG. 6A, a central unit 42(1) is configured to receive the electrical downlink MIMO communications signals 50D as discussed in regard to FIG. 2. However, a signal processor 52(1) is configured to split the electrical downlink MIMO communications signals 50D into four (4) electrical downlink MIMO communications signals 50D(1)-50D(4) over four separate channels. As a first option, an amplitude adjustment circuit 120(1) is provided in the central unit 42(1) to amplitude adjust at least one of the electrical downlink MIMO communications signals 50D. Note that although the electrical downlink MIMO communications signal 50D(4) is amplitude adjusted in this example, any other(s) downlink MIMO communications signal(s) 50D(1)-50D(3) could be amplitude adjusted as well. The amplitude adjustment circuit 120(1) may be programmed or controlled by the signal controller 122 to provide a pre-determined level of amplitude adjustment, if desired. Turning back to the central unit 42(1), electro-optical converters 67(1)-67(4) are provided to convert the electrical downlink MIMO communications signals 50D(1)-50D(4) into optical downlink MIMO communications signals 72D(1)-72D(4) provided over optical fiber communications medium 47(1).

With continuing reference to FIG. 6A, the remote unit 44(1) includes two MIMO transmitters 154(1), 154(2) in MIMO configuration. However, the MIMO transmitters 154(1), 154(2) each include two MIMO transmitter antennas 156(1)(1), 156(1)(2), and 156(2)(1), 156(2)(2). The first MIMO transmitter 154(1) includes the first MIMO transmitter antenna 156(1)(1) configured to radiate the first electrical downlink MIMO communications signals 82D(1) (after conversion from optical to electrical signals) in a first polarization 158(1). The first MIMO transmitter 154(1) also includes the second MIMO transmitter antenna 156(1)(2) configured to radiate the second electrical downlink MIMO communications signal 82D(2) in a second polarization 158(2) different from the first polarization 158(1). In this manner, the first and second electrical downlink MIMO communications signals 82D(1), 82D(2) can be received by two different MIMO receiver antennas 160(1), 160(2) in MIMO receivers 162(1), 162(2), respectively, each configured to receive signals in different polarizations 158(1), 158(2) among the first and second polarizations 158(1), 158(2) without experiencing periodic destructive interferences. Thus, the MIMO receivers 162(1), 162(2) can receive the first and second electrical downlink MIMO communications signal 82D(1), 82D(2) in different polarizations 158(1), 158(2), respectively, from the first MIMO transmitter 154(1) so that a MIMO algorithm can solve the channel matrix for the first and second electrical downlink MIMO communications signal 82D(1), 82D(2). In this embodiment, the first polarization 158(1) is configured to be orthogonal to the second polarization 158(2) to maximize spectral efficiency and minimize cross talk between the electrical downlink MIMO communications signals 82D(1), 82D(2) at the MIMO receivers 162(1), 162(2), but this configuration is not required.

With continuing reference to FIG. 6A, the second MIMO transmitter 154(2) in the remote unit 44(1) includes a third MIMO transmitter antenna 156(2)(1) configured to radiate the third electrical downlink MIMO communications signals 82D(3) (after conversion from optical to electrical signals) in the first polarization 158(1). The second MIMO transmitter 154(2) also includes the fourth MIMO transmitter antenna 156(2)(2) configured to radiate the fourth electrical downlink MIMO communications signal 82D(4) in the second polarization 158(2) different from the first polarization 158(1). In this manner, the third and fourth electrical downlink MIMO communications signals 82D(3), 82D(4) can also be received by the two different MIMO receiver antennas 160(1), 160(2) in MIMO receivers 162(1), 162(2), respectively, each configured to receive signals in different polarizations 158(1), 158(2) among the first and second polarizations 158(1), 158(2). Thus, the MIMO receivers 162(1), 162(2) can receive the third and fourth electrical downlink MIMO communications signal 82D(3), 82D(4) in different polarizations, respectively, from the second MIMO transmitter 154(2) between the third and fourth electrical downlink MIMO communications signal 82D(3), 82D(4). The electrical downlink MIMO communications signals 82D(1)-82D(4) are received by the MIMO receivers 162(1), 162(2) and provided to a signal processor 164 and a MIMO processor 166 for processing.

As previously discussed above, the amplitude adjustment circuit 120(1) is provided in the central unit 42(1) to amplitude adjust the electrical downlink MIMO communications signal 50D(4) The amplitude adjustment in the above example in turn causes the second and fourth electrical downlink MIMO communications signals 82D(2), 82D(4) to be received by the second MIMO receiver antennas 160(2) to have a small but sufficient amplitude difference. Further, the second and fourth electrical downlink MIMO communications signals 82D(2), 82D(4) are also received by the second MIMO receiver antenna 160(2) in the second polarization 158(2), which is different from the first and third electrical downlink MIMO communications signals 82D(1), 82D(3) received by the first MIMO receiver 162(1) in the first polarization 158(1). This combination of amplitude adjustment and MIMO transmitter antenna polarization can reduce or eliminate periodic destructive interferences between the first and the third electrical downlink MIMO communications signals 82D(1), 82D(3) being received by the first MIMO receiver 162(1) and between the second and the fourth electrical downlink MIMO communications signals 82D(2), 82D(4) being received by the second MIMO receiver 162(2).

As previously stated above, the amplitude adjustment circuit 120 can be provided in other downlink signal processing stages of the MIMO distributed antenna system 40 other than in the central unit, as provided in the MIMO distributed antenna system 40(1) in FIG. 6A. In this regard, FIG. 6B is a schematic diagram of another MIMO optical fiber-based distributed antenna system 40(2) ("MIMO distributed antenna system 40(2)") employing an amplitude adjustment circuit 120(2) in the optical fiber communications medium 47(1). The amplitude adjustment circuit 120(2) can be tunable to allow for the amplitude adjustment to be controlled and tuned. The amplitude adjustment circuit 120(2) may be an optical attenuator or amplifier that makes the amplitude of the optical downlink MIMO communications signal 72D(1) smaller or larger, respectively, than the other downlink optical fibers of the optical fiber communications medium 47(1). Common elements between the MIMO distributed antenna system 40(1) in FIG. 6A and the MIMO distributed antenna system 40(2) in FIG. 6B are noted with common element numbers and will not be re-described. In this embodiment, the amplitude adjustment circuit 120(2) is configured to optically amplitude adjust the optical downlink MIMO communications signal 72D(4) received and transmitted by the second MIMO transmitter 154(2) to the client device 46(1). The central unit 42(2) in FIG. 6B does not include the amplitude adjustment circuit 120(1) to amplitude shift downlink electrical communications signals like provided in the central unit 42(1) in FIG. 6A.

As previously discussed above with regard to FIGS. 6A and 6B, the amplitude adjustment circuit 120 can be provided in the central unit 42(1) and/or the optical fiber communications medium 47(1) to amplitude adjust the electrical downlink MIMO communications signal 50D(4). In this regard, FIG. 6C is a schematic diagram of another MIMO optical fiber-based distributed antenna system 40(3) ("MIMO distributed antenna system 40(3)") employing an amplitude adjustment circuit 120(3) in the form of an antenna power attenuator or amplifier in the remote unit 44(2). Common elements between the MIMO distributed antenna system 40(3) in FIG. 6C and the MIMO distributed antenna systems 40(1), 40(2) in FIGS. 6A and 6B are noted with common element numbers and will not be re-described. In this embodiment, a signal processor 174 in the remote unit 44(2) receives the optical downlink MIMO communications signals 72D(1)-72D(4) and converts these signals into electrical downlink MIMO communications signals 82D(1)-82D(4) in an optical-to-electrical converter. The amplitude adjustment circuit 120(3) is configured to electrically amplitude adjust the electrical downlink MIMO communications signal 82D(4) received and transmitted by the second MIMO transmitter 154(2) in the remote unit 44(2) to the client device 46(1) so that periodic destructive interferences resulting from LOS arrangement can be reduced or eliminated at the MIMO receivers 162(1), 162(2).

Figure 7:
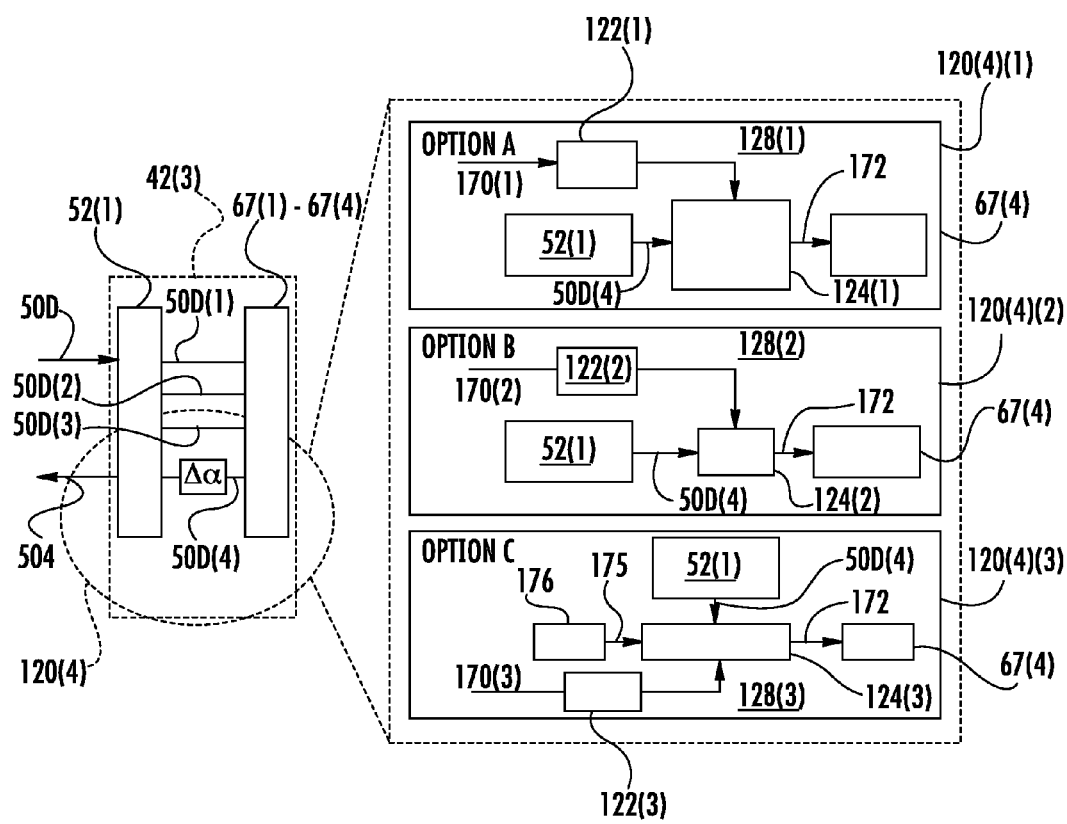
FIG. 7 is a schematic diagram illustrating exemplary implementation options of an amplitude adjustment circuit in FIG. 4 in a central unit in FIGS. 6A-6C.

With reference back to FIG. 4, the amplitude adjustment circuit 120 includes the amplitude adjustment logic 124 configured to make amplitude adjustment on the DL MIMO communication signal 130 based on the amplitude adjustment signal 128 received from the signal controller 122. Also with reference back to FIG. 6A, the amplitude adjustment circuit 120(1) is provided in the central unit 42(1) of the MIMO distributed antenna system 40(1) to electronically amplitude adjust at least one of the electrical downlink MIMO communications signals 50D(4). The amplitude adjustment circuit 120(1) may be configured to provide amplitude adjustment in a plurality of ways depending on how the amplitude adjustment logic 124 is implemented. In this regard, FIG. 7 illustrates exemplary implementation options of the amplitude adjustment circuit 120(1) in the central unit 42(1). Elements of FIGS. 4 and 6A are referenced in connection with FIG. 7 and will not be re-described herein. Common elements between the central unit 42(1) in FIG. 6A and the central unit 42(3) in FIG. 7 are noted with common element numbers and will not be re-described.

With reference to FIG. 7, an amplitude adjustment circuit 120(4) in the central unit 42(3) may be implemented in three different options 120(4)(1), 120(4)(2), and 120(4)(3). An amplitude adjustment option 120(4)(1) comprises a signal controller 122(1) configured to receive a control signal 170(1) from a baseband signal processing module (not shown) and provide an amplitude adjustment signal 128(1) to an amplitude adjustment logic 124(1). In response to receiving the amplitude adjustment signal 128(1), the amplitude adjustment logic 124(1) performs amplitude adjustment on a downlink MIMO communications signal 50D(4) received from a signal processor 52(1). The amplitude adjustment logic 124(1), in this non-limiting example, is a tunable attenuator or a variable gain amplifier (VGA) that may be electronically controlled by the signal controller 122(1) to reduce or increase amplitude of the downlink MIMO communications signal 50D(4). An amplitude adjusted downlink MIMO communications signal 172 is received by an electrical/optical converter 67(4) and converted into an optical downlink MIMO communications signal 72D(4) (not shown) for transmission over the fiber communication medium 47(1) (not shown). Note that although the electrical downlink MIMO communications signal 50D(4) is amplitude adjusted in this example, any other(s) downlink MIMO communications signal(s) 50D(1)-50D(3) could be amplitude adjusted in the same way as the downlink MIMO communications signal 50D(4). Alternatively, an amplitude adjustment option 120(4)(2) comprises an amplitude adjustment logic 124(2) configured to provide amplitude adjustment on the downlink MIMO communications signal 50D(4) received from the signal processor 52(1) by adjusting bias signal of a laser diode. Common elements between the amplitude adjustment option 120(4)(1) and the amplitude adjustment option 120(4)(2) are noted with common element numbers and will not be re-described.

With continuing reference to FIG. 7, a third amplitude adjustment option 120(4)(3) comprises an amplitude adjustment logic 124(3) that is an optical modulator. In a non-limiting example, the amplitude adjustment logic 124(3) may be a Mach-Zehnder modulator (MZM) or an electro-absorption modulator (EAM). A bias voltage signal 175 is provided to the amplitude adjustment logic 124(3) from a laser diode 176. Biasing in electronic circuits is a method of establishing various pre-determined voltage or current pointes to provide proper operating conditions in the amplitude adjustment logic 124(3). In a typical EAM, for example, a 0.3 volt (V) variation in bias signal results in approximately three (3) decibel (dB) amplitude variation in an output signal. Thus, by providing the bias voltage signal 175 to the amplitude adjustment logic 124(3), the amplitude of the downlink MIMO communications signal 50D(4) received from the signal processor 52(1) may be adjusted. Other common elements among the amplitude adjustment circuit 120(4)(1), 120(4)(2), 120(4)(3) are noted with common element numbers and will not be re-described.

To help visualize the concept of amplitude adjustment, FIGS. 8A-8B are provided. Elements of FIGS. 6A-6C are referenced in connection with FIGS. 8A-8B and will be re-described herein. FIG. 8A is a graph illustrating exemplary MIMO communication signal waveforms transmitted by MIMO transmitter antennas 156(2)(1), 156(2)(2) in a remote unit 44(1) without amplitude adjustment. As shown in FIG. 8A, when amplitude adjustment is not provided to the MIMO transmitter antennas 156(2)(1), 156(2)(2) in FIG. 6A, the downlink MIMO communications signals 82D(3), 82D(4) both have the same first amplitudes x. FIG. 8B is a graph illustrating exemplary MIMO communication signal waveforms transmitted by MIMO transmitter antennas 156(2)(1), 156(2)(2) in a remote unit 44(1) when amplitude adjustment is provided to the MIMO transmitter antenna 156(2)(2). As can be seen in FIG. 8B, a second amplitude y of the downlink MIMO communications signal 82D(4) is smaller than the first amplitude x of the downlink MIMO communications signal 82D(3). An amplitude adjustment factor $\alpha$ is computed as the ratio between y and x ($\alpha=y/x$). For example, the amplitude adjustment factor $\alpha=0.7$ indicates that the second amplitude y is 70% of the first amplitude x. As previously described in FIGS. 6A-6C, such amplitude difference, in conjunction with different polarization states 158(1), 158(2), can help reduce or eliminate periodic destructive interferences between the downlink MIMO communications signals 82D(3), 82D(4) at the MIMO receivers 162. Note that although in FIG. 8B, the amplitude y of the downlink MIMO communications signal 82D(4) is shown to be smaller than the amplitude x of the downlink MIMO communications signal 83D(3), it is possible to amplify the amplitude y of the downlink MIMO communications signal 82D(4) to be larger than the amplitude x of the downlink MIMO communications signal 82D(3). Further, although the downlink MIMO communications signals 82D(4) in FIGS. 8A and 8B are shown to have the same phase, it is also possible to simultaneously phase shift and amplitude adjust the downlink MIMO communications signal 82D(4).

Figure 8C:
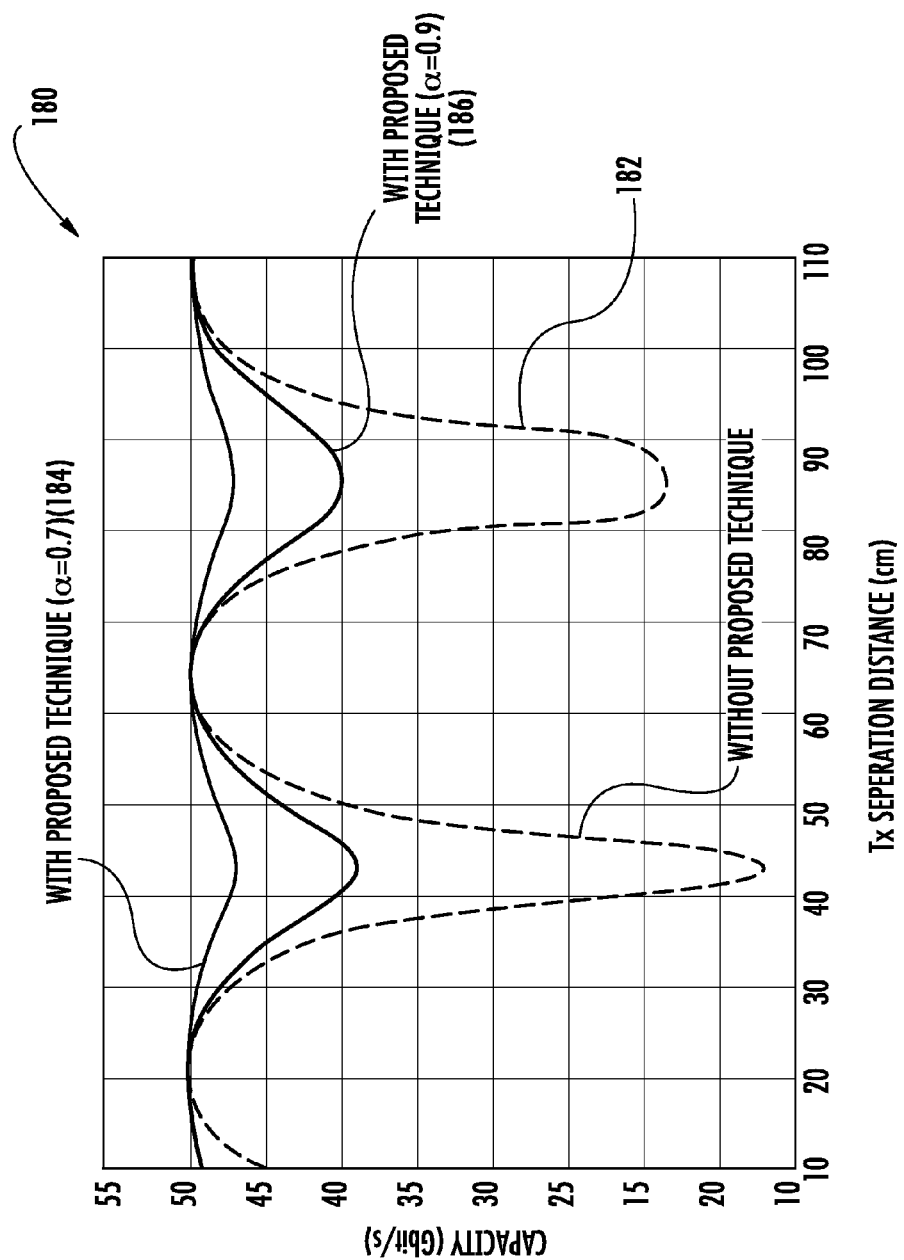
FIG. 8C is a graph illustrating exemplary measured periodic performance degradation for a given placement distance between MIMO transmitter antennas in a MIMO transmitter in a remote unit in the distributed antenna system in FIGS. 6A-6C, when employing and not employing amplitude adjustment of at least one transmitted downlink communications signals.

To illustrate the performance improvements provided by the amplitude adjustment circuits 120(1)-120(3) in the MIMO distributed antenna systems 40(1)-40(3) in FIGS. 6A-6C, FIG. 8C illustrates a graph 180 illustrating exemplary performance degradation curves for a given placement distance between the MIMO transmitters 154(1), 154(2). Similar to graph 102 in FIG. 3B, FIG. 8C illustrates MIMO distributed antenna systems 40(1)-40(3) capacity on the y-axis in units of Gigabits per second (Gbps) versus MIMO transmitter antennas 78(1), 78(2) separation distance on the x-axis in units of centimeters (cm). The capacity degradation curve 182 in FIG. 8C, which is equivalent to the capacity curve 104 in FIG. 3B, illustrates severe periodic capacity dips resulting from periodic destructive interference when amplitude adjustment techniques described above for MIMO distributed antenna systems 40(1)-40(3) are not employed. As shown in the graph 180, for a given transmitter antenna separation distance and a given wireless distance (e.g., a distance between a wireless transmitter and a wireless receiver), a capacity degradation curve 184 and a capacity degradation curve 186 illustrate different degrees of capacity degradations when amplitude adjustment techniques described above for MIMO distributed antenna systems 40(1)-40(3) are employed. In this non-limiting example, the capacity degradation curves 184 and 186 are associated with amplitude adjustment factors $\alpha=0.7$ and $\alpha=0.9$, respectively. As can be seen in the capacity degradation curves 184, 186, periodic capacity dips, although not completely eliminated, do become more moderate as result of reduced periodic destructive interference provided by amplitude adjustment techniques described above for MIMO distributed antenna systems 40(1)-40(3).

Figure 8D:
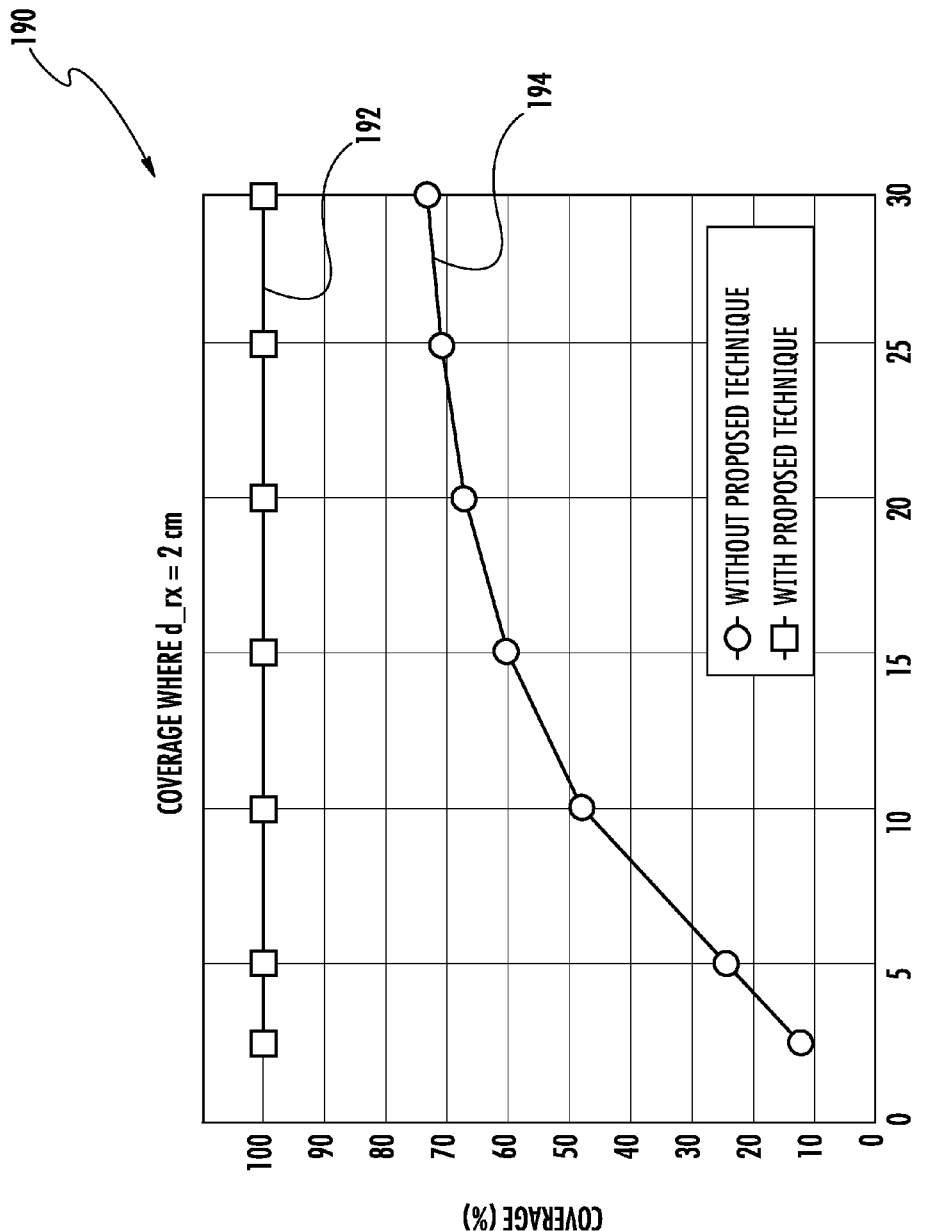
FIG. 8D is a graph illustrating an exemplary effective antenna coverage versus placement distance between MIMO transmitter antennas in a MIMO transmitter in a remote unit in the distributed antenna system in FIGS. 6A-6C, for a given placement distance between MIMO receiver antennas, when employing and not employing amplitude adjustment of at least one transmitted downlink communications signal.

FIG. 8D is a graph 190 illustrating an exemplary effective antenna coverage versus placement distance between MIMO transmitters 154(1), 154(2) in the distributed antenna systems 40(1)-40(3) in FIGS. 6A-6C, for a two (2) cm placement distance between the MIMO receivers 162(1), 162(2). When the amplitude adjustment techniques described above for the MIMO distributed antenna systems 40(1)-40(3) are employed, coverage curve 192 illustrates consistent 100% antenna coverage regardless of placement distance between MIMO transmitters 154(1), 154(2) in the distributed antenna systems 40(1)-40(3) in FIGS. 6A-6C. When the amplitude adjustment techniques described above for the MIMO distributed antenna systems 40(1)-40(3) are not employed, coverage curve 194 illustrates inconsistent antenna coverage dependent upon placement distance between MIMO transmitters 154(1), 154(2) in the distributed antenna systems 40(1)-40(3) in FIGS. 6A-6C.

It may also be desired to provide high-speed wireless digital data service connectivity with remote units in the MIMO distributed antenna systems disclosed herein. One example would be WiFi. WiFi was initially limited in data rate transfer to 12.24 Mb/s and is now provided at data transfer rates of up to 54 Mb/s using WLAN frequencies of 2.4 GHz and 5.8 GHz. While interesting for many applications, WiFi has proven to have too small a bandwidth to support real time downloading of uncompressed high definition (HD) television signals to wireless client devices. To increase data transfer rates, the frequency of wireless signals could be increased to provide larger channel bandwidth. For example, an extremely high frequency in the range of 30 GHz to 300 GHz could be employed. For example, the sixty (60) GHz spectrum is an EHF that is an unlicensed spectrum by the Federal Communications Commission (FCC) and that could be employed to provide for larger channel bandwidths. However, high frequency wireless signals are more easily attenuated or blocked from traveling through walls or other building structures where distributed antenna systems are installed.

Thus, the embodiments disclosed herein can include distribution of extremely high frequency (EHF) (i.e., approximately 30-approximately 300 GHz), as a non-limiting example. The MIMO distributed antenna systems disclosed herein can also support provision of digital data services to wireless clients. The use of the EHF band allows for the use of channels having a higher bandwidth, which in turn allows more data intensive signals, such as uncompressed HD video to be communicated without substantial degradation to the quality of the video. As a non-limiting example, the distributed antenna systems disclosed herein may operate at approximately sixty (60) GHz with approximately seven (7) GHz bandwidth channels to provide greater bandwidth to digital data services. The distributed antenna systems disclosed herein may be well suited to be deployed in an indoor building or other facility for delivering of digital data services.

It may be desirable to provide MIMO distributed antenna systems, according to the embodiments disclosed herein, that provide digital data services for client devices. For example, it may be desirable to provide digital data services to client devices located within a distributed antenna system. Wired and wireless devices may be located in the building infrastructures that are configured to access digital data services. Examples of digital data services include, but are not limited to, Ethernet, WLAN, WiMax, WiFi, DSL, and LTE, etc. Ethernet standards could be supported, including but not limited to, 100 Mb/s (i.e., fast Ethernet) or Gigabit (Gb) Ethernet, or ten Gigabit (10G) Ethernet. Examples of digital data services include, but are not limited to, wired and wireless servers, wireless access points (WAPs), gateways, desktop computers, hubs, switches, remote radio heads (RRHs), baseband units (BBUs), and femtocells. A separate digital data services network can be provided to provide digital data services to digital data devices.

Figure 9:
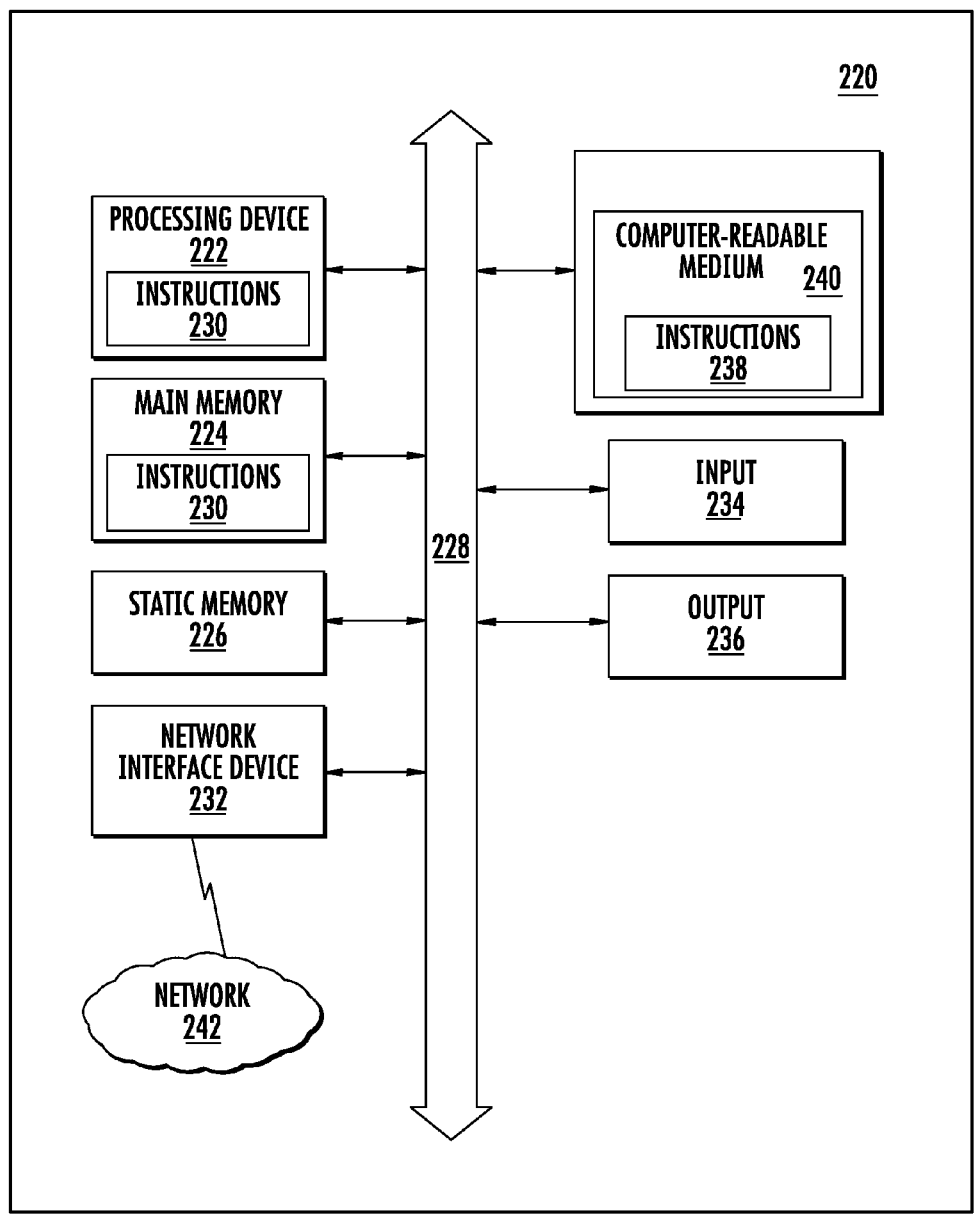
FIG. 9 is a schematic diagram of a generalized representation of an exemplary controller that can be included in any central unit, remote units, wireless client devices, and/or any other components of distributed antenna systems to reduce or eliminate issues of periodic destructive interference in transmitted MIMO electrical downlink communications signals, wherein the exemplary computer system is adapted to execute instructions from an exemplary computer readable medium.

FIG. 9 is a schematic diagram representation of additional detail illustrating components that could be employed in any of the components or devices disclosed herein, but only if adapted to execute instructions from an exemplary computer-readable medium to perform any of the functions or processing described herein. In this regard, such component or device may include a computer system 220 within which a set of instructions for performing any one or more of the location services discussed herein may be executed. The computer system 220 may be connected (e.g., networked) to other machines in a LAN, an intranet, an extranet, or the Internet. While only a single device is illustrated, the term "device" shall also be taken to include any collection of devices that individually or jointly execute a set (or multiple sets) of instructions to perform any one or more of the methodologies discussed herein. The computer system 220 may be a circuit or circuits included in an electronic board card, such as, a printed circuit board (PCB), a server, a personal computer, a desktop computer, a laptop computer, a personal digital assistant (PDA), a computing pad, a mobile device, or any other device, and may represent, for example, a server or a user's computer.

The exemplary computer system 220 in this embodiment includes a processing device or processor 222, a main memory 224 (e.g., read-only memory (ROM), flash memory, dynamic random access memory (DRAM), such as synchronous DRAM (SDRAM), etc.), and a static memory 226 (e.g., flash memory, static random access memory (SRAM), etc.), which may communicate with each other via a data bus 228. Alternatively, the processing device 222 may be connected to the main memory 224 and/or static memory 226 directly or via some other connectivity means. The processing device 222 may be a controller, and the main memory 224 or static memory 226 may be any type of memory.

The processing device 222 represents one or more general-purpose processing devices, such as a microprocessor, central processing unit, or the like. More particularly, the processing device 222 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processing device 222 is configured to execute processing logic in instructions 230 for performing the operations and steps discussed herein.

The computer system 220 may further include a network interface device 232. The computer system 220 also may or may not include an input 234, configured to receive input and selections to be communicated to the computer system 220 when executing instructions. The computer system 220 also may or may not include an output 236, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 220 may or may not include a data storage device that includes instructions 238 stored in a computer-readable medium 240. The instructions 238 may also reside, completely or at least partially, within the main memory 224 and/or within the processing device 222 during execution thereof by the computer system 220, the main memory 224 and the processing device 222 also constituting computer-readable medium. The instructions 238 may further be transmitted or received over a network 242 via the network interface device 232.

While the computer-readable medium 240 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical and magnetic medium, and carrier wave signals.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); a machine-readable transmission medium (electrical, optical, acoustical, or other form of propagated signals (e.g., carrier waves, infrared signals, digital signals, etc.)); and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Further and as used herein, it is intended that terms "fiber optic cables" and/or "optical fibers" include all types of single mode and multi-mode light waveguides, including one or more optical fibers that may be upcoated, colored, buffered, ribbonized, and/or have other organizing or protective structure in a cable such as one or more tubes, strength members, jackets, or the like. The optical fibers disclosed herein can be single mode or multi-mode fibers. Likewise, other types of suitable optical fibers include bend-insensitive optical fibers, or any other expedient of a medium for transmitting light signals. An example of a bend-insensitive, or bend resistant, optical fiber is ClearCurve® Multimode fiber, commercially available from Corning Incorporated. Suitable fibers of this type are disclosed, for example, in U.S. Patent Application Publication Nos. 2008/0166094 and 2009/0169163, the disclosures of which are incorporated herein by reference in their entireties.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A distributed communication system, comprising:
a central unit;
a plurality of optical fibers; and
a plurality of multiple-input, multiple-output (MIMO) remote units coupled to the central unit by the plurality of optical fibers, at least one of the MIMO remote units being configured to wirelessly distribute MIMO communications signals to wireless client devices located in a coverage area, the at least one MIMO remote unit comprising:
  a first MIMO transmitter comprising a first MIMO transmitter antenna configured to transmit MIMO communications signals in a first polarization and a second MIMO transmitter antenna configured to transmit MIMO communications signals in a second polarization different from the first polarization; and
  a second MIMO transmitter comprising a third MIMO transmitter antenna configured to transmit MIMO communications signals in the first polarization and a fourth MIMO transmitter antenna configured to transmit MIMO communications signals in the second polarization, wherein
the first MIMO transmitter is configured to:
  receive a first optical downlink MIMO communications signal at a first amplitude over a first one of the optical fibers and, to transmit the first downlink MIMO communications signal as a first electrical downlink MIMO communications signal wirelessly over the first MIMO transmitter antenna in the first polarization; and
  receive a second optical downlink MIMO communications signal at the first amplitude and, to transmit the second downlink MIMO communications signal as a second electrical downlink MIMO communications signal wirelessly over the second MIMO transmitter antenna in the second polarization, and wherein
the second MIMO transmitter is configured to:
  receive a third optical downlink MIMO communications signal at the first amplitude and, to transmit the third downlink MIMO communications signal as a third electrical downlink MIMO communications signal wirelessly over the third MIMO transmitter antenna in the first polarization; and
  receive a fourth optical downlink MIMO communications signal and, to transmit the fourth downlink MIMO communications signal at a second amplitude modified from the first amplitude, as a fourth electrical downlink MIMO communications signal wirelessly over the fourth MIMO transmitter antenna in the second polarization.

2. The distributed communication system of claim 1, wherein the at least one MIMO remote unit comprises at least one optical-to-electrical (O/E) converter configured to convert the first optical downlink MIMO communications signal before transmission of the first electrical downlink MIMO communications signal.

3. The distributed communication system of claim 2, further comprising at least one amplitude adjustment circuit configured to amplitude adjust the fourth optical downlink MIMO communications signal at the second amplitude.

4. The distributed communication system of claim 3, wherein the at least one amplitude adjustment circuit is further configured to be electronically tunable to adjust the fourth optical downlink MIMO communications signal at the second amplitude.

5. The distributed communication system of claim 3, wherein the amplitude adjustment circuit is configured to attenuate the fourth optical downlink MIMO communications signal at the second amplitude.

6. The distributed communication system of claim 3, wherein the amplitude adjustment circuit is configured to amplify the fourth optical downlink MIMO communications signal at the second amplitude.

7. The distributed communication system of claim 3, wherein the amplitude adjustment circuit is configured to adjust a bias signal of an optical modulator to amplitude adjust the fourth optical downlink MIMO communications signal at the second amplitude.

8. The distributed communication system of claim 3, wherein the second MIMO transmitter is configured to receive the fourth optical downlink MIMO communications signal in the second amplitude as a result of an amplitude adjustment of the fourth optical downlink MIMO communications signal.

9. The distributed communication system of claim 3, wherein at least one of the first electrical downlink MIMO communications signal, the second electrical downlink MIMO communications signal, the third electrical downlink MIMO communications signal, and the fourth electrical downlink MIMO communications signal include a carrier frequency having an extremely high frequency (EHF) between approximately 30 GHz and approximately 300 GHz.

10. The distributed communication system of claim 3, wherein:
the first MIMO transmitter is further configured to transmit the first downlink MIMO communications signal and second downlink MIMO communications signal wirelessly to a line-of-sight (LOS) wireless client; and
the second MIMO transmitter is configured to transmit the third MIMO communications signal and fourth downlink MIMO communications signal wirelessly to a line-of-sight (LOS) wireless client.

11. The distributed communication system of claim 2, wherein the second MIMO transmitter is configured to receive the fourth optical downlink MIMO communications signal at the second amplitude as a result of an amplitude adjustment of the fourth optical downlink MIMO communications signal in the central unit.

12. A method of transmitting multiple-input, multiple-output (MIMO) communications signals to wireless client devices in a coverage area of a distributed communication system, comprising:
receiving a first optical downlink MIMO communications signal at a first amplitude over a first downlink communications medium;
converting the first optical downlink MIMO communications signal to a first electrical downlink MIMO communications signal;
transmitting the first electrical downlink MIMO communications signal over a first MIMO transmitter antenna in a first polarization;
receiving a second optical downlink MIMO communications signal at the first amplitude;
converting the second optical downlink MIMO communications signal to a second electrical downlink MIMO communications signal;
transmitting the second electrical downlink MIMO communications signal over a second MIMO transmitter antenna in a second polarization;
receiving a third optical downlink MIMO communications signal at the first amplitude;
converting the third optical downlink MIMO communications signal to a third electrical downlink MIMO communications signal;
transmitting the third electrical downlink MIMO communications signal over a third MIMO transmitter antenna in the first polarization;
receiving a fourth optical downlink MIMO communications signal;
converting the fourth optical downlink MIMO communications signal to a fourth electrical downlink MIMO communications signal; and
transmitting the fourth electrical downlink MIMO communications signal at a second amplitude modified from the first amplitude, over a fourth MIMO transmitter antenna in the second polarization.

13. The method of claim 12, wherein:
transmitting the first electrical downlink MIMO communications signal comprises transmitting to a line-of-sight (LOS) wireless client;
transmitting the second electrical downlink MIMO communications signal comprises transmitting to a LOS wireless client;
transmitting the third electrical downlink MIMO communications signal comprises transmitting to a LOS wireless client; and
transmitting the fourth electrical downlink MIMO communications signal comprises transmitting to a LOS wireless client.

14. The method of claim 12, further comprising amplitude adjusting the fourth optical downlink MIMO communications signal at the second amplitude.

15. The method of claim 14, further comprising receiving the fourth optical downlink MIMO communications signal at the second amplitude modified from the first amplitude in a central unit.

16. The method of claim 14, further comprising receiving the fourth optical downlink MIMO communications signal at the second amplitude modified from the first amplitude in the fourth downlink communications medium.

17. The method of claim 13, further comprising amplitude adjusting the fourth optical downlink MIMO communications signal at the second amplitude.

* * * * *

UNITED STATES PATENT AND TRADEMARK OFFICE
CERTIFICATE OF CORRECTION

PATENT NO. : 9,929,786 B2  
APPLICATION NO. : 15/372490  
DATED : March 27, 2018  
INVENTOR(S) : Jacob George et al.

Page 1 of 2

It is certified that error appears in the above-identified patent and that said Letters Patent is hereby corrected as shown below:

On the Title Page

On page 4, Column 2, item (56), U.S. Patent Documents, Line 18, delete "Stolle" and insert -- Stolte --, therefor.

On page 4, Column 2, item (56), U.S. Patent Documents, Line 58, delete "Pemu" and insert -- Pernu --, therefor.

On page 6, Column 2, item (56), U.S. Patent Documents, Line 51, delete "Narkman" and insert -- Narkmon --, therefor.

On page 7, Column 2, item (56), U.S. Patent Documents, Line 65, delete "Zavadksy" and insert -- Zavadsky --, therefor.

On page 9, Column 1, item (56), Other Publications, Line 8, delete "Berkely," and insert -- Berkeley, --, therefor.

On page 9, Column 1, item (56), Other Publications, Line 45, delete "PCT/U52012/" and insert -- PCT/US2012/ --, therefor.

On page 9, Column 2, item (56), Other Publications, Line 12, delete "PCT/U52007/" and insert -- PCT/US2007/ --, therefor.

On page 9, Column 2, item (56), Other Publications, Line 46, delete "PCPUS2013/070489" and insert -- PCT/US2013/070489 --, therefor.

On page 10, Column 1, item (56), Other Publications, Line 11, delete "Sping)," and insert -- Spring), --, therefor.

Signed and Sealed this  
Twenty-third Day of March, 2021

Drew Hirshfeld  
*Performing the Functions and Duties of the*  
*Under Secretary of Commerce for Intellectual Property and*  
*Director of the United States Patent and Trademark Office*

On page 10, Column 1, item (56), Other Publications, Line 13, delete "Propogation" and insert
-- Propagation --, therefor.

On page 10, Column 2, item (56), Other Publications, Line 71, delete "n" and insert -- in --, therefor.

On page 11, Column 1, item (56), Other Publications, Line 6, delete "Transcations" and insert
-- Transactions --, therefor.